(12) United States Patent
Boutaud et al.

(10) Patent No.: US 10,585,176 B2
(45) Date of Patent: Mar. 10, 2020

(54) PULSED-BASED TIME OF FLIGHT METHODS AND SYSTEM

(71) Applicant: Rockwell Automation Technologies, Inc., Mayfield Heights, OH (US)

(72) Inventors: Frederic Boutaud, Lexington, MA (US); Mei Li, Wellesley, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 313 days.

(21) Appl. No.: 15/708,294

(22) Filed: Sep. 19, 2017

(65) Prior Publication Data
US 2019/0086521 A1  Mar. 21, 2019

(51) Int. Cl.
| | | |
|---|---|---|
| G01C 3/08 | (2006.01) | |
| G01S 7/4865 | (2020.01) | |
| G01S 17/10 | (2020.01) | |
| G01S 7/497 | (2006.01) | |
| G01S 17/89 | (2020.01) | |

(52) U.S. Cl.
CPC ............ *G01S 7/4865* (2013.01); *G01S 7/497* (2013.01); *G01S 17/10* (2013.01); *G01S 17/89* (2013.01)

(58) Field of Classification Search
CPC .......... G01S 17/10; G01S 17/89; G01S 7/497; G01S 7/4865
USPC ....................................................... 356/5.01
See application file for complete search history.

(56) References Cited

U.S. PATENT DOCUMENTS

| | | | | |
|---|---|---|---|---|
| 7,623,221 | B2 * | 11/2009 | Thun | G01S 7/487 356/5.01 |
| 9,880,266 | B2 | 1/2018 | Davidovic et al. | |
| 2006/0192938 | A1 | 8/2006 | Kawahito | |
| 2007/0146682 | A1 | 6/2007 | Tachino et al. | |
| 2007/0158533 | A1 | 7/2007 | Bamji et al. | |

(Continued)

FOREIGN PATENT DOCUMENTS

| | | |
|---|---|---|
| EP | 2 402 784 A2 | 1/2012 |
| EP | 3 141 930 A1 | 3/2017 |
| KR | 10-2017-0140786 A | 12/2017 |

OTHER PUBLICATIONS

IEC, "Safety of machinery—Electro-sensitive protective equipment—Part 3: Particular requirements for Active Opto-electronic Protective Devices responsive to Diffuse Reflection (AOPDDR)", International Standard, IEC 61496-3, Edition 2.0, Feb. 2008, 144 pages.

(Continued)

*Primary Examiner* — Mark Hellner
(74) *Attorney, Agent, or Firm* — Amin, Turocy & Watson, LLP

(57) ABSTRACT

A time of flight sensor device is provided that is capable of generating accurate information relating to propagation time of emitted light pulses using a small number of measurements or data captures. By generating pulse time of flight information using a relatively small number of measurement cycles, object distance information can be generated more quickly, resulting in faster sensor response times. Embodiments of the time of flight sensor can also minimize or eliminate the adverse effects of ambient light on time of flight measurement. Moreover, some embodiments execute time of flight measurement techniques that can achieve high measurement precision even when using relatively long light pulses having irregular, non-rectangular shapes.

20 Claims, 33 Drawing Sheets

(56) References Cited

U.S. PATENT DOCUMENTS

| | | |
|---|---|---|
| 2008/0079833 A1 | 4/2008 | Ichikawa et al. |
| 2011/0037969 A1 | 2/2011 | Spickermann et al. |
| 2011/0194099 A1 | 8/2011 | Kamiyama |
| 2012/0200841 A1 | 8/2012 | Kamiyama et al. |
| 2014/0240692 A1 | 8/2014 | Tien et al. |
| 2015/0362586 A1 | 12/2015 | Heinrich |
| 2016/0161611 A1 | 6/2016 | Ito et al. |
| 2018/0045513 A1* | 2/2018 | Kitamura ............ G01C 3/06 |
| 2018/0246214 A1 | 8/2018 | Ishii et al. |
| 2018/0299554 A1* | 10/2018 | Van Dyck ............ G01S 17/10 |
| 2018/0329063 A1 | 11/2018 | Takemoto et al. |
| 2019/0081095 A1 | 3/2019 | Hanzawa et al. |
| 2019/0174120 A1 | 6/2019 | Wang |
| 2019/0179017 A1 | 6/2019 | Nagai |
| 2019/0281276 A1 | 9/2019 | Wang et al. |

OTHER PUBLICATIONS

Trunk, G.V., "Automatic Detection, Tracking, and Sensor Integration", Chapter 8, Naval Research Laboratory, pp. 8.1-8.23.

Extended European Search Report received for EP Patent Application Serial No. 19173193.4 dated Oct. 25, 2019, 9 pages.

Communication pursuant to Rule 69 EPC received for EP Patent Application Serial No. 19173193.4 dated Dec. 2, 2019, 2 pages.

Extended European Search Report received for EP Patent Application Serial No. 19173194.2 dated Oct. 25, 2019, 8 pages.

Communication pursuant to Rule 69 EPC received for EP Patent Application Serial No. 19173194.2 dated Dec. 2, 2019, 2 pages.

Extended European Search Report received for EP Patent Application Serial No. 19185081.7 dated Nov. 18, 2019, 10 pages.

Non-Final Office Action received for U.S. Appl. No. 15/708,268 dated Oct. 18, 2019, 41 pages.

Zach et al., "A 2x32 Range-Fim:ling Sensor Array with Pixel-Inherent Suppression of Ambient Light up to 120Klx", Sensors and Mems, 20.7, IEEE International Solid-State Circuits Conference, 2009, pp. 352-353.

Davidovic et al., "A 33 x 25 μm2 Low-Power Range Finder", IEEE, 2012, pp. 922-925.

Chen et al., "Development of a Low-cost Ultra-tiny Line Laser Range Sensor", IEEE/RSJ International Conference on Intelligent Robots and Systems (IROS), Oct. 9-14, 2016, pp. 111-116.

\* cited by examiner

PULSED-BASED TIME OF FLIGHT METHODS AND SYSTEM

BACKGROUND

The subject matter disclosed herein relates generally to optical sensor devices, and, more particularly, to sensors that use light based time of flight measurement to generate distance or depth information.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a time of flight sensor device is provided, comprising an emitter component configured to emit a first light pulse at a first time that is delayed relative to a start of a first measuring sequence by a first delay, and a second light pulse at a second time that is delayed relative to a start of a second measuring sequence by a second delay longer than the first delay; a photo-sensor component comprising a photo-detector, the photo-detector comprising a photo device configured to generate electrical energy in proportion to a quantity of received light, and a measuring circuit configured to capture a first portion of the electrical energy proportional to a first leading portion of a first received reflected light pulse corresponding to the first light pulse, and a second portion of the electrical energy proportional to a first trailing portion of the first received reflected light pulse, wherein the first leading portion and the first trailing portion are divided at a first sampling time that is delayed relative to the start of the first measuring sequence by a third delay, and capture a third portion of the electrical energy proportional to a second leading portion of a second received reflected light pulse corresponding to the second light pulse, and a fourth portion of the electrical energy proportional to a second trailing portion of the second received reflected light pulse, wherein the second leading portion and the second trailing portion are divided at a second sampling time that is delayed relative to the start of the second measuring sequence by the third delay; and a distance determination component configured to determine a propagation time for the first light pulse or the second light pulse based on a first measured value of the first portion, a second measured value of the second portion, a third measured value of the third portion, and a fourth measured value of the fourth portion.

Also, one or more embodiments provide a method for optical distance measurement, comprising generating, by a photo-detector of an optical sensor device comprising a processor, electrical energy in proportion to a quantity of received light incident on the photo-detector; emitting, by the optical sensor device, a first light pulse at a first time that is delayed relative to a start of a first measuring sequence by a first delay; storing, by the optical sensor device, a first portion of the electrical energy proportional to a first leading portion of a first received reflected light pulse corresponding to the first light pulse; storing, by the optical sensor device, a second portion of the electrical energy proportional to a first trailing portion of the first received reflected light pulse, wherein the first leading portion and the first trailing portion are divided at a first sampling time that is delayed relative to the start of the first measuring sequence by a second delay; emitting, by the optical sensor device, a second light pulse at a second time that is delayed relative to a start of a second measuring sequence by a third delay longer than the first delay; storing, by the optical sensor device, a third portion of the electrical energy proportional to a second leading portion of a second received reflected light pulse corresponding to the second light pulse; storing, by the optical sensor device, a fourth portion of the electrical energy proportional to a second trailing portion of the second received reflected light pulse, wherein the second leading portion and the second trailing portion are divided at a second sampling time that is delayed relative to the start of the second measuring sequence by the second delay; and determining, by the optical sensor device, a propagation time for the first light pulse or the second light pulse based on a first measured value of the first portion, a second measured value of the second portion, a third measured value of the third portion, and a fourth measured value of the fourth portion.

Also, according to one or more embodiments, a non-transitory computer-readable medium is provided having stored thereon instructions that, in response to execution, cause a an optical sensor device to perform operations, the operations comprising emitting a first light pulse at a first time that is delayed relative to a start of a first measuring sequence by a first delay; storing a first portion of electrical energy generated by a photo-detector of the optical sensor device, wherein the first portion of the electrical energy is proportional to a first leading portion of a first received reflected light pulse corresponding to the first light pulse; storing a second portion of the electrical energy proportional to a first trailing portion of the first received reflected light pulse, wherein the first leading portion and the first trailing portion are divided at a first sampling time that is delayed relative to the start of the first measuring sequence by a second delay; emitting a second light pulse at a second time that is delayed relative to a start of a second measuring sequence by a third delay longer than the first delay; storing a third portion of the electrical energy proportional to a second leading portion of a second received reflected light pulse corresponding to the second light pulse; storing a fourth portion of the electrical energy proportional to a second trailing portion of the second received reflected light pulse, wherein the second leading portion and the second trailing portion are divided at a second sampling time that is delayed relative to the start of the second measuring sequence by the second delay; and determining a propagation time for the first light pulse or the second light pulse based on a first measured value of the first portion, a second measured value of the second portion, a third measured value of the third portion, and a fourth measured value of the fourth portion.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
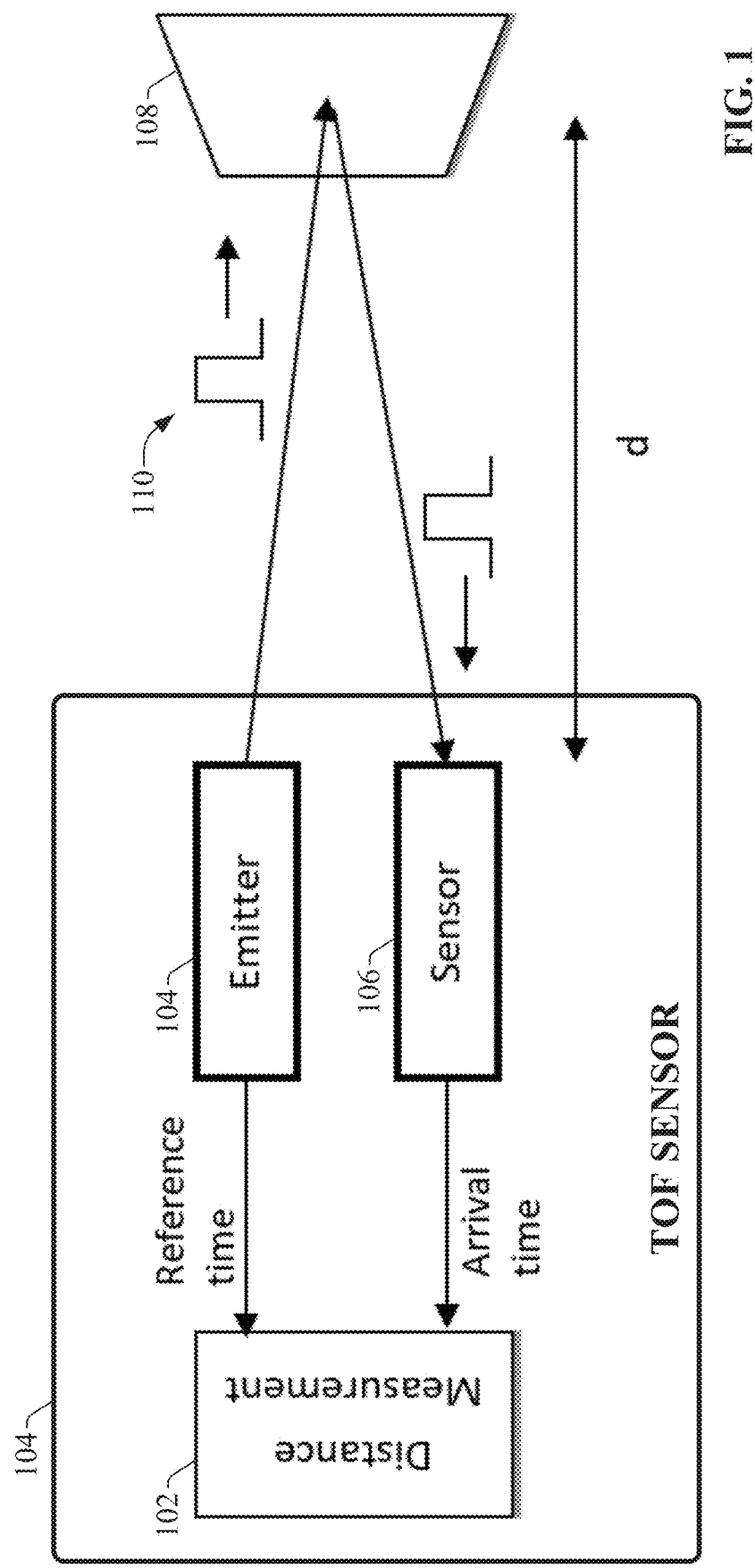
FIG. 1 is a generalized block diagram of a TOF sensor illustrating pulsed light time of flight principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Time of Flight (TOF) optical sensors—such as photo detectors or multi-pixel image sensors—are generally used to detect distances of objects or surfaces within a viewing range of the sensor. Such sensors can include, for example, photo detectors that measure and generate a single distance data point for an object within range of the detector, as well as multi-pixel image sensors comprising an array of photo-detectors that are each capable of generating a distance data point for a corresponding image pixel.

Some types of TOF sensors that employ pulsed light illumination measure the elapsed time between emission of a light pulse to the viewing field (or viewing space) and receipt of a reflected light pulse at the sensor's photo-receiver. Since this time-of-flight information is a function of the distance of the object or surface from the sensor, the sensor is able to leverage the TOF information to determine the distance of the object or surface point from the sensor.

FIG. 1 is a generalized block diagram of a TOF sensor 112 illustrating pulsed light time of flight principles. In general, the sensing technology used by some TOF sensors measures the time taken by a light pulse to travel from the sensor's illumination light source—represented by emitter 104—to an object 108 or surface within the viewing field and back to the sensor's light photo-detectors, represented by sensor 106. Sensor 106 can be, for example a dedicated multi-pixel CMOS application-specific integrated circuit (ASIC) imager that integrates specialized means for measuring the position in time of received pulses. Distance measurement components 102 measure the distance d to the object 108 as $$d=(c/2)t \qquad (1)$$

where c is the speed of light, and t is the measured time of the round trip for the pulse from the emitter 104 to the object 108 and back to the sensor 106.

Emitter 104 of the TOF sensor 112 emits a short pulse 110 into the viewing field. Objects and surfaces within the viewing field, such as object 108, reflect part of the pulse's radiation back to the TOF sensor 112, and the reflected pulse is detected by sensor 106 (e.g., a photo-detector or a photo-sensor such as a photo-diode). Since the speed of light c is a known constant and the time t elapsed between emission and reception of the pulse 110 can be measured, the distance measurement components 102 can determine the distance between the object 108 and the sensor by calculating half of the round-trip distance, as given by equation (1) above. Collectively, the distance information obtained for all pixels of the viewing space yields depth map data for the viewing space. In some implementations, distance measurement components 102 can include a timer that measures the arrival time of the received pulse relative to the time at which emitter 104 emitted the pulse. In general, the TOF sensor 112 generates information that is representative of the position in time of the received pulse.

When radiation of the reflected pulse is incident on the photo-receivers or photo-detectors that make up sensor 106, the incident light is converted into an electrical output proportional to the intensity of the incident light. The distance measurement components 102 then recover and analyze the electrical output in order to identify the pulse, thereby determining that the reflected pulse has been received at the sensor 106. Accurate distance measurement using light pulse time delay estimation depends upon reliable recovery and representation of the reflected light pulse and its time related characteristics.

In some implementations, the photo-detectors of sensor 106 accumulate electrical charges based on the exposure duration of the sensor 106 to the received light pulse radiation relative to a time reference. The accumulated charges translate into a voltage value that is used by the distance measurement components 102 to recognize the pulse. Once the pulse is identified, the distance measurement components 102 can estimate the time that the reflected pulse was received at the TOF sensor relative to the time that the pulse was emitted, and the distance can be estimated based on this time using equation (1) (or another distance determination equation or algorithm that defined distance as a function of light pulse propagation time).

The TOF sensor's photo-detector should be designed to enable accurate measurement of information representative of pulse time of flight and pulse amplitude over a large dynamic range. For applications in which fast response times are essential—e.g. industrial safety applications in which the TOF sensor output is used as a safety signal—accurate object detection with minimal response times is crucial. TOF detection methods that can achieve highly precise detection measurements while relying on a small number of pulse captures and data points are preferable for such applications. Such methods must also be able to compensate for (or be insensitive to) the effects of ambient light. Also, many TOF distance measurement techniques rely on pulses having a substantially rectangular shape (e.g., negligible rise and fall times with a reasonably flat and consistent amplitude), and can lose measurement precision when long pulses of irregular shape are used.

To address these and other issues, one or more embodiments of the present disclosure provide a TOF sensor capable of accurately measuring information relating to the propagation time of light pulses and calculating the time of flight to and from an object or surface in the viewing field using a small number of measurements or data captures, thereby maintaining short acquisition and response times. TOF distance measurement systems and methods described herein also implement techniques that minimize or eliminate adverse effects of ambient light on the TOF measurement, and that can achieve high measurement precision even when relatively long light pulses of irregular shape are used.

Figure 2:
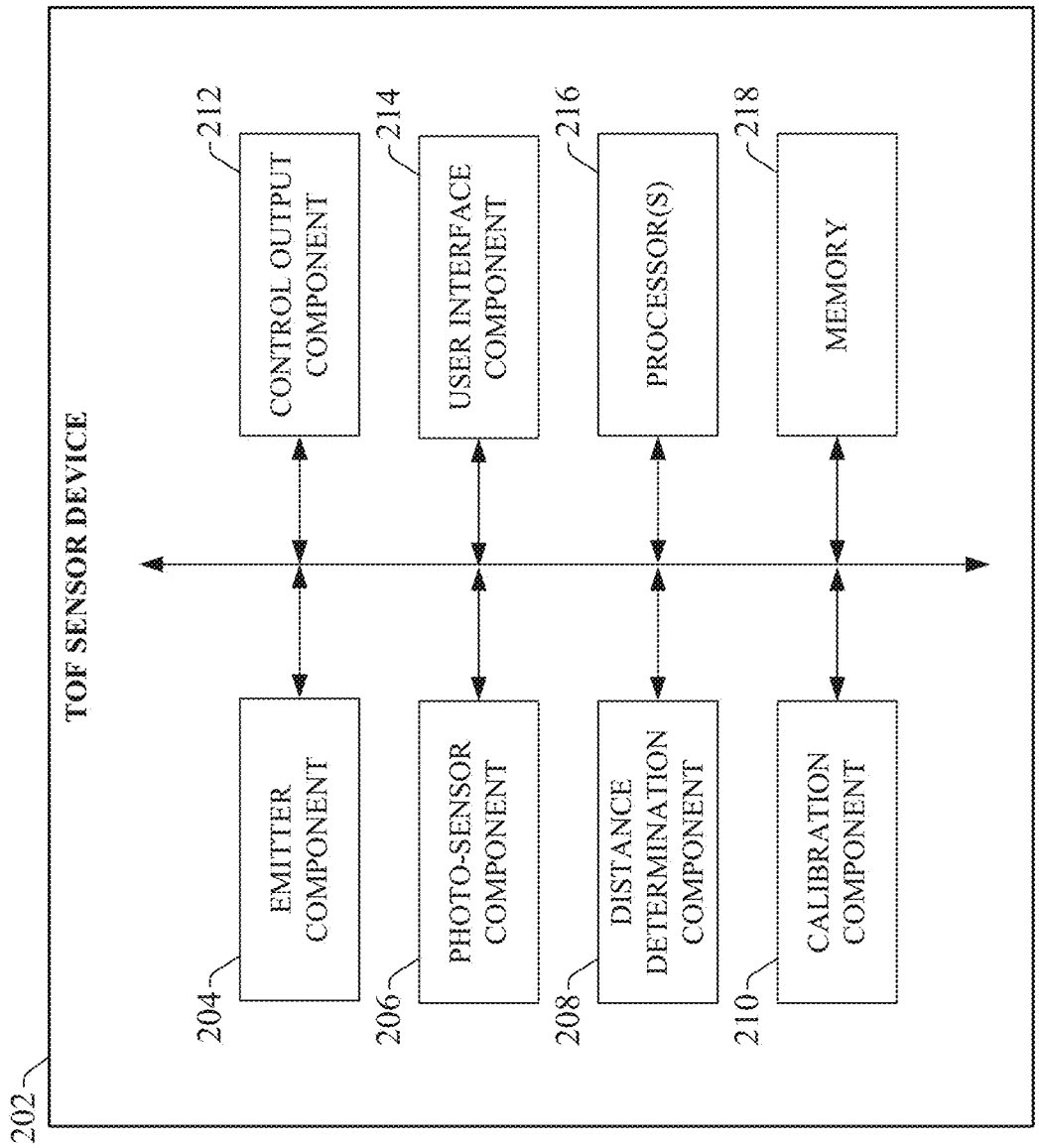
FIG. 2 is a block diagram of an example TOF sensor device according to one or more embodiments.

FIG. 2 is a block diagram of an example TOF sensor device 202 according to one or more embodiments of this disclosure. Although FIG. 2 depicts certain functional components as residing on TOF sensor device 202, it is to be appreciated that one or more of the functional components illustrated in FIG. 2 may reside on a separate device relative to TOF sensor device 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 202 can include an emitter component 204, a photo-sensor component 206, a distance determination component 208, a calibration component 210, a control output component 212, a user interface component 214, one or more processors 216, and memory 218. In various embodiments, one or more of the emitter component 204, photo-sensor component 206, distance determination component 208, calibration component 210, control output component 212, user interface component 214, the one or more processors 216, and memory 218 can be electrically and/or communicatively coupled to one another to perform one or more of the functions of the TOF sensor device 202. In some embodiments, one or more of components 204, 206, 208, 210, 212, and 214 can comprise software instructions stored on memory 218 and executed by processor(s) 216. TOF sensor device 202 may also interact with other hardware and/or software components not depicted in FIG. 2. For example, processor(s) 216 may interact with one or more external user interface devices, such as a keyboard, a mouse, a display monitor, a touchscreen, or other such interface devices. TOF sensor device 202 may also include network communication components and associated networking ports for sending data generated by any of components 204, 206, 208, 210, 212, and 214 over a network (either or both of a standard data network or a safety network), or over a backplane.

Emitter component 204 can be configured to control emission of light by the TOF sensor device 202. TOF sensor device 202 may comprise a laser or light emitting diode (LED) light source under the control of emitter component 204. Emitter component 204 can generate pulsed light emissions directed to the viewing field, so that time-of-flight information for the reflected light pulses can be generated by the TOF sensor device 202 (e.g., by the distance determination component 208).

Photo-sensor component 206 can be configured to convert light energy incident on a photo-receiver or photo-detector array to electrical energy for respective pixels of a viewing space, and selectively control the storage of the electrical energy in various electrical storage components (e.g., capacitors) for distance analysis. Distance determination component 208 can be configured to determine a propagation time (time of flight) for emitted light pulses for respective pixels of the viewing space based on the stored electrical energy generated by the photo-sensor component 206, and to further determine a distance value of an object or surface corresponding to a pixel within the viewing space based on the determined propagation time.

The calibration component 210 can be configured to execute a calibration sequence that measures capacitance mismatches between measuring capacitors of one or more photo-detectors of the TOF sensor device 202, and calculates capacitance compensation factors that are used by the distance determination component 208 when determining distance information. In some embodiments, calibration component 210 can also be configured to measure other parameter mismatches along the measuring circuitry, from the photo device to the digital output that provides the voltage value associated with each capacitor (e.g., the output of the analog-to-digital converter).

The control output component 212 can be configured to analyze and control one or more sensor outputs based on results generated by the distance determination component 208. This can include, for example, sending an analog or digital control signal to a control or supervisory device (e.g., an industrial controller, an on-board computer mounted in a mobile vehicle, etc.) to perform a control action, initiating a safety action (e.g., removing power from a hazardous machine, switching an industrial system to a safe operating mode, etc.), sending a feedback message to one or more plant personnel via a human-machine interface (HMI) or a personal mobile device, sending data over a safety network, or other such signaling actions. In various embodiments, control output component 212 can be configured to interface with a plant network (e.g., a control and information protocol network, and Ethernet/IP network, a safety network, etc.) and send control outputs to other devices over the network connection, or may be configured to send output signals via a direct hardwired connection.

User interface component 214 can be configured to receive user input and to render output to the user in any suitable format (e.g., visual, audio, tactile, etc.). In some embodiments, user interface component 214 can be configured to communicate with a graphical user interface (e.g., a programming or development platform) that executes on a separate hardware device (e.g., a laptop computer, tablet computer, smart phone, etc.) communicatively connected to TOF sensor device 202. In such configurations, user interface component 214 can receive input parameter data entered by the user via the graphical user interface, and deliver output data (e.g., device status, health, or configuration data) to the interface. Input parameter data can include, for example, normalized pulse shape data that can be used as reference data for identification of irregularly shaped pulses, light intensity settings, or other such parameters. Output data can comprise, for example, status information for the TOF sensor device 202, alarm or fault information, parameter settings, or other such information.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
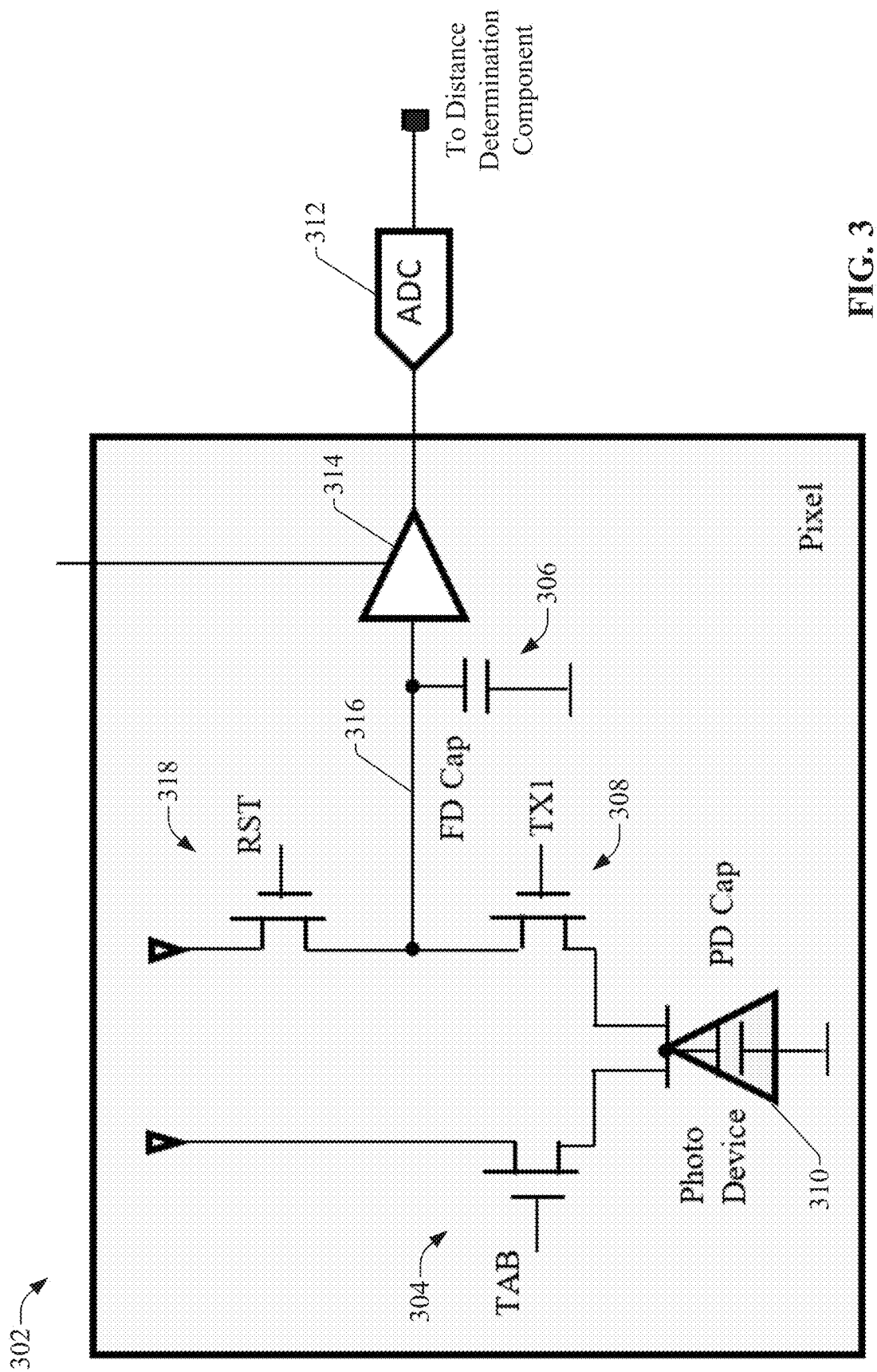
FIG. 3 is a diagram of an example architecture for a baseline photo-detector.

FIG. 3 is a diagram of an example architecture for a baseline photo-detector 302. As will be described herein, photo-detector 302 is referred to as a baseline photo-detector since additional components can be added to this baseline architecture to yield other embodiments. Photo-detector 302 can correspond to a single pixel, and can be one of an array of photo-detectors that make up photo-sensor component 206 of TOF sensor device 202. Collectively, the array of photo-detectors capture received pulse signal information that can be used to calculate distance information for respective pixels of a viewing space being monitored by the TOF sensor device 202. The collection of pixel-wise distance data for the viewing space can yield point cloud information that describes a depth or distance topology of the viewing space. Although the present example describes photo-detector 302 as being one of an array of photo-detectors that make up an imaging sensor device, it is to be appreciated that the techniques carried out by photo-detector 302 to measure distance information can also be implemented in a single-point photo-sensor that generates only a single distance value for an object within range of the sensor.

The photo-detector 302 includes a photo device 310 (e.g., a photo-diode and a capacitor (PD Cap)) that generates and stores electrical charges when exposed to light, such as pulsed light from a reflected pulse as well as ambient light. The magnitude of the electrical charge is proportional to the intensity of the light incident on the photo device 310. The photo device 310 is connected to a first switch 304 enabled by an anti-blooming control (TAB) and a second switch 308 enabled by a capture control line (TX1). Switches 304 and 308 can be transistors or other types of switching devices. The charges stored on the photo device 310 are diverted when the TAB switch 304 is active (e.g., when a logical high control signal is applied to the gate of the TAB switch 304), thereby clearing the charges from the photo device 310. The photo device 310 is connected to a measuring capacitor (e.g., a floating diffusion (FD) capacitor or another type of measuring capacitor) 306 via the control line TX1.

With this configuration, the charges stored on the photo device 310 can also be transferred to the measuring capacitor 306 when the TX1 switch 308 is active (e.g., when a logical high control signal is applied to the gate of the TX1 switch 308). The amount of charge stored on the measuring capacitor 306 (transferred from the photo device 310) can be read by an analog-to-digital converter (ADC) 312 via an amplifier 314, and the ADC 312 converts the magnitude of the charge to a proportional digital value representing the amount of charge. In some implementations, to ensure that a sufficiently high level of charge has been accumulated to yield a high signal value that can be accurately measured, photo-detector 302 may be configured to base the distance measurement on a series of received pulses rather than a single received pulse. In such implementations, ADC 312 may be configured to read the magnitude of the charge on measuring capacitor 306 after a defined number of pulses have been received, such that the charge on measuring capacitor 306 represents an accumulation of a series of pulses. The accumulated charge stored on the measuring capacitor 306 can be cleared when a logical high control signal is applied to the gate of the reset (RST) transistor 318. The RST transistor 318, control line TX1, measuring capacitor 306, and input of the amplifier 314 are connected to the same node 316.

Photo-detector 302 can be an element of photo-sensor component 206 depicted in FIG. 2. The output of the ADC 312—that is, the digital value representing the amount of electrical charge on measuring capacitor 306—is provided to the distance determination component 208, which uses the value to calculate the propagation time and corresponding distance for an emitted light pulse. In some embodiments, as will be discussed in more detail below, multiple values—obtained using different switch timings—may be accumulated and read for a signal distance value in order to accurately estimate the time of the pulse.

As photo-detector 302 receives pulsed light, it develops charges that are captured and integrated into the measuring capacitor 306. In this way, each pixel corresponding to a photo-detector 302 generates time-related information and amplitude information (based on charge values) based on received light pulses backscattered by an object in the viewing field illuminated by the emitter component 204.

Figure 4A:
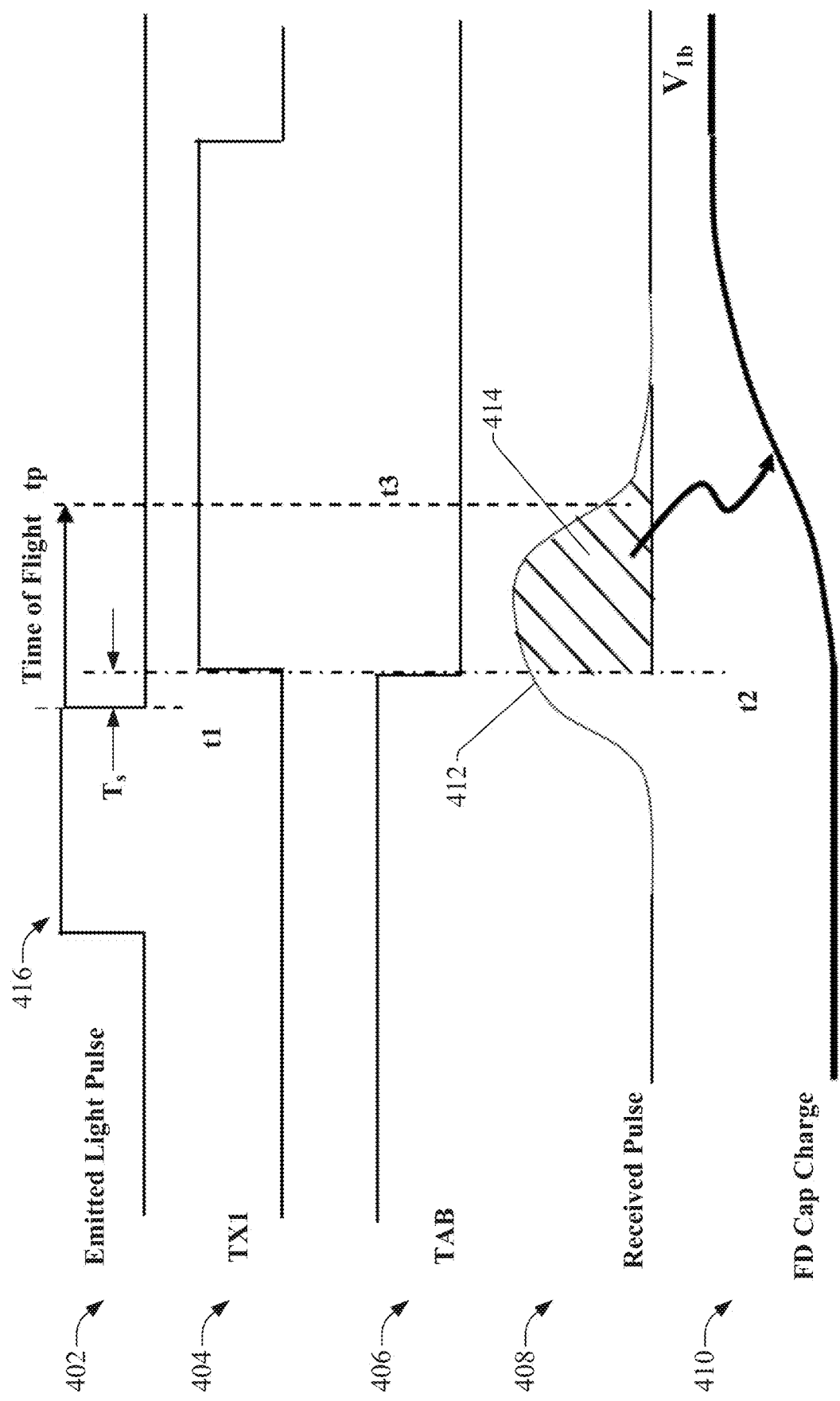
FIG. 4A is a timing diagram illustrating an example timing of events for capturing a trailing edge portion of a reflected pulse by a photo-detector.
Figure 4B:
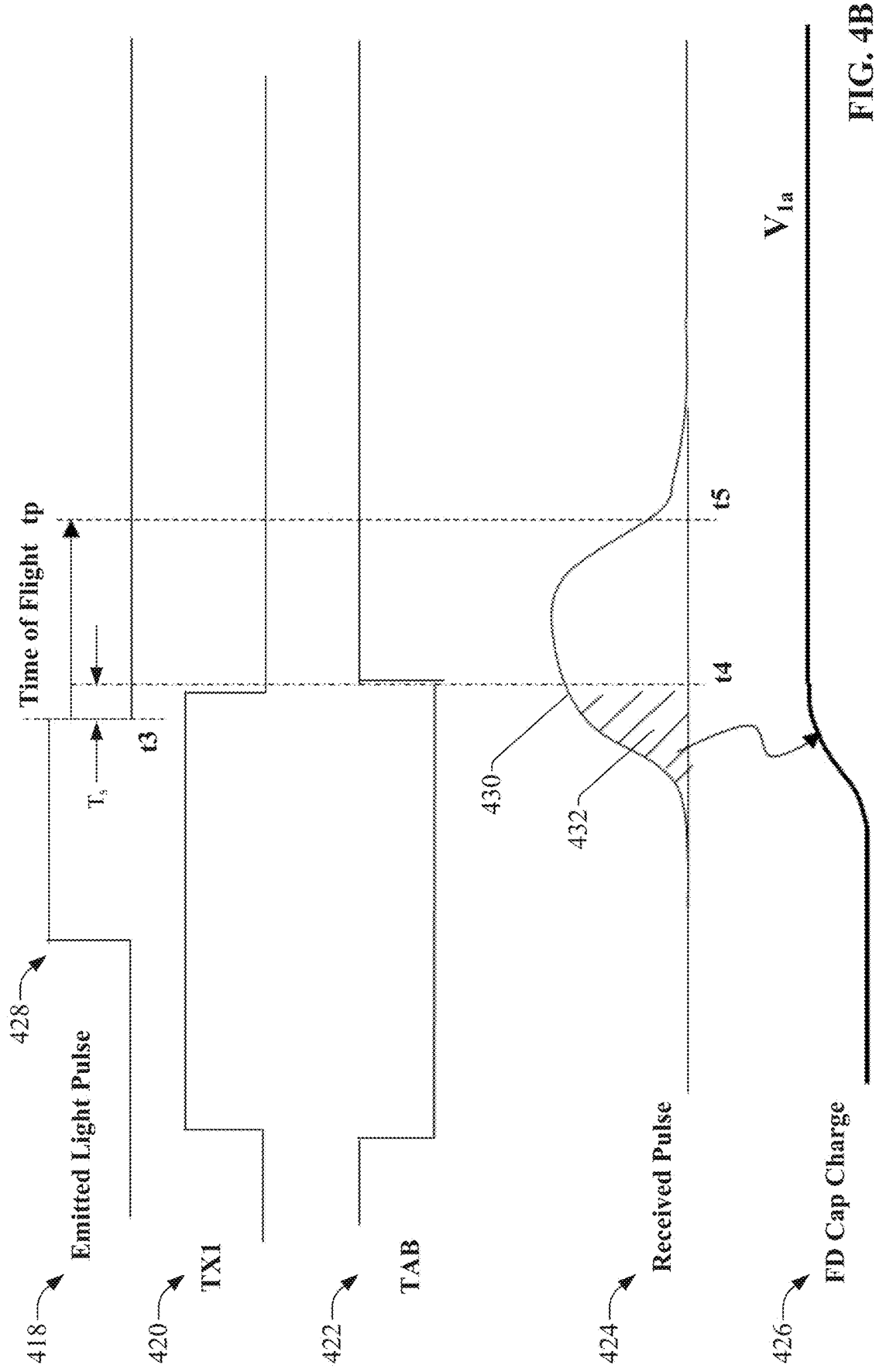
FIG. 4B is a timing diagram illustrating an example timing of events for capturing a leading edge portion of a reflected pulse by a photo-detector.

FIGS. 4A and 4B are a timing diagrams illustrating example timings of events associated with operation of photo-detector 302. In general, photo-detector 302 can execute a two-stage measurement that captures a trailing edge portion of a received pulse during the first stage and a leading edge portion of the received pulse during a second stage (or vice versa). The distance determination component 208 can calculate the estimated distance based on a ratio of the trailing edge portion to the full pulse value (where the full pulse value is the sum of the trailing and leading edges).

FIG. 4A depicts the timing of events for capturing the trailing edge portion of a pulse during a first stage of the distance measurement cycle (it is to be appreciated, however, that measurement of the trailing edge portion may instead occur during the second stage of the measurement cycle, while measurement of the leading edge portion occurs during the first stage). Timing chart 402 represents the timing of the light pulse output modulated by the TOF sensor device's emitter component 204, where the high level of chart 402 represents the time at which the emitter component 204 is emitting a light pulse (e.g., light pulse 416). Timing charts 404 and 406 represent the timings of the TAB control signal and the TX1 control signal, respectively (that is, the timing of the signals applied to the TAB and TX1 control lines). Timing chart 408 represents amount or intensity of light received at the photo device 310 of the photo-detector 302, where the rise in the chart represents receipt of the reflected pulse 412 corresponding to the emitted pulse. Timing chart 410 represents the amount of charge stored on the measuring capacitor 306 over time. The control signals applied to various control elements of photo-detector 302 can be controlled in accordance with control algorithms executed by photo-sensor component 206 or distance determination component 208, working in conjunction with the emitter component 204.

The time at which the TAB control signal goes low and the TX1 control signal goes high—referred to as the sampling point or split point—is defined to be a constant time relative to the time of emission of the light pulse 416 by the emitter component 204. In the illustrated example, the sampling point occurs at time t2, which is set to be a fixed time relative to the time t1 corresponding to the trailing edge of the emitted pulse 416 (the sampling time may also be defined relative to the leading edge of the emitted pulse 416 in some embodiments). When the TAB control signal goes low and the TX1 control signal goes high at the sampling point (at time t2), the accumulated electrical charge collected by the photo device 310 in response to received light begins transferring to the measuring capacitor 306.

As shown in FIG. 4A, the timing of the TAB and TX1 control signals relative to the received reflected pulse 412 determines the fraction of the total pulse-generated charge that is transferred to measuring capacitor 306. In the illustrated example, the trailing edge of the emitted pulse 416 leaves the emitter at time t1 (see chart 402). At sampling time t2 (after a preset delay relative to time t1), the control signal on the TAB is turned off, leaving the measuring (FD) capacitor 306 discharged, and the control signal on the TX1 switches to ON (see charts 404 and 406), at which time the measuring capacitor 306 begins accumulating charges in proportion to the intensity of the light received at the photo device 310. As shown in chart 408, the reflected pulse 412 corresponding to the emitted pulse 416 begins being received at the photo device 310 some time before time t2 (that is, the rising edge of the reflected pulse 412 is received at the photo device 310 before sampling time t2 when the TX1 control signal goes high). Starting at time t2, when the TX1 control signal goes high, the charge on the measuring capacitor 306 begins increasing in proportion to the level of received light, as shown in chart 410. After receipt of reflected pulse 412, the charge quantity $V_{1b}$ transferred to the measuring capacitor is proportional to the shaded area 414 under the received pulse timing chart, which is defined between sampling time t2 and the time when the TX1 control signal goes low. Thus, the charge quantity $V_{1b}$ stored on the measuring capacitor 306 is proportional to the area of the trailing slice of the reflected pulse 412 captured after sampling time t2, and is therefore function of the position in time of the received pulse 412 relative to a calibrated time reference (e.g., the falling edge of the TAB control signal at time t2). Since the time at which the reflected pulse 412 is received is a function of the distance of the object or surface from which the pulse 412 was reflected, the amount of the trailing portion of the reflected pulse that is collected by measuring capacitor 306 as a fraction of the total received pulse is also a function of this distance. Accordingly, at the completion of the first stage of the measuring cycle, distance determination component 208 stores a value (e.g., voltage $V_{1b}$ or a corresponding value of an electrical charge) representing the amount of charge stored on measuring capacitor 306 after completion of the sequence illustrated in FIG. 4A, then initiates the second stage of the measurement cycle depicted in FIG. 4B in order to obtain the leading edge portion.

Similar to the timing sequence depicted in FIG. 4A, FIG. 4B includes a timing chart 418 representing emitted pulse 428 send during the second stage of the measuring cycle; timing charts 420 and 422 representing the timings of the TAB control signal and the TX1 control signal, respectively (that is, the timing of the signals applied to the TAB and TX1 control lines during the second stage); a timing chart 424 representing the amount or intensity of light received at the photo device 310, where the rise in the chart represents receipt of the reflected pulse 430 corresponding to the emitted pulse 428; and a timing chart 426 representing the amount of charge stored on the measuring capacitor 306 over time.

As can be seen by comparing FIGS. 4A and 4B, the timing of events during the second stage of the measuring cycle differs from that of the first stage in that emitted pulse 428 is sent at a later time relative to the rising edge of the TX1 control signal. This can be achieved by either delaying emission of emitted pulse 428 relative to the first stage, or by switching the TX1 control signal high at an earlier time relative to the first stage. In the illustrated example, the TX1 control signal is set high prior to emission of emitted pulse 428 (in contrast to the first stage depicted in FIG. 4A, in which the TX1 signal goes high after emission of emitted pulse 416). To ensure that the portion of the received pulse that was not captured during the first stage is fully captured during the second stage (with little or no overlap between the captured leading and trailing portions), the TX1 control signal goes high at a time that is earlier by a duration that is substantially equal to the duration of the TX1 high signal. This causes the falling edge of the TX1 control signal to occur at substantially the same time—relative the falling edge of emitted pulse 428—as the rising edge of the TX1 controls signal during the first stage (i.e., the difference between times t4 and t3 during the second stage is substantially equal to the difference between times t2 and t1 during the first stage). This ensures that the sampling point at time t4 slices the received pulse 430 at substantially the same location as the sampling point at time t2 during the first stage. Since the TX1 signal is already set high at the time the reflected pulse 430 is received, this timing causes the leading edge portion 432—the portion of the reflected pulse 430 not capture during the first stage—to be captured by measuring capacitor 306 as charge quantity $V_{1a}$.

In general, the nearer the object or surface is to the TOF sensor device 202, the earlier in time the reflected pulse (pulse 412 or 430) will be received, and thus the smaller the trailing portion of the pulse charge that will be collected by measuring capacitor 306. Accordingly, after completion of the first and second stages of the measuring cycle depicted in FIGS. 4A and 4B, distance determination component 208 can compute the estimated distance based on the ratio of the measured trailing edge portion 414 to the total of the trailing edge portion 414 and the leading edge portion 432. For example, the distance determination component 208 can calculate the time of flight (or propagation time) tp for the pulse according to:

$$t_p = \left(\frac{V_{1b}}{V_{1a} + V_{1b}}\right) T_0 + T_s \qquad (2)$$

Where $T_s$ is the sampling time relative to the falling edge of the emitted pulse, and $T_0$ is the duration of the pulse. Note that, in embodiments in which the sampling time is set to coincide with the falling edge of the emitted pulse, $T_s$ will be zero.

Figure 5:
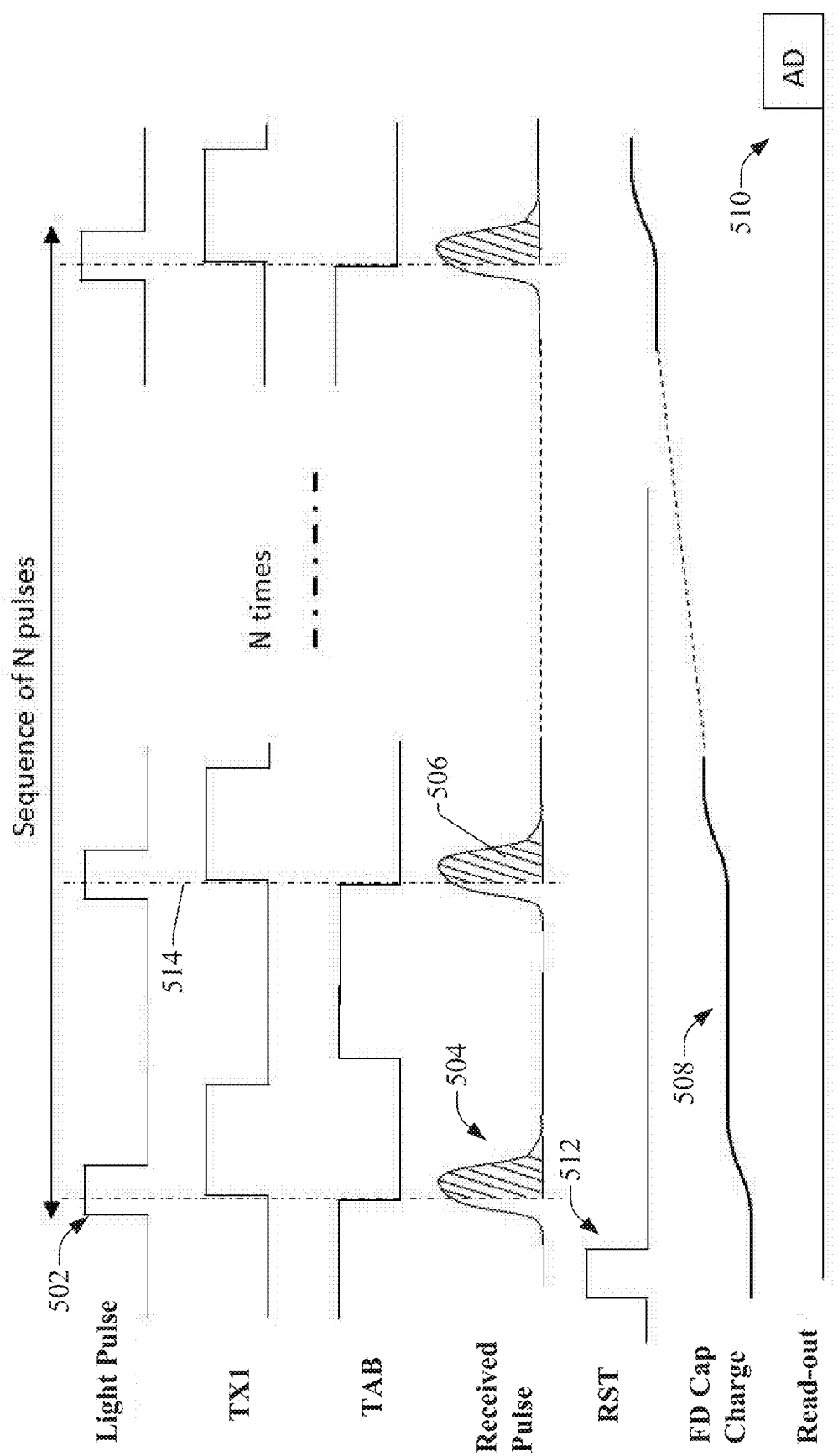
FIG. 5 is a timing diagram illustrating a charge capture sequence repeated over a sequence of multiple pulses.

In some embodiments, the sequences depicted in FIGS. 4A and 4B are repeated multiple times per stage in order to accumulate and collect a measurable amount of charge on the measuring capacitor 306 representative of the trailing and leading edge portions. FIG. 5 is a timing diagram illustrating the first stage of the measuring cycle described above in connection with FIG. 4A, repeated over a sequence of multiple pulses. Execution of multiple measuring cycles is referred to herein as a measuring sequence. As shown in the light pulse timing chart of FIG. 5, a sequence of N light pulses 502 is received at the TOF sensor device's photo-sensor component 206. Light pulses 502 are reflected pulses obtained as a result of emission of a series of pulses by the TOF sensor device's emitter component 204. After a defined time duration has elapsed relative to the time of the leading edge of each emitted pulse 502, the control signal on the TAB goes low and the control signal on the TX1 goes high, causing the measuring capacitor 306 to begin collecting the charge from the photo device 310. This charge is a function of the intensity of light received by the photo device 310 while the TX1 control signal is high (measuring capacitor 306 is reset and cleared of charges at the beginning of the sequence by applying a high signal 512 on the RST control line). The vertical dashed lines represent the sampling points 514 at which the TAB control signal goes low and the TX1 control signal goes high, where these sampling points 514 are defined relative to the leading edge of each emitted pulse 502.

As in the example sequence described above in connection with FIG. 4A, the measuring capacitor 306 begins collecting the charge corresponding to a reflected pulse 504 after the leading edge of the reflected pulse 504 has reached the photo-sensing component 206. Thus, each time a reflected pulse 504 is received by the photo-sensing component 206 and detected by the photo device 310, the charge on the measuring capacitor 306—represented by timing chart 508—increases by an amount proportional to the shaded region 506 of each received pulse 504 (beginning at the time that the TX1 control signal goes high). As discussed above, the amount of this shaded region (and thus the amount of charge collected by the measuring capacitor 306) relative to the amount of the total received pulse is a function of the distance of an object or surface from which the received pulse 504 was reflected. By repeating this measuring cycle for the sequence of N pulses, the charges on measuring capacitor 306 are accumulated over the N received pulses 504 to attain a measurable quantity of charge with an acceptable signal to noise ratio. The number of pulses N defining this measuring sequence is referred to as the integration number or gating number.

When charges for the N reflected pulses have been accumulated by the measuring capacitor 306, a read-out signal 510 is activated to trigger a reading of the accumulated charge (or a corresponding voltage) from the measuring capacitor 306. In response to the read-out signal 510, the amount of the accumulated charge stored on the measuring capacitor 306 at the end of the sequence is measured or communicated as an analog value (e.g., a charge Q or a voltage V), or can be converted into a digital value by ADC 312. The measured value is then provided to the distance determination component 208 as the measured trailing edge portion. A similar multiple-pulse sequence can be carried out for the second stage illustrated in FIG. 4B in order to accumulate enough charge to obtain a readable measurement of the leading edge portion, which is also provided to distance determination component 208, which uses the leading and trailing edge values to determine the propagation time of the light pulses and the distance corresponding to the propagation time.

Figure 4C:
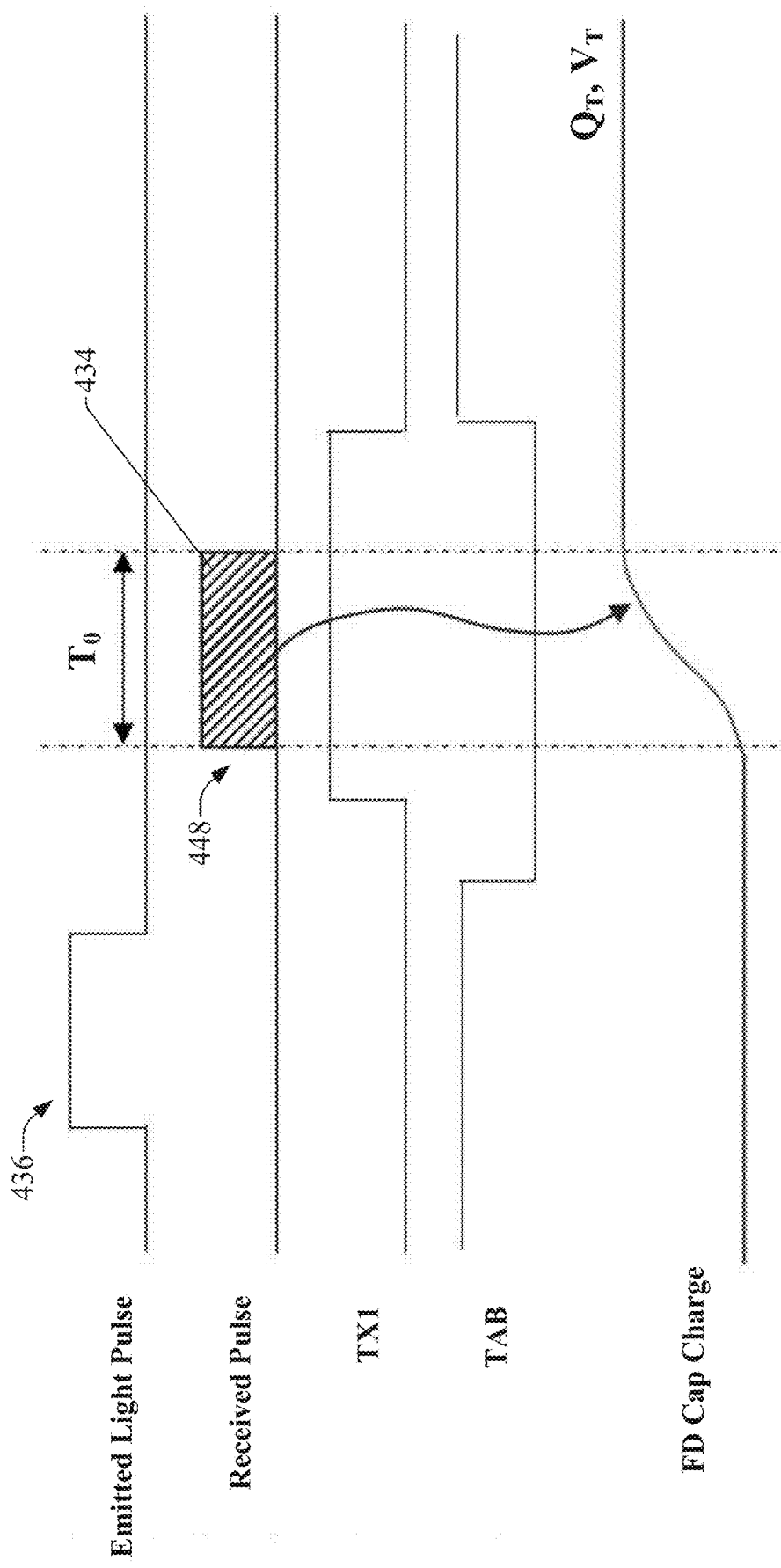
FIG. 4C is a timing diagram illustrating timings associated with capture of the entirety of a reflected pulse.

In some embodiments, rather than using the two-stage process described above to capture the leading and trailing edges of the received pulse, the process can be modified to capture the trailing edge in one stage and the total pulse in the other stage. The same photo-detector configuration depicted in FIG. 3 can be used for such embodiments; however, the timing of the control signals for the leading edge collection stage can be modified as shown in FIG. 4C to instead capture the total reflected pulse. FIG. 4C is a timing diagram illustrating timings associated with capture of the entirety of reflected pulse 448 corresponding to emitted pulse 436. In this example, the TX1 control signal goes high prior to receipt of reflected pulse 448, and stays high for a sufficient duration to capture a charge $Q_T$ (corresponding to voltage $V_T$) proportional to the total reflected pulse 448. That is, charge $Q_T$ (or voltage $V_T$) corresponds to the shaded region 448 under reflected pulse 448.

In a separate stage of the measuring cycle (either before or after capture of the charge $Q_T$, $V_T$, the trailing edge portion can be captured as $V_{1b}$ using a timing similar to that illustrated in FIG. 4A. With the trailing edge voltage $V_{1b}$ and total pulse voltage $V_T$ captured, distance determination component 208 can estimate the propagation time of the pulse according to:

$$t_p = \left(\frac{V_{1b}}{V_T}\right)T_0 + T_s \tag{3}$$

Equation (3) (or a variation thereof) can be used to calculate the time of flight tp of the emitted pulse if the shape of the pulse is substantially rectangular (that is, the pulse has very short rise and fall times). If the pulse shape is not rectangular, then a formula $f(V_{1b}/V_T)$ defining the relationship between $(V_{1b}/V_T)$ and the time of flight tp can be obtained and approximated, and equation (3) can be rewritten as:

$$t_p = f\left(\frac{V_{1b}}{V_T}\right)T_0 + T_s \tag{4}$$

In some alternative embodiments, rather than measuring the trailing and leading edge portions of the received reflected pulse (or the trailing edge portion and total pulse), photo-sensor component may be configured to measure the trailing edge portion and an amplitude of the received pulse, and use these values to estimate the distance. In the case of substantially rectangular received pulses (i.e., pulses with substantially flat tops), a proportionality rule can be used to obtain the ratio of the trailing edge value to the full pulse value based on the measured trailing edge and the amplitude. Distance determination component 208 can then translate the ratio to a distance estimate. In a variation of these embodiments in which the received pulses 504 are not sufficiently rectangular, a look-up table can be defined and stored in memory 218, where the look-up table defines distance values corresponding to pairs of trailing edge and pulse amplitude values. For example, after determining the trailing edge value and the amplitude value, distance determination component 208 can reference the look-up table to determine the distance value as a function of the trailing edge and distance values.

Figure 6:
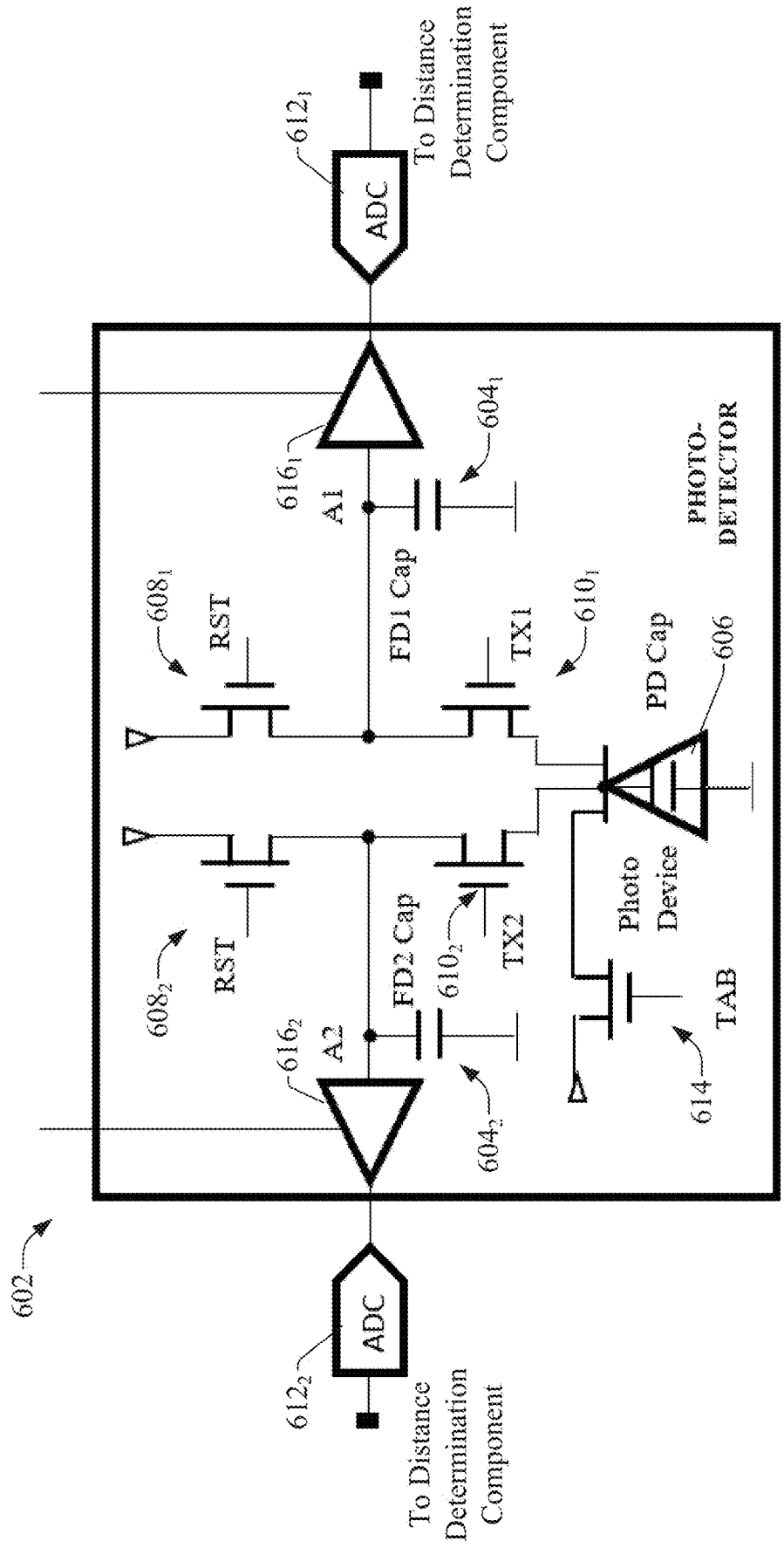
FIG. 6 is a diagram of an example architecture of a photo-detector for a TOF sensor device that includes two measuring capacitors.

The technique described above in connection with FIGS. 3-5 require multiple pulses to be received and accumulated—as well as a measurement of the received pulse amplitude—in order to accurately estimate distance. In order to generate information about the received light pulses more quickly, thereby improving sensor response time, one or more embodiments of the TOF sensor device 202 can introduce one or more additional measuring capacitors to the baseline photo-detector architecture depicted in FIG. 3. Additional measuring capacitors can also be used to collect information about ambient light conditions so that the TOF sensor device 202 can compensate for the effects of ambient light incident on the photo-receiver array. FIG. 6 is a diagram of an example architecture of a photo-detector 602 for TOF sensor device 202 that includes two measuring capacitors $604_1$ (FD1) and $604_2$ (FD2). The double measuring capacitor structure depicted in FIG. 6 allows the TOF sensor device 202 to measure and integrate two parts of the received reflected pulse—the trailing part of the pulse and the leading part of the pulse—in a single measuring cycle.

In this embodiment, nodes A1 and A2 of the two measuring capacitors $604_1$ and $604_2$ are connected to the photo device 606 via respective switches $610_1$ and $610_2$ (e.g., transistors or other types of switching devices), which are enabled by signals applied to capture control lines TX1 and TX2. When a high control signal is applied to capture control line TX1, the charge stored on the photo device 606 is transferred to measuring capacitor FD1 $604_1$. Likewise, when a high control signal is applied to capture control line TX2, the charge accumulated on the photo device 606 is transferred to measuring capacitor FD2 $604_1$.

Anti-blooming switch 614, which can also be a transistor or other type of switching device, is also connected to the photo device 606. When a high control signal is applied to anti-blooming control line TAB, the accumulated charge on the photo device 606 is cleared.

Nodes A1 and A2 are also connected to respective ADCs $612_1$ and $612_2$ via respective amplifiers $616_1$ and $616_2$. In response to an instruction from the distance determination component 208, the amount of charge stored on measuring capacitor FD1 is converted to a proportional digital value by ADC $612_1$, the amount of charge stored on second measuring capacitor FD2 is converted to a proportional digital value by ADC $612_2$, and the digital values are provided to the distance determination component 208 for processing. Although FIG. 6 depicts the measured charges on measuring capacitors FD1 and FD2 as being read and converted to digital values by ADC $612_1$ and $612_2$, some embodiments may read the amount of charge stored on the measuring capacitors using other techniques (e.g., by measuring the analog voltage values stored on the respective measuring capacitors). Also, although photo-detector 602 is illustrated as having two separate ADCs—that is, one dedicated ADC for each measuring capacitor FD1 and FD2—some embodiments may use a single ADC to read and convert the amount of charge on both measuring capacitors.

Nodes A1 and A2 are also connected to respective reset (RST) lines $608_1$ and $608_2$. When a high control signal is applied to RST $608_1$, the stored charge on measuring capacitor FD1 is cleared. When a high control signal is applied to RST $608_2$, the stored charge on measuring capacitor FD2 is cleared.

As with the photo-detector 302 described above, photo-detector 602 corresponds to a single pixel of a viewing space being monitored by TOF sensor device 202. In this regard, photo-detector 602 can be one of an array of photo-detectors 602 that make up a pixel array for the viewing space. Photo-detector 602 can be an element of photo-sensor component 206 depicted in FIG. 2.

Figure 7:
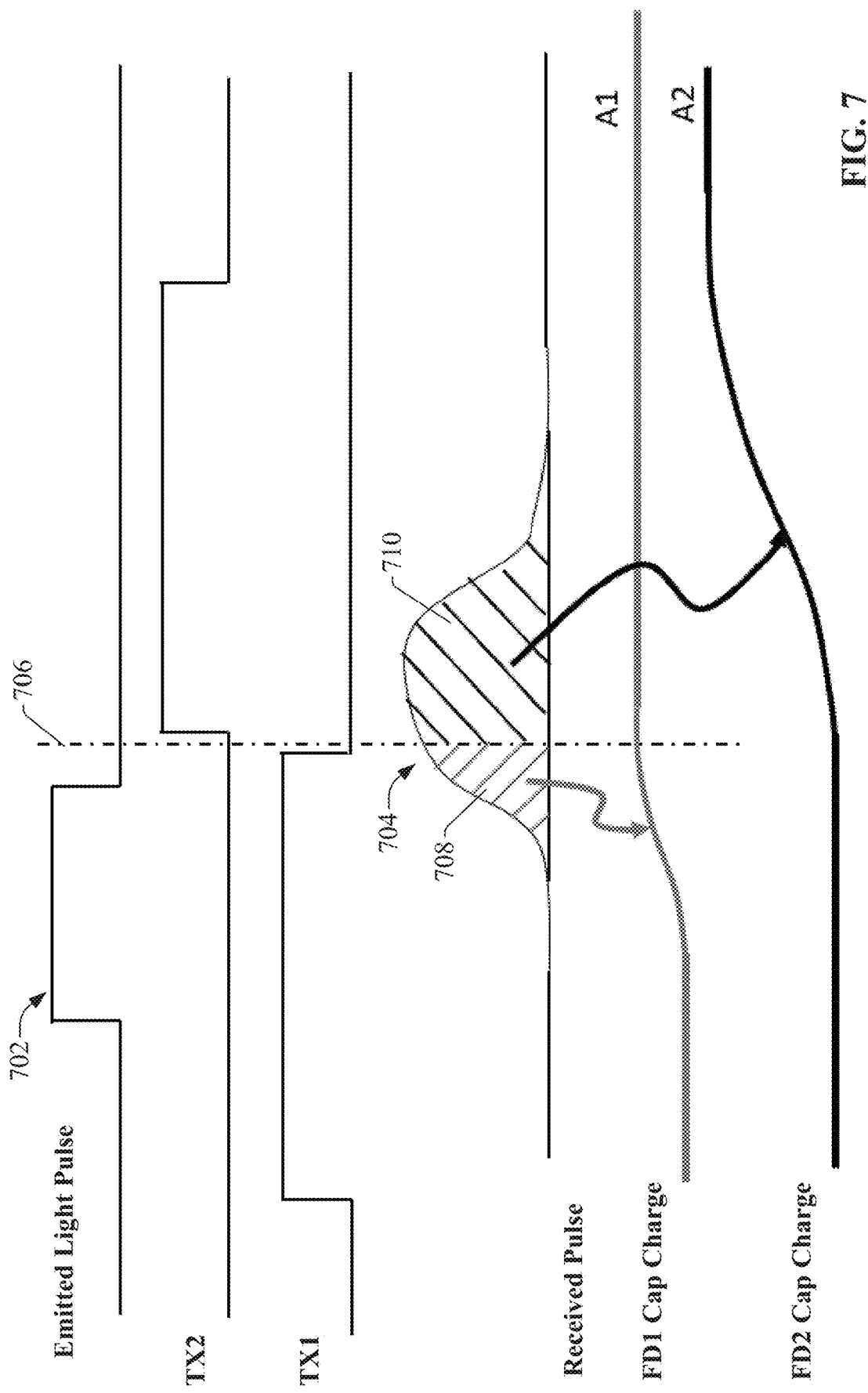
FIG. 7 is a timing diagram illustrating an example measuring sequence that can be carried out in connection with a two-capacitor photo-detector.

FIG. 7 is a timing diagram illustrating an example measuring sequence that can be carried out in connection with photo-detector 602. In contrast to photo-detector 302, which uses a single measuring capacitor 306 to capture only a trailing portion of a received light pulse (where the amount of the captured trailing portion varies as a function of the time of flight, or propagation delay, of the emitted pulse), photo-detector 602 uses the two measuring capacitors FD1 and FD2 to capture both the leading and trailing portions of the received light pulse in a single measuring cycle. That is, the trailing and leading portions of the received pulse are split between the two measuring capacitors FD1 and FD2, where the location of the split between the two portions will be a function of the propagation time of the emitted pulse. The two measurements corresponding to the captured leading and trailing portions are then used by the distance determination component 208 to determine the distance from the TOF sensor device 202 of an object or surface corresponding to the pixel, using calculation techniques to be described in more detail herein.

In FIG. 7, the Emitted Light Pulse timing chart represents the magnitude over time of the modulated light signal controlled by emitter component 204, where the emitted pulse 702 is represented by the rise in the magnitude from low to high. The TX1 and TX2 timing charts represent the timing of the controls signals applied to the TX1 and TX2 control lines (e.g., the gates of the TX1 and TX2 transistors). The Received Pulse timing chart represents the magnitude or intensity of the light received at the photo device 606 of photo-detector 602 over time. The FD1 Cap Charge and FD2 Cap Charge timing charts represent the amount of electrical charge or voltage stored on the measuring capacitors FD1 and FD2, respectively. That is, FD1 Cap Charge represents the charge or voltage on node A1 of photo-detector 602, while FD2 Cap Charge represents the charge or voltage on node A2.

Though not depicted in the timing diagram of FIG. 7, it is assumed that the anti-blooming control line (TAB 614) was pulsed with a high control signal prior to the illustrated timing sequence in order to initialize the photo device 606 by removing any previously accumulated electrical charges. The emitter component 204 of TOF sensor device 202 emits a light pulse 702 into the viewing space. In this example, to ensure that the leading portion of the reflected pulse 704 is captured by measuring capacitor FD1, the control signal of TX1 is set high prior to emission of the pulse 702. This ensures that the charges accumulated at the photo device 606 will be transferring charge to measuring capacitor FD1 when the reflected pulse 704 corresponding to emitted pulse 702 is received. The control signals applied to various control elements of photo-detector 602 can be controlled in accordance with control algorithms executed by photo-sensor component 206 or distance determination component 208, working in conjunction with the emitter component 204.

When the reflected pulse 704 corresponding to emitted pulse 702 is received at the photo-detector 602 and detected by the photo device 606, the corresponding charge accumulated in the photo device 606 is transferred to measuring capacitor FD1. Accordingly, as illustrated by the FD1 Cap Charge timing chart, the electrical charge stored on measuring capacitor FD1 increases in proportion with the magnitude of the received leading portion of reflected pulse 704 until the sampling time 706, when the control signal on TX1 goes low and the control signal on TX2 goes high. With the control signal on TX1 set low, the charge on measuring capacitor FD1 stops increasing and remains at a constant level that is proportional to the first shaded area 708 of the leading portion of reflected pulse 704, defined between the initial rise of the received pulse 704 and the sampling time 706.

The sampling time 706 can be defined relative to the time that pulse 702 is emitted. For example, TOF sensor device 202 may be configured such that the sampling time 706 occurs after a defined interval of time relative to the leading edge of emitted pulse 702 has elapsed. Alternatively, the time interval may be defined relative to the trailing edge of emitted pulse 702, such that the sampling time 706 occurs after a defined duration of time subsequent to the trailing edge of the emitted pulse 702.

Since the control signal on TX2 goes high at the sampling time 706 when the control signal TX1 goes low, the transfer of charge from the photo device 606 is redirected from measuring capacitor FD1 to measuring capacitor FD2. Thus, beginning at the sampling time 706, the charge stored on measuring capacitor FD2 begins increasing from zero until the trailing edge of the received pulse 704 has been received, or until the control signal on TX2 goes low. In the illustrated example, the electrical charge on measuring capacitor FD2 increases until the remaining trailing portion of reflected pulse 704 has been completely received, after which the charge levels off to a constant level that is proportional to the second shaded area 710 of the trailing portion of reflected pulse 704, defined between the sampling time 706 and the end of the reflected pulse 704. The control signal on TX1 goes low after a defined duration after the sampling time 706.

As demonstrated by the generalized timing diagram of FIG. 7, for each measurement cycle of a single emitted pulse, the control signals on TX1 and TX2 cause the electrical charge associated with the entire received pulse 704 to be divided into two parts—leading and trailing—which are stored separately on internal floating diffusion measuring capacitors FD1 and FD2. The pulse measuring cycle illustrated in FIG. 7 can be repeated N times for a sequence of N emitted pulses, and the leading and trailing portion charges on FD1 and FD2 can be accumulated over the multiple N pulses to obtain measurable charges on each measuring capacitor. The quantity of charge generated and transferred into the measuring capacitors depends on the strength or intensity of the illumination generated by emitter component 204, the time of exposure of the photo-detector 602 for each part of the pulse 708, and the transfer time during which the transfer from the diode of photo device 606 to the measuring capacitors is enabled. The total time of exposure is the duration of the light pulse that illuminates the scene. The intensity of the illumination depends on the amplitude of the current pulse driven into the light emitter device by the emitter component 204. The transfer time is the duration of the control signals applied to TX1 and TX2 for each pulse cycle.

At the end of the multiple pulse measuring sequence—comprising N measuring cycles having the timing depicted in FIG. 7—the accumulated charges can then be read as voltages on nodes A1 and A2 via ADCs $612_1$ and $612_2$. These voltages are proportional to the respective percentages of the leading and trailing portions of the reflected pulse 704 captured by the two measuring capacitors. The ADCs $612_1$ and $612_2$ convert the voltages to digital values, which are provided to the distance determination component and used to calculate the pulse propagation time and corresponding distance value for the pixel, using computational techniques to be described in more detail herein. In general, since the division point at which the sampling time 706 intersects with the reflected pulse 704 depends on the time at which the reflected pulse 704 is received relative to the time that pulse 702 was emitted, the ratio between the leading and trailing portions captured by measuring capacitors FD1 and FD2 can be used to calculate the propagation time of the light pulse and the corresponding distance.

While the pulse measuring cycle illustrated in FIG. 7 describes the use of two separate measuring capacitors—FD1 and FD2—to capture the respective leading and trailing portions of the reflected pulse 704, some alternative embodiments may employ only a single measuring capacitor to capture both the leading and trailing portions of the reflected pulse 704 using two different measuring sequences. In such embodiments, the single-capacitor baseline architecture depicted in FIG. 3 can be used to capture both leading and trailing portions by varying the timing of the signals and other parameters as appropriate. For example, a first measuring cycle can capture the leading portion of the pulse by controlling TX1 (the sole control line that controls transfer of charge from the photo-device to the sole measuring capacitor) using the TX1 control signal timing shown in FIG. 7, whereby the control signal is held high from a time prior to emission of the pulse 702 until the sampling time 706. This measuring cycle can be repeated for N cycles, yielding a measurable amount of charge that is proportional to the leading portion of the received pulse 704. This leading portion charge can then be read from the measuring capacitor, and the capacitor is cleared. In a subsequent measuring sequence, TX1 is controlled according to the TX2 timing shown in FIG. 7, such that the TX1 signal switches from low to high at the sampling time 706, and is held high for a defined duration that allows the trailing portion of the received pulse 704 to be captured. This measuring cycle is repeated for N cycles to yield a measurable charge proportional to the trailing portion of the received pulse 704. This trailing portion charge is then read from the measuring capacitor, and the capacitor is cleared again.

Figure 8:
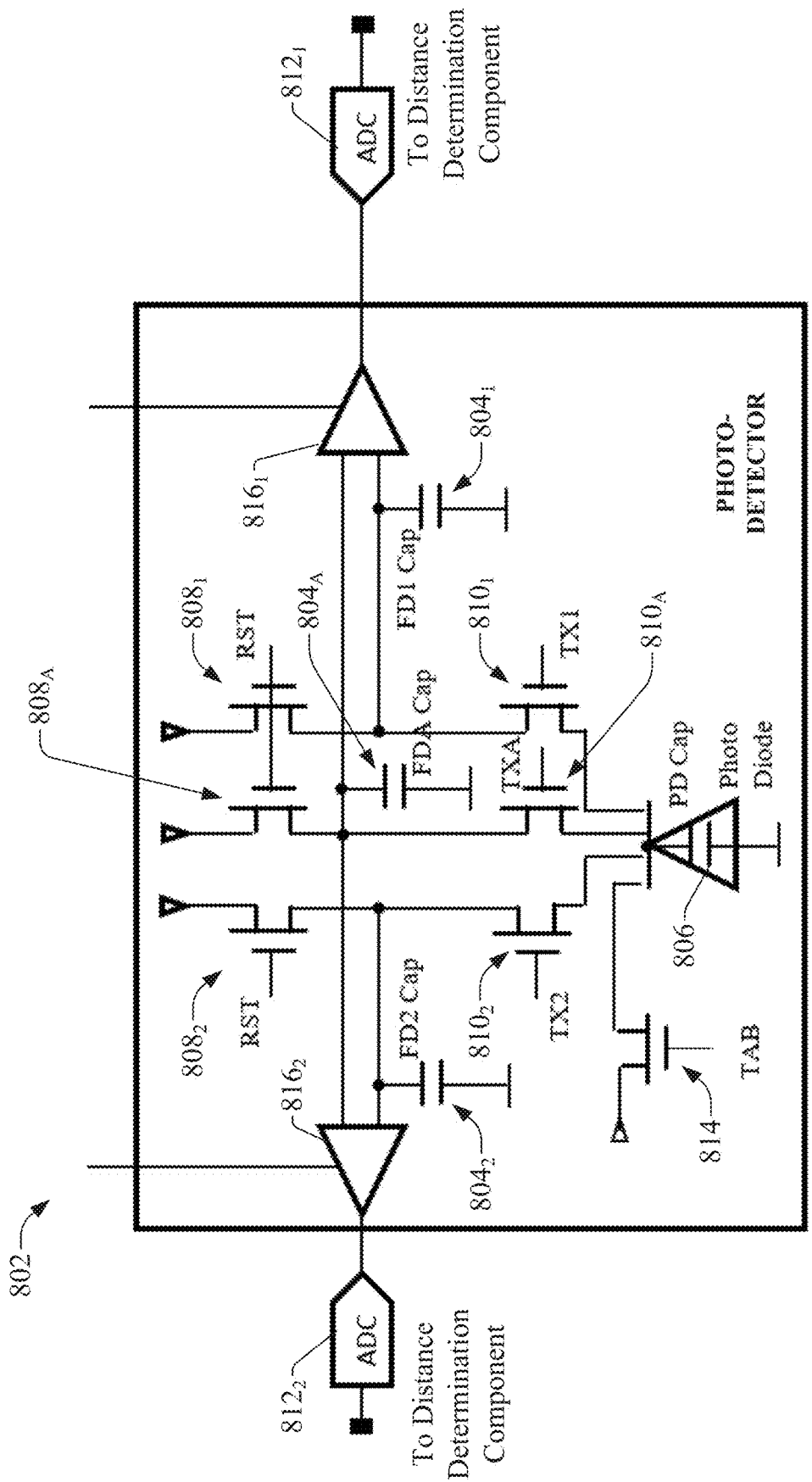
FIG. 8 is a diagram of an example architecture of a photo-detector for a TOF sensor device that includes three measuring capacitors.

In the single-capacitor (FIG. 3) and double-capacitor (FIG. 6) embodiments described above, the measured values may be influenced by the level of ambient light incident on the photo-detector. Depending on the computational method used to determine the propagation time and distance, this ambient light can affect the accuracy of the distance calculations, and therefore should be compensated for when measuring the received pulses and calculating the pulse propagation time. To compensate for the effects of ambient light, the level of ambient light can be captured by the measuring capacitors and measured. In some embodiments, this ambient light measurement can be performed by executing a separate measuring sequence without emitting any pulses. Alternatively, in some embodiments, a third measuring capacitor can be added to the baseline architecture and dedicated to ambient light measurement. FIG. 8 is a diagram of an example architecture of a photo-detector 802 for TOF sensor device 202 that includes three measuring capacitors $804_1$ (FD1) and $804_2$ (FD2), and $804_A$ (FDA). In this example, photo device 806, TAB 814, measuring capacitors FD1 $804_1$ and FD2 $804_2$, RSTs $808_1$ and $808_2$, ADCs $812_1$ and $812_2$, and switches $810_1$ and $810_2$ for control lines TX1 and TX2 have an arrangement similar to the corresponding elements of the double-capacitor configuration of photo-detector 602. Photo-detector 802 differs from the architecture of FIG. 6 by the addition of a third measuring capacitor FDA 804$_A$ and corresponding control line TXA 810$_A$, which are used to capture the level of ambient light incident on the photo device 806 so that the distance determination component 208 can compensate for this ambient light when determining pulse propagation time and object distance. A third RST line 808$_A$ is also added to allow the ambient measuring capacitor FDA to be cleared of charges. The third measuring capacitor FDA for ambient light measurement is connected to both ADCs 812$_1$ and 812$_2$ via amplifiers 816$_1$ and 816$_2$.

The triple measuring capacitor structure depicted in FIG. 8 allows ambient light to be measured in the same measuring cycle as the pulse measurements. The measured amount of ambient light can then be subtracted from the pulse measurements, either in analog prior to digital conversion by the ADCs 812$_1$ and 812$_2$, or digitally after the analog-to-digital conversion. For example, amplifiers 816$_1$ and 816$_2$ may be differential amplifiers that subtract the analog value of the stored charge on measuring capacitor FDA from the respective analog charges stored on measuring capacitors FD1 and FD2 to yield filtered analog signals. The differential amplifiers 816$_1$ and 816$_2$ can then provide these filtered signals to the respective ADCs 812$_1$ and 812$_2$ for conversion to digital values representing the leading and trailing portions of the pulse. Alternatively, amplifiers 816$_1$ and 816$_2$ can each provide both the analog ambient light value stored on measuring cap FDA as well as the respective analog pulse measurements from measuring capacitors FD1 and FD2 to the ADCs 812$_1$ and 812$_2$. Each ADC can then convert both the analog ambient light value and the analog pulse value (either leading or trailing, depending on the ADC) to digital values, and the distance determination component can subtract the digital ambient light value from each of the digital pulse values as a step of the distance calculation. In either of these ways, TOF sensor device 202 can extract pulse information based only on the captured information for the leading and trailing parts of the pulse itself without being influenced by ambient light (assuming no saturation).

Figure 9:
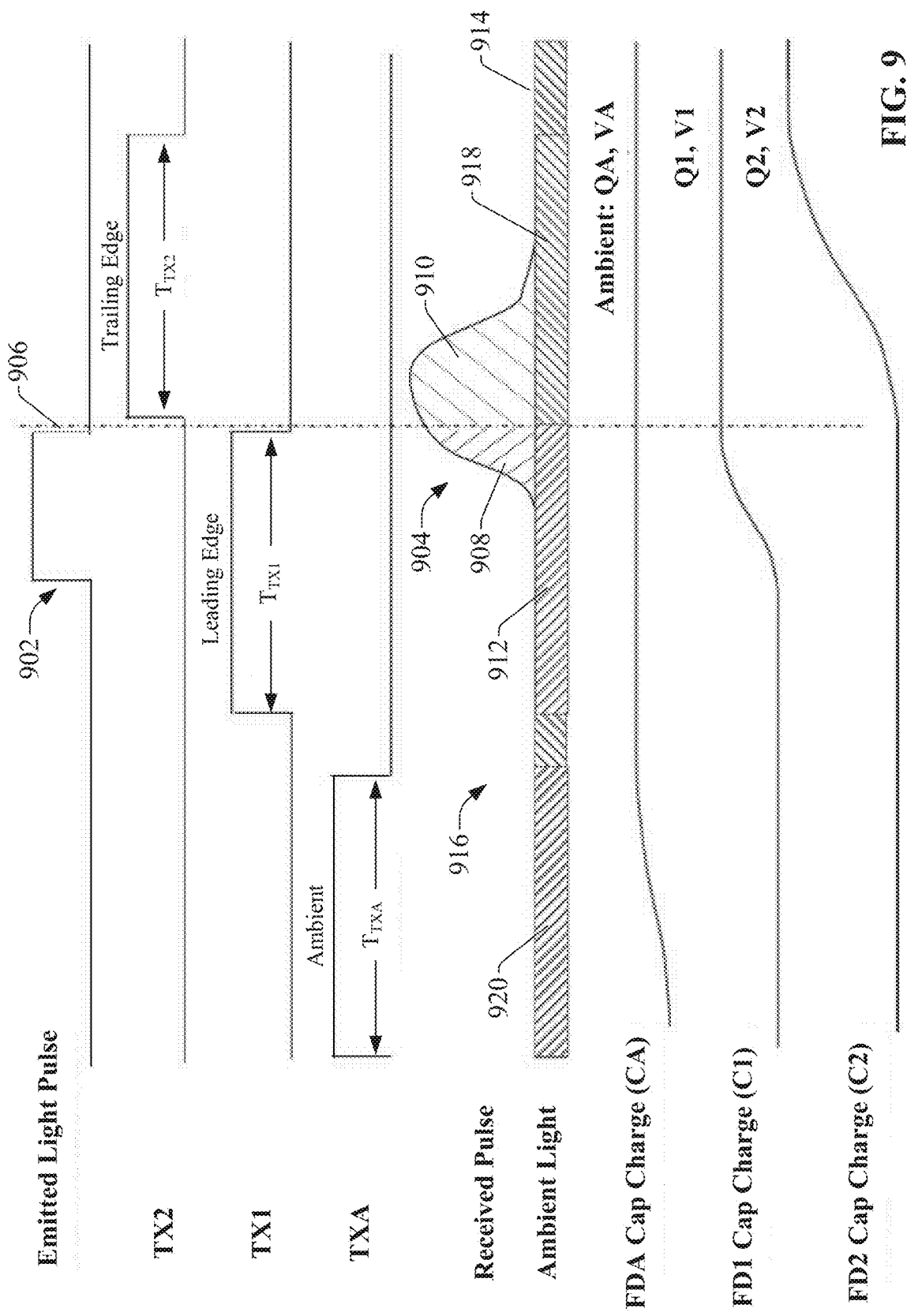
FIG. 9 is a timing diagram illustrating an example measuring sequence that can be carried out in connection with a photo-detector that includes three measuring capacitors.

FIG. 9 is a timing diagram illustrating an example measuring sequence that can be carried out in connection with photo-detector 802. Timing chart 916 represents the intensity of light received by the photo device 806. In addition to the reflected pulse 904 corresponding to emitted pulse 902, the timing chart 916 also depicts the ambient light received at the photo device 806 as a constant flat line 914 above zero (ambient light is assumed to be substantially constant in this example). It is assumed that the anti-blooming control signal to the TAB 814 has been pulsed prior to the timing shown in FIG. 9 in order to clear the photo device 806 of charges as an initialization process.

The TX1 and TX2 control signals are controlled in a manner similar to the timing chart of FIG. 7 for the two-capacitor architecture. Specifically, the TX1 control signal goes high prior to emission of pulse 902, and remains high until sampling point 906, which is set to occur a defined duration of time after the leading edge of the emitted pulse 902. While the TX1 control signal is high, the light-driven charges collected by the photo device 806 are transferred to measuring capacitor FD1. The TX1 control signal is held high for a defined duration T$_{TX1}$ and is then turned off. As illustrated by the FD1 timing chart, when the TX1 control signal goes low at the sampling point 906, charges cease transferring to measuring capacitor FD1, and the total amount of charge on FD1 levels to a value Q1 (corresponding to a voltage V1). Thus, charge Q1 (and voltage V1) is representative of the leading portion (shaded region 908) of reflected pulse 904 as well as any ambient light received by the photo-detector 802 while the TX1 control signal is high. That is, the amount of charge Q1 (or voltage V1) stored on measuring capacitor FD1 is proportional to the shaded region 912 of timing chart 916 (representing the amount of ambient light collected during the duration of the TX1 high signal) plus the shaded region 908 (representing the leading portion of the received pulse 904 without ambient light).

At the sampling point 906, the TX1 control signal goes low and the TX2 control signal goes high, causing the charges from the photo device 806 to begin transferring to the second measuring capacitor FD2. The TX2 control signal is held high for a duration T$_{TX2}$, and is then switched low. The FD2 Cap Charge timing chart illustrates the rise in the accumulated charge on measuring capacitor FD2 during this duration T$_{TX2}$. When the TX2 control signal goes low, the transfer of charge to measuring capacitor FD2 ceases, and the amount of charge on FD2 levels to a value Q2 (corresponding to voltage V2) representing the trailing portion of received pulse 904 (represented by shaded region 910) plus the amount of ambient light collected while the TX2 control signal was high (represented by shaded region 918).

In order to accurately calculate the propagation time of the light pulse and the corresponding distance, the amount of charge corresponding only to the shaded regions 908 and 910—the leading and trailing portions of the received pulse 904—must be determined. To achieve this, the amounts of charge corresponding to shaded regions 912 and 918—the amount of ambient light received during durations T$_{TX1}$ and T$_{TX2}$—must be identified and subtracted from the total amounts of charge Q1 and Q2 stored on measuring capacitors FD1 and FD2. By controlling the TX1 and TX2 control signals such that durations T$_{TX1}$ and T$_{TX2}$ are equal (T$_{TX1}$=T$_{TX2}$), it can be assumed that the amount of ambient light captured during T$_{TX1}$ and T$_{TX2}$ are approximately equal. Accordingly, if the amount of charge QA representing this amount of ambient light can be determined, this value of QA can be subtracted from both Q1 and Q2 to obtain the magnitude of the leading and trailing portions, respectively, of the received pulse 904.

The third measuring capacitor FDA is used to measure QA. As shown on the TXA timing chart in FIG. 9, prior to emission of pulse 902 (and prior to initiation of the TX1 control signal), photo-sensor component 206 turns on the TXA control signal for a set duration T$_{TXA}$. Setting the TXA control signal high while the emitter component 204 is not emitting a pulse ensures that the ambient light measurement will not be distorted by light from the emitter LED. While the TXA control signal is high, the charges accumulated at the photo device 806 are transferred to the ambient light measuring capacitor FDA. The FDA Cap Charge timing chart shows the rise in the amount of charge stored on measuring capacitor FDA as a result of the ambient light received by the photo device 806 during this duration T$_{TXA}$. When the TXA control signal goes low, the charge stored on measuring capacitor FDA levels to a constant value QA proportional to shaded region 920 of received light timing chart 916. This charge level represents the amount of ambient light incident on the photo-detector 802. To ensure that QA is approximately equal to the amount of ambient light captured during durations T$_{TX1}$ and T$_{TX2}$, duration T$_{TXA}$ is set to be equal to T$_{TX1}$ and T$_{TX2}$ (T$_{TXA}$=T$_{TX1}$=T$_{TX2}$).

Once the amount of charge QA is obtained, the amount of charge that is proportional only to the leading portion of the pulse 904 can be obtained according to $$Q_{leading} = Q1 - QA \qquad (5)$$

while the amount of charge proportional only to the trailing portion of the pulse 904 can be obtained according to $$Q_{trailing} = Q2 - QA \tag{6}$$

Alternatively, the amount of electrical energy corresponding to the leading and trailing portions can be determined using the voltages on the measuring capacitors rather than charges, as given by:

$$V_{leading} = V1 - VA \tag{7}$$

$$V_{trailing} = V2 - VA \tag{8}$$

The sum of $Q_{leading} + Q_{trailing}$ (or $V_{leading} + V_{trailing}$) represents the total pulse energy without ambient light (though is not necessarily equivalent to pulse amplitude alone).

TOF sensor device 202 can determine the values $Q_{leading}$ and $Q^{trailing}$ (or $V_{leading}$ and $V_{trailing}$) according to equations (5), (6), (7), and/or (8) either prior to conversion by the ADCs 812$_1$ and 812$_2$ using the analog values of Q1, Q2, and QA (or V1, V2 and VA) stored on the measuring capacitors, or by first converting the analog values of Q1, Q2, and QA (or V1, V2 and VA) to digital values using ADCs 812$_1$ and 812$_2$ and implementing equations (5), (6), (7), and/or (8) using the digital values. The photo-detector architecture depicted in FIG. 8 supports calculation of $Q_{leading}$ and $Q_{trailing}$ (or $V_{leading}$ $V_{trailing}$) on the analog side. As shown in FIG. 8, the measuring capacitor FDA is connected to inputs of both amplifier 816$_1$ and amplifier 816$_2$, which are differential amplifiers in this example. The measuring capacitor FD1 is connected to the second input of amplifier 816$_1$, and measuring capacitor FD2 is connected to the second input of amplifier 816$_2$. This configuration allows the amplifiers 816$_1$ and 816$_2$ to subtract the analog ambient light level QA (or VA) from the analog values Q1 (or V1) and Q2 (or V2) representing the total energy collected during the $T_{TX1}$ and $T_{TX2}$ durations. The analog outputs of amplifiers 816$_1$ and 816$_2$ are thus proportional to the pulse's leading and trailing portions, respectively. These analog outputs are provided to the ADCs 812$_1$ and 812$_2$ for conversion to digital values, which are passed to the distance determination component 208.

Figure 10:
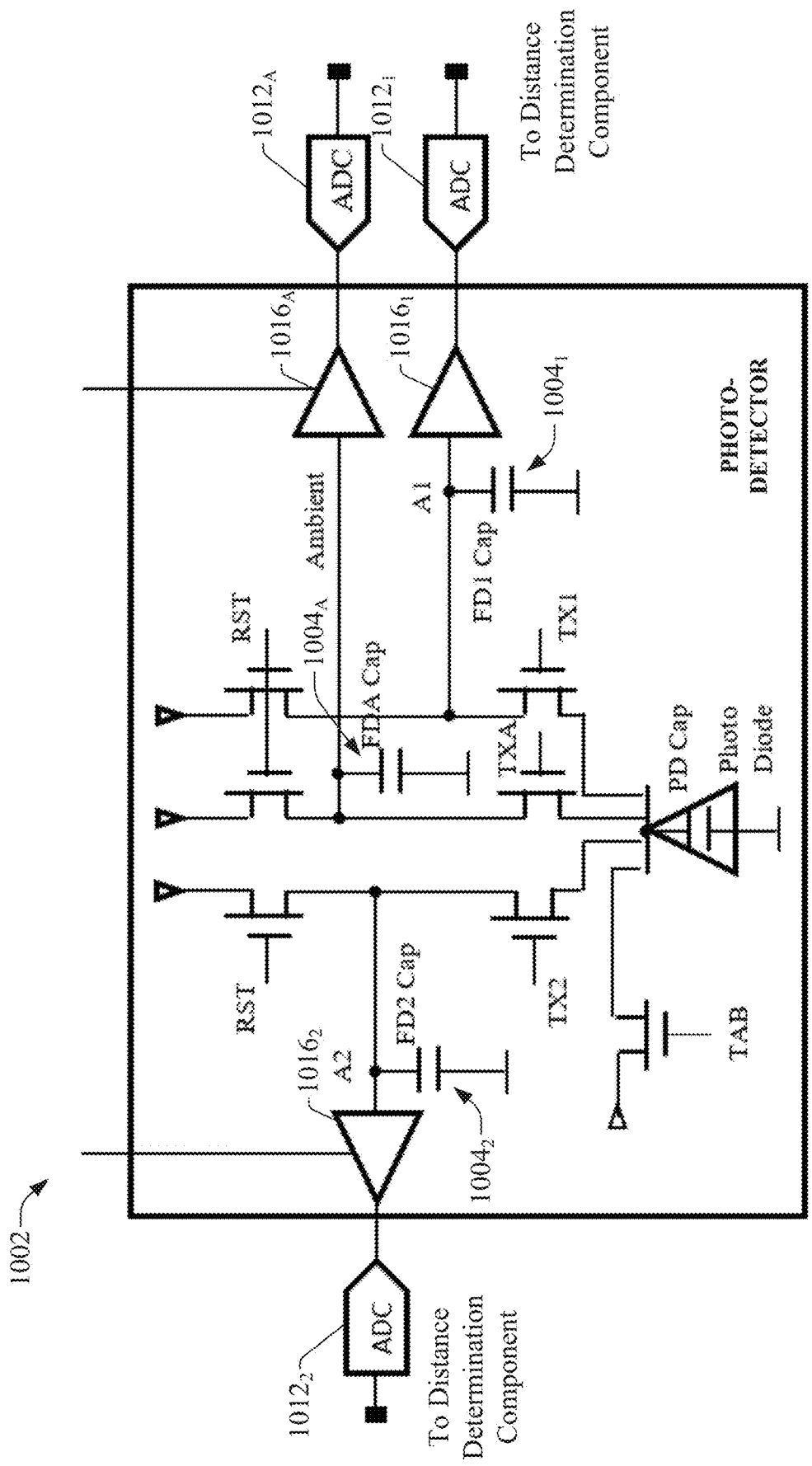
FIG. 10 is a diagram of an example architecture of a photo-detector that includes three measuring capacitors for measuring the leading portion of a pulse, the trailing portion of a pulse, and ambient light, respectively.

FIG. 10 is a diagram of an example architecture of a photo-detector 1002 that, similar to photo-detector 802, includes three measuring capacitors—1004$_1$ (FD1) and 1004$_2$ (FD2), and 1004$_A$ (FDA)—for measuring the leading pulse portions, trailing pulse portions, and ambient light, respectively. This configuration allows $Q_{leading}$ and $Q_{leading}$ (or $V_{leading}$ and $V_{trailing}$) to be calculated after digital conversion of the measured energy levels. Photo-detector 1002 differs from photo-detector 802 in that, rather than connecting measuring capacitor FDA to the same amplifiers 1016$_1$ and 1016$_2$ that measure the charges on measuring capacitors FD1 and FD2, measuring capacitor FDA is connected to a new dedicated amplifier 1016$_A$, the output of which is connected to a third ADC 1012$_A$. The outputs of ADCs 1012$_1$, 1012$_2$, and 1012$_A$ represent digital values of Q1, Q2, and QA (or V1, V2, and VA), which are used by the distance determination component 208 to calculate $Q_{leading}$, $Q_{trailing}$, $V_{leading}$, and/or $V_{trailing}$ according to equations (5), (6), (7), and/or (8).

As yet another alternative embodiment of the three-capacitor configuration, the three amplifiers 1016$_1$, 1016$_2$, and 1016$_A$ can be connected to a single common ADC, with the outputs of the three amplifiers multiplexed in time. This configuration may be suitable if component space is limited.

The use of multiple measuring capacitors as in the two-capacitor architecture of FIG. 6 or the three-capacitor architectures of FIGS. 8 and 10, allows multiple items of pulse information—leading pulse portion, trailing pulse portion, and ambient light—to be collected in a single measuring sequence. However, it is also possible to obtain the same multiple items of pulse information using the single-capacitor architecture of FIG. 3 by executing multiple consecutive measuring sequences with different timing conditions. For example, a first measuring sequence can be executed whereby ambient light is measured while the emitter remains inactive (not pulses emitted). A second measuring sequence can be executed wherein the TX1 control signal remains high during the entire width of the received pulse, thereby measuring the total pulse energy including ambient light. A third measuring sequence can the measure only the trailing portion of the pulse. With these three measured items of data, the trailing portion of the pulse can be obtained by subtracting the ambient light measurement (obtained from the first sequence) from the trailing pulse portion measurement (obtained from the third sequence). The leading portion of the pulse can be obtained by subtracting the ambient light measurement and the calculated trailing pulse portion from the total pulse energy obtained by the second measuring sequence. While requiring fewer capacitors, amplifiers, and ADCs, this technique also requires more time since three measuring sequences must be executed. The accuracy of this technique may also be susceptible to changes in ambient conditions or object location between sequences.

A number of example TOF photo-detector architectures and corresponding pulse measuring sequences are described above. Methods for estimating pulse propagation time (time of flight) and corresponding distance information based on the measured pulse information are now described. Any of the calculation techniques described below can be executed by the distance determination component 208 of TOF sensor device 202, using the data measured by any of the photo-detector architectures described above.

Two general time of flight estimation techniques are described—a ratio method and a center of mass method. The ratio method can be performed based on information collected during a single measuring sequence carried out by a three-capacitor photo-detector (e.g., photo-detector 802 or 1002). The center of mass method—which does not require ambient light compensation, is less affected by the shape of the pulse, and which may be more robust—can be performed using information collected using a minimum of two measuring sequences using a two-capacitor photo-detector (e.g., photo-detector 602). In either estimation method, the accuracy of the estimated time of flight is immune to the effects of ambient light.

Figure 11A:
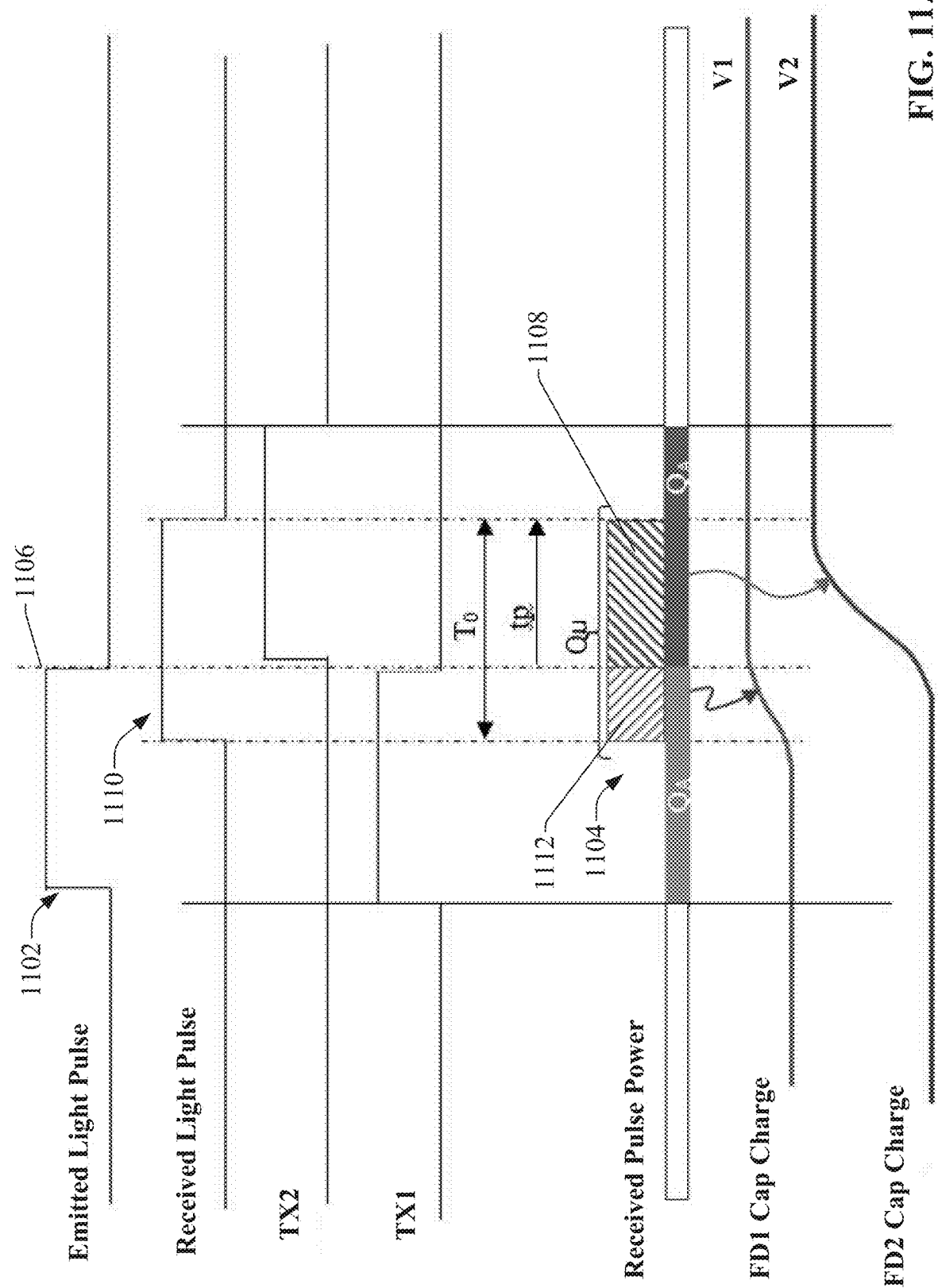
FIG. 11A is an example timing diagram illustrating the signal, received light, and measuring capacitor charge timings for measuring pulse information in accordance with a ratio method.

The ratio method for determining the propagation time (time of flight) of an emitted light pulse is now described. FIG. 11 is an example timing diagram illustrating the signal, received light, and measuring capacitor charge timings for measuring pulse information in accordance with the ratio method. A light pulse 1102 is emitted into the viewing field, and the emitted pulse is reflected and received as received light pulse 1110, which causes a corresponding pulse 1104 in the electrical power generated by the photo diode of photo device 606. The electrical energy generated in the photo diode as a result of received pulse 1110 is split into two portions—the leading portion (represented by shaded region 1112 of electrical pulse 1104) stored in measuring capacitor FD1 as voltage V1, and the trailing part (represented by shaded region 1108 of electrical pulse 1104) stored on measuring capacitor FD2 as voltage V2 (as shown in the FD1 Cap Charge and FD2 Cap Charge timing charts in FIG. 11). The split point or sampling point 1106 is defined by the falling edge of the TX1 control signal and rising edge of the TX2 control signal.

Time duration $T_0$ is the usable part of the received electrical pulse 1104; that is, the portion of the pulse 1104 between the leading and trailing edges from which pulse information can be reliably obtained. This allows a distance range coverage of:

$$\text{Range} = c \, T_0/2 \quad (9)$$

Assuming the emitted pulse 1102 is substantially rectangular (that is, flat in the middle, usable part of the electrical pulse 1104 with negligible rise and fall times at the leading and trailing edges) and the split point at the sampling point 1106 is far from the edges of the received pulse 1104, the quantity of charges transferred into measuring capacitor FD2 (having capacitance C2) varies linearly with the delay tp of the received pulse 1104, defined as the duration of time between the sampling point 1106 and the end of the usable portion of the received pulse 1104. This delay tp is also a function of the total propagation time (time of flight) of the emitted pulse.

Assuming the time reference is t=0 in the case whereby the falling edge of the pulse is just after the sampling point 1106 between the TX1 and TX2 control signals, then tp is proportional to the charge Q2 integrated into measuring capacitor FD2. Since charge Q2 is the product of capacitance C2 and voltage V2 on the measuring capacitor FD2, tp is also proportional to the output voltage V2. Similarly, the time ($T_0$–tp) is proportional to the charge Q1 stored on measuring capacitor FD1 (having capacitance C1). As such, Q1 and Q2 can be expressed by the following linear equations:

$$Q2 = C2V2 = \frac{t_p}{T_0} Qu + QA \quad (10)$$

$$Q1 = C1V1 = \frac{T_0 - t_p}{T_0} Qu + QA \quad (11)$$

where Qu is the proportionality ratio defined by:

$$Qu = C1V1 + C2V2 - 2QA \quad (12)$$

Proportionality ratio Qu, which is the amount of charge representing the sum of the leading and trailing portions of received pulse 1104 with the charge representing ambient light 2QA removed, is proportional to the sum of shaded regions 1112 and 1108 in FIG. 11. In order to obtain the value of QA, the third measuring capacitor FDA (having capacitance CA) can be used to measure the charges generated by ambient light prior to emission of light pulse 1102 (as described above in connection with FIGS. 8-10), or during a time after receipt of the reflected pulse while only ambient light is being received. Mismatch between capacitance C2 relative to C1, and between capacitances CA relative to C1, can be measured and compensated for during a calibration process to be discussed in more detail herein.

After the photo-detector has measured values for V1, V2, and VA using any of the measuring sequences described above, the measured values can be used to determine the delay tp. The amount of charge QA stored on measuring capacitor FDA, representing the measured amount of ambient light while no light pulses are being emitted, is given by:

$$QA = CA \, VA = \beta C1 VA \quad (13)$$

where CA is the capacitance of measuring capacitor FDA, C1 is the capacitance of measuring capacitor FD1, $\beta = CA/C1$ (a compensation factor that compensates for capacitance mismatch between measuring capacitors FDA and FD1), and VA is the voltage stored on measuring capacitor FDA as a result of the stored charge QA.

The amount of charge Q2 stored on measuring capacitor FD2, representing the trailing portion of the received pulse 1104 between the sampling point 1106 and the end of the usable portion of the pulse 1104, is given by:

$$Q2 = C2V2 = \alpha C1V2 \quad (14)$$

where C2 is the capacitance of measuring capacitor FD2, $\alpha = C2/C1$ (a compensation factor that compensates for capacitance mismatch between measuring capacitors FD2 and FD1) and V2 is the voltage stored on measuring capacitor FD2 as a result of the stored charge Q2.

The delay tp can then be given by:

$$t_p = \frac{\alpha V2 - \beta V_A}{V1 + \alpha V2 - 2\beta V_A} T_0 + T_S \quad (15)$$

The ratio of the propagation time tp to the total pulse duration $T_0$ is the same as the ratio of the captured trailing edge energy to the total pulse energy (leading plus trailing portions). Therefore, as given by equation (15), propagation time tp is determined by identifying the fraction of the total pulse energy without ambient light ($V1 + \alpha V2 - 2\beta V_A$) that is attributed to the measured trailing portion without ambient light ($\alpha V2 - \beta V_A$), and multiplying this fraction by the total duration $T_0$ of the pulse.

Alternatively, the value of tp can also be calculated based on the leading portion of the pulse using the value of V1:

$$T_0 - t_p = \frac{V1 - \beta V_A}{V1 + \alpha V2 - 2\beta V_A} T_0 + T_s \quad (16)$$

In this case, the ratio of the leading edge energy to the total pulse energy is the same as the ratio of ($T_0$–tp) to the total pulse duration $T_0$.

The value of tp can also be calculated based on a combination of equations (15) and (16):

$$t_p = \left(1 + \frac{\alpha V2 - V1}{V1 + \alpha V2 - 2\beta V_A}\right)\frac{T_0}{2} + T_s \quad (17)$$

With the capacitance mismatch compensation factors $\alpha$ and $\beta$ obtained via calibration (described in more detail below), obtaining the three voltage values V1, V2, and VA at the end of a measuring sequence of N pulses (integrations), as described in the foregoing examples, allows the distance determination component 208 to estimate the pulse delay time td using any of equations (15), (16), or (17) (or reasonable variations thereof). The distance determination component 208 can then use this delay value tp in equation (1) to determine the distance d of the object or surface corresponding to the pixel, as given by:

$$d = (c/2) t_p \quad (18)$$

While the calculation techniques represented by equations (15), (16), or (17) rely on a substantially rectangular pulse with negligible rise and fall times, these calculation methods can be generalized for cases in which the rise time and fall times of the received pulse are not negligible, or when the pulse has an irregular non-rectangular shape, as will be described in more detail herein.

As noted above, equations (15), (16), or (17) rely on compensation factors β and α, which represent the capacitance ratios CA/C1 and C2/C1, respectively. While the capacitances of the three measuring capacitors FD1, FD2, and FDA are ideally equal (which would make the compensation factors β and α equal to 1), there is a likelihood of mismatch between the capacitances, which can be measured and compensated for in equations (15)-(17). Therefore, in one or more embodiments, the TOF sensor device 202 can include a calibration component 210 (see FIG. 2) configured to calibrate the relative values of measuring capacitors FD1 and FD2. The calibration component 210 can calibrate these relative values using two measuring cycles per measuring capacitor, yielding a total of four data points—(V1a, V1b) for measuring capacitor FD1, and (V2a, V2b) for measuring capacitor FD2.

Figure 12:
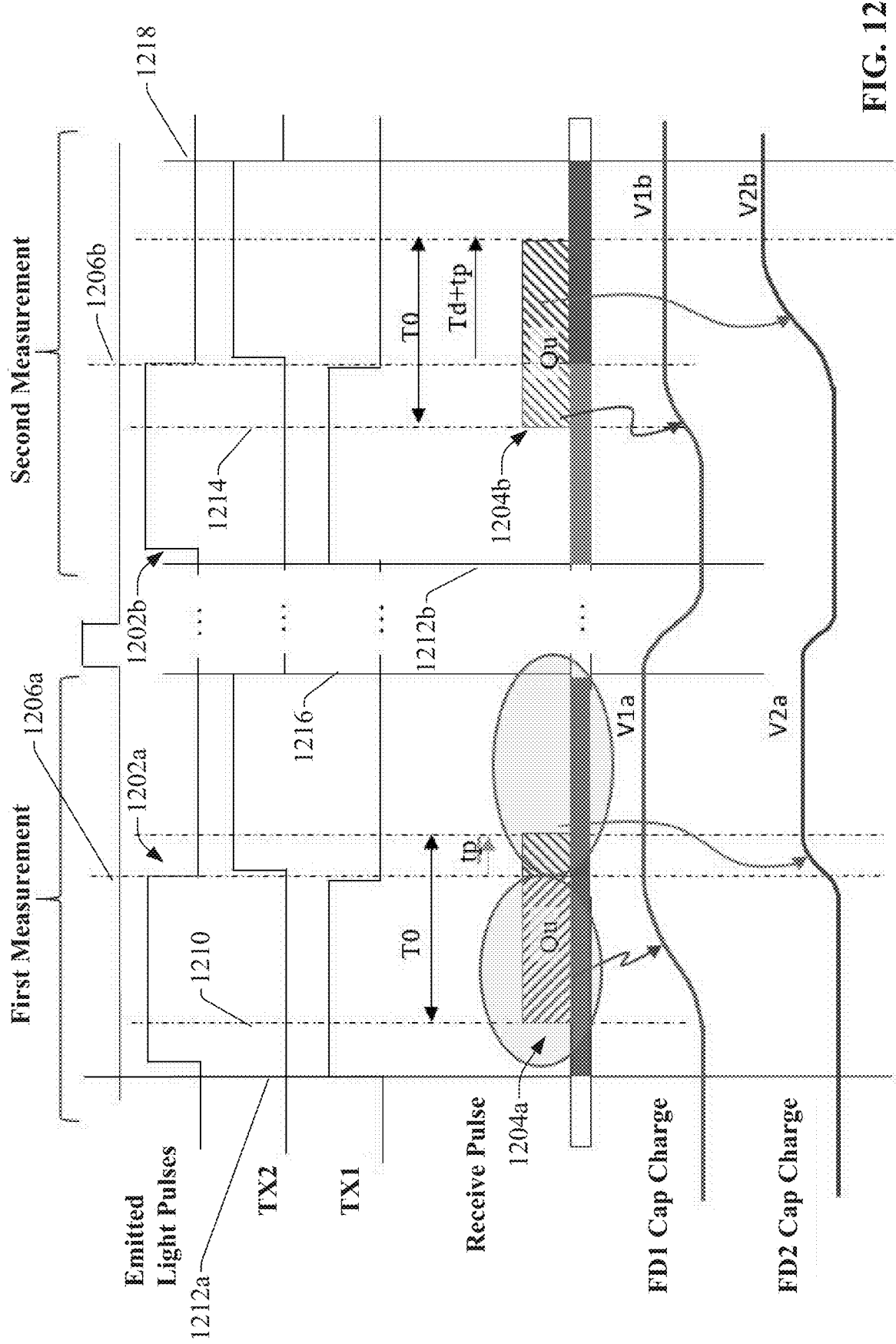
FIG. 12 is a timing diagram illustrating measurement of four calibration data points during a calibration sequence for compensating for mismatches in capacitance.

FIG. 12 is a timing diagram illustrating measurement of these four calibration data points during the calibration sequence. The timings of the TX1 and TX2 control signals, as well as the timing of emission of light pulses 1202a and 1202b, can be controlled by calibration component 210, in coordination with emitter component 204 and photo-sensor component 206. In this example sequence, two light pulses 1202a and 1202b corresponding to two consecutive measurement cycles are emitted by emitter component 204, resulting in two reflected pulses 1204a and 1204b received at photo-sensor component 206. The first measuring cycle begins at time 1212a, and the second measuring cycle begins at time 1212b (where a measurement and a reset is performed at the end of the first measuring cycle at time 1216, and another measurement and reset is performed at the end of the second measuring cycle at time 1218). For each reflected pulse 1204a and 1204b, the TX1 and TX2 control signals are controlled to capture charges corresponding to the leading and trailing portions of the pulse in measuring capacitors FD1 and FD2, using a control signal timing similar to that described in previous examples. Although FIG. 12 depicts only a single pulse being emitted and received within each measuring sequence for clarity, some embodiments may emit and receive multiple pulses within each measuring cycle, performing an accumulation and measurement over a sequence of N pulses within each sequence.

For the measurement of the first received pulse 1204a during the first measuring cycle, the sampling point 1206a is set to occur after a first defined duration after the start time 1212a of the first measuring cycle. As shown in the FD1 Cap Charge and FD2 Cap Charge timing charts, the leading portion of the first received pulse 1204a is stored on measuring capacitor FD1 as value V1a, and the trailing edge of the received pulse 1204a is stored on measuring capacitor FD2 as value V2a. These values can be read out and stored by the calibration component 210 prior to the beginning of the second measuring cycle.

In general, the charge Q1 on measuring capacitor FD1 can be given as:

$$Q1 = C1V1 = \frac{T_0 - t_p}{T_0} Qu + QA \quad (19)$$

As noted above, the charge Qu is the amount of charge representing the sum of the leading and trailing portions of received pulse, not including ambient light. The amount of this charge Qu that is proportional to the leading portion of the pulse 1204a is a fraction of Qu corresponding to a ratio of the leading part time duration ($T_0$–tp) to the total duration of the pulse $T_0$. Adding the ambient light charge QA to this fraction of Qu yields the total charge Q1 (or C1V1), as given by equation (18).

The voltage level V1 corresponding to this charge can be given as:

$$V1 = -\frac{QA}{C1T_0} t_p + \frac{QA + Q_u}{C1} \quad (20)$$

The charge Q2 on measuring capacitor FD2 can be given as:

$$Q2 = C2V2 = \frac{t_p}{T_0} Qu + QA \quad (21)$$

The voltage level V2 corresponding to this charge can be given as:

$$V2 = \frac{Q_u}{C2T_0} t_p + \frac{QA}{C2} \quad (22)$$

Given these relationships, the captured charges Q1a and Q2a corresponding to the leading and trailing portions of the first pulse 1204a captured during the first measuring cycle of the calibration sequence are given by:

$$Q1a = C1V1a = \frac{T_0 - t_p}{T_0} Qu + QA \quad (23)$$

$$Q2a = C2V2a = \frac{t_p}{T_0} Qu + QA \quad (24)$$

and the charge Qu corresponding to ambient light is given by:

$$Qu = C1V1a + C2V2a - 2QA \quad (25)$$

After the first measurement, the calibration component 210 can record the values of V1a and V2a, then clear the charges from the measuring capacitors FD1 and FD2 prior to emission of the second light pulse 1202b in order to initialize the measuring capacitors for the second measuring cycle.

For the second measuring cycle (beginning a time 1212b), the second pulse 1202b is emitted at a delayed time Td within the measuring cycle relative to the time of emission of the first pulse 1202a with the first measuring cycle. That is, whereas the time 1210 of the leading edge of the first pulse 1202a occurs a first duration after the start time 1212a of the first measuring cycle, the time 1214 of the leading edge of the second pulse 1202b occurs a delayed time Td longer than the first duration after the start time 1212b of the second measuring cycle, where Td is a fraction of the pulse period $T_0$. As a result of this delay, the sampling point 1206b for the second measuring sequence—which occurs at the same time relative to the start time 1212b of the second measuring sequence as the first sampling point 1206a relative to the start time 1212a of the first measuring sequence—splits the second received pulse 1204b at a time Td sooner than the split of the first received pulse 1204a by the first sampling point 1206a of the first measuring cycle. Thus, as shown in FIG. 12, sampling point 1206a of the first measurement occurs at a time tp prior to the end of the usable part of the trailing portion of the first received pulse 1204a, and sampling point 1206b occurs at a time (Td+tp) prior to the end of the usable part of the trailing portion of the second received pulse 1204b.

For the second measuring cycle, captured charges Q1a and Q1b corresponding to the leading and trailing portions of the second pulse 1204b of the calibration sequence are given by:

$$Q1b = C1V1b = \frac{T_0 - t_p - T_d}{T_0}Qu + QA \quad (26)$$

$$Q2b = C2V2b = \frac{t_p + T_d}{T_0}Qu + QA \quad (27)$$

and the charge Qu corresponding to ambient light is given by:

$$Qu = C1V1b + C2V2b - 2QA \quad (28)$$

From equations (23)-(28), the ratio α between capacitances C1 and C2 of the measuring capacitors FD1 and FD2 can be determined using the capture values V1a, V1b, V2a, and V2b according to:

$$\alpha = \frac{C2}{C1} = \frac{V1a - V1b}{V2b - V2a} \quad (29)$$

Calibration component 210 can determine this mismatch ratio α according to equation (29), and provide the calibrated ratio to distance determination component 208 for use in any of equations (15)-(17). In various embodiments, calibration component 210 can be configured to perform the calibration sequence described above during a designated calibration sequence that occurs once (e.g., during a power-up sequence of TOF sensor device 202 or in response to initiation of the sequence by the user), or that occurs periodically in order to update the mismatch ratio α during operation (e.g., periodically or during measurement sequences).

The measurement and calculation technique described above in connection with FIG. 11 demonstrates the ratio method for estimating time of flight and generating distance information using the photo-detector architectures described herein. The center of mass method, an alternative technique to the ratio method for determining time of flight using these photo-diode architectures, is now discussed. As noted above, the center of mass method can be performed using information collected from a minimum of two measuring sequences using a two-capacitor photo-detector (e.g., photo-detector 602). The center of mass technique can be particularly suitable for achieving good distance estimation precision when long light pulses are used, or when the pulse shape is not substantially rectangular (i.e., if the received pulse has a significantly long rise time and/or fall time). The center of mass technique does not require ambient light to be measured, making this technique suitable for the two-capacitor photo-detector architecture illustrated in FIG. 6.

Figure 13A:
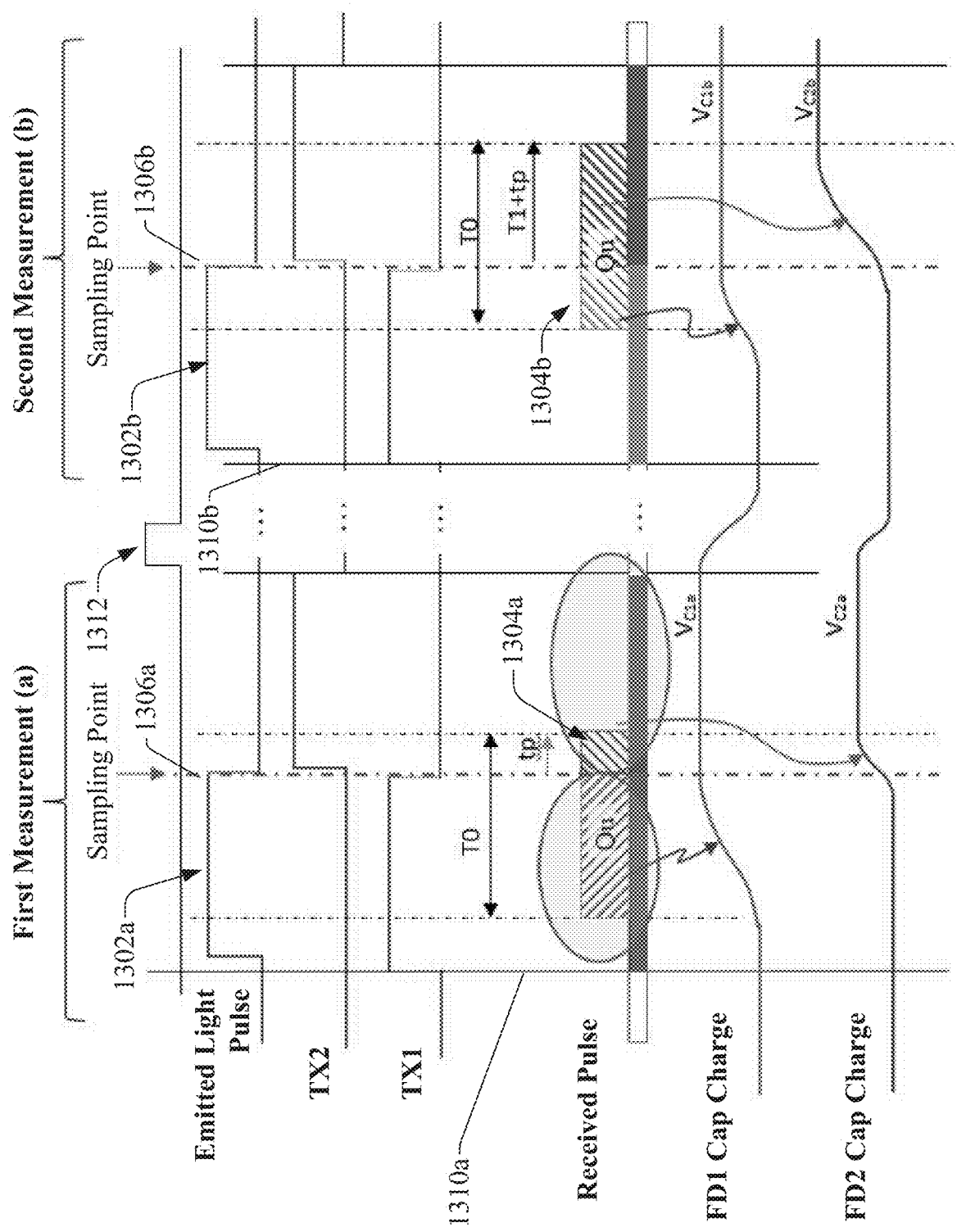
FIG. 13A is an example timing diagram illustrating the signal, received light, and measuring capacitor charge timings for measuring pulse information in accordance with a center of mass method.

FIG. 13A is an example timing diagram illustrating the signal, received light, and measuring capacitor charge timings for measuring pulse information in accordance with the center of mass method. In this example timing, two measuring sequences are carried out. In the first measuring sequence, pulse 1302a is emitted, and the charges generated by the corresponding received pulse 1304a are split into leading and trailing portions between measuring capacitors FD1 and FD2, as described in previous examples (see, e.g., FIG. 7 and the corresponding description).

At the end of this first measuring sequence, the voltage $V_{c1a}$ on measuring capacitor FD1 and $V_{c2a}$ on measuring capacitor FD2 represent the leading and trailing portions, respectively, of received pulse 1304a relative to the time 1306a of the sampling point (including any ambient light also collected during the leading and trailing portion measurements). During the first measuring sequence, light pulse 1302a may be emitted N times, with the leading and trailing portions of the corresponding received pulse 1304a being integrated over N measuring cycles to yield measurable values of $V_{c1a}$ and $V_{c2a}$. Each cycle begins at time 1310a, when the TX1 control signal goes high. For each of these N cycles, pulse 1302a is emitted after a fixed time delay after the start time 1310a of the cycle, such that the time 1306a of the sampling point occurs at a time tp prior to the trailing edge of the usable portion of the received pulse 1304a (for clarity, the timing diagram illustrated in FIG. 13A assumes that N=1, such that only a single measuring cycle is performed prior to initiation of the second measuring sequence). As in previous examples, the timing of the emitted pulse 1302a and the TX1 and TX2 control signals can be controlled by the emitter component 204 and photo-sensor component 206, respectively.

Prior to the second measuring sequence, the voltage values $V_{c1a}$ and $V_{c2a}$ are recorded by the distance determination component 208 (e.g., by reading the voltage values via amplifiers $616_1$ and $616_2$ and ADCs $612_1$ and $612_2$), and the stored charges on the measuring capacitors are cleared by setting a rest pulse 1312 on the RST lines. For the second measuring sequence, which begins at time 1310b when the TX1 control signal goes high, light pulse 1302b is emitted, and the leading and trailing portions of the charge generated by the corresponding received pulse 1304b are accumulated in measuring capacitors FD1 and FD2 as voltages $V_{c1b}$ and $V_{c2b}$, respectively, as described in previous examples. As in the first measuring sequence, pulse 1302b can be emitted N times, resulting in N measuring cycles. For each of the N cycles of this second measuring sequence, pulse 1302b is emitted later in the cycle relative to the first pulse 1302a by a delay time $T_1$ (which is less than the total period $T_0$ of the received pulse 1304b). That is, if pulse 1302a is emitted at after a time duration x has elapsed after the leading edge of the TX1 signal of the first measuring cycle, pulse 1302b is emitted after a time duration $(x+T_1)$ has elapsed after the leading edge of the TX1 signal of the second measuring cycle. This causes the sampling time 1306b to occur at a time $(T_1+tp)$ prior to the trailing edge of the received pulse 1304b. At the end of the N measuring cycles, the distance determination component 208 reads the voltage values $V_{c1b}$ and $V_{c2b}$. The voltage values represent the leading and trailing portions of the received pulse 1304b as divided by the sampling point defined by time 1306b.

Figure 14:
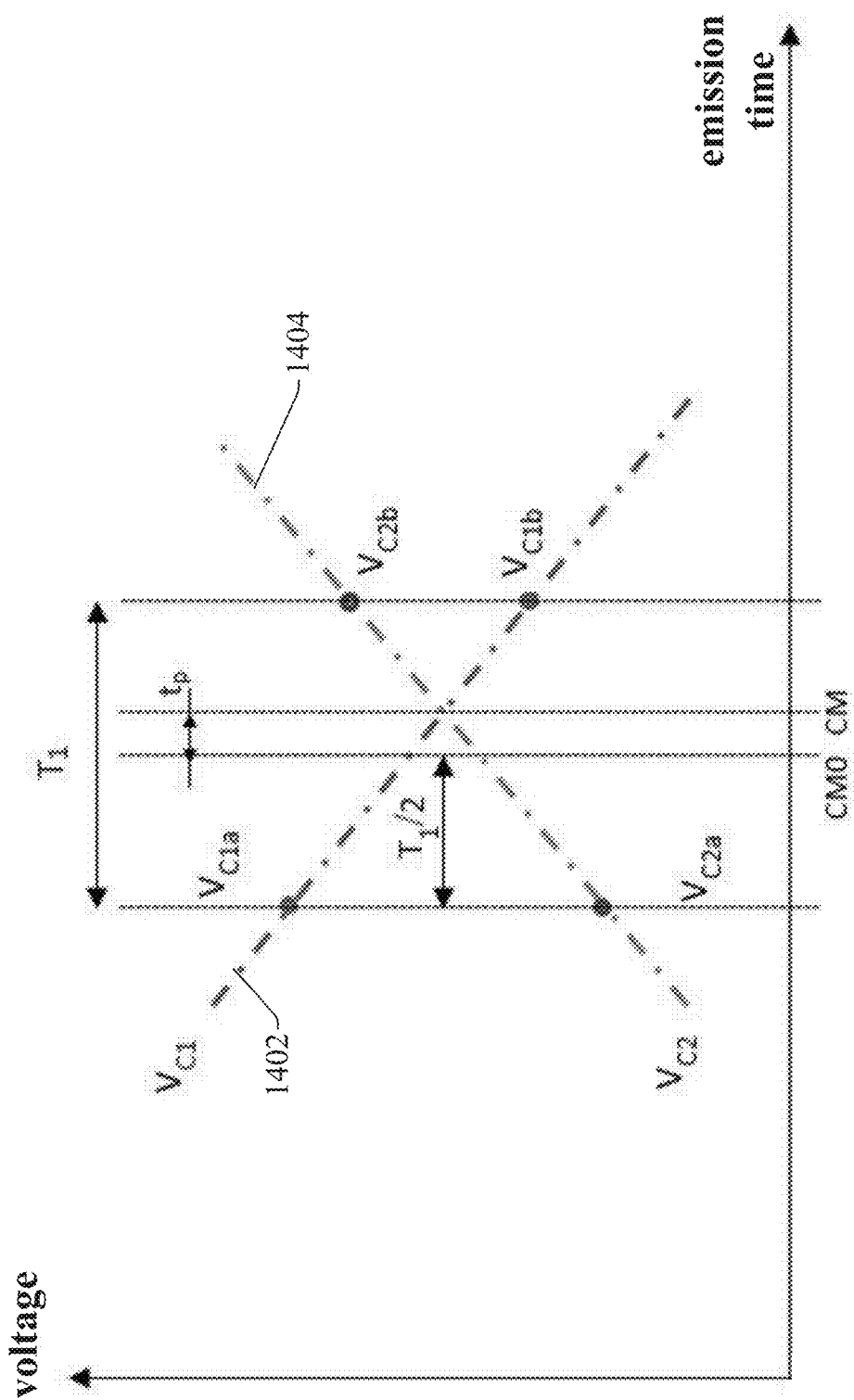
FIG. 14 is a chart plotting four measured voltages as a function of an emission time of a pulse relative to the start of a measuring sequence.

FIG. 14 is a chart plotting the four measured voltages $V_{c1a}$, $V_{c2a}$, $V_{c1b}$, and $V_{c2b}$ as a function of the emission time the pulse relative to the start of the measuring sequence. Since the voltage levels respectively associated with the leading and trailing portions of the pulse vary linearly as a function of the emission time relative to the start of the measuring sequence, a straight line 1402 connecting voltage data points $V_{c1a}$ and $V_{c1b}$ (the measured leading portions for the two measuring sequences) represents the leading portion voltage as a function of pulse emission time. Similarly, a straight line 1404 connecting voltage data points $V_{c2a}$ and $V_{c2b}$ represents the trailing portion voltage as a function of the pulse emission time.

The distance in the x-axis direction between the data points of the first measuring sequence ($V_{c1a}$, $V_{c2a}$) and the data points of the second measuring sequence ($V_{c1b}$ and $V_{c2b}$) is the time delay $T_1$. The time difference between the mid-point (CM0) of this duration $T_1$ and the intersection point (CM) between lines 1402 and 1404 is taken to be the delay tp (the time between the sampling point of the first measuring sequence and the trailing edge of the pulse 1304a).

Accordingly, distance determination component 208 can calculate the time of flight tp using measured voltages $V_{c1a}$, $V_{c2a}$, $V_{c1b}$, and $V_{c2b}$, according to $$t_p = \frac{(V_{c1a} - V_{c2a}) - (V_{c2b} - V_{c1b})}{(V_{c1a} - V_{c2a}) + (V_{c2b} - V_{c1b})} \frac{T_1}{2} \quad (30)$$

where $T_1$ is the time difference between the two emitted pulses 1302a and 1302b relative to the sampling point, and tp is the time of flight of the pulse. Equation (30) can also be written as $$t_p = \frac{\Delta V_{ca} - \Delta V_{cb}}{\Delta V_{ca} + \Delta V_{cb}} \frac{T_1}{2} \quad (31)$$

where $$\Delta V_{ca} = (V_{c1a} - V_{c2a}) \quad (32)$$

and $$\Delta V_{cb} = (V_{c2b} - V_{c1b}) \quad (33)$$

Note that $(V_{c1a} + V_{c2a}) = (V_{c2b} + V_{c1b})$, and $(V_{c1a} - V_{c1b}) = (V_{c2b} - V_{c2a})$.

More generally, the time of flight can be determined using the center of mass method based on the following base formula:

$$t_p = \frac{T_{sb} + T_{sa}}{2} + \frac{(V_{c1a} - V_{c2a}) - (V_{c2b} - V_{c1b})}{(V_{c1a} - V_{c2a}) + (V_{c2b} - V_{c1b})} \frac{T_1}{2} \quad (34)$$

where $T_1 = T_{sb} - T_{sa}$, and $T_{sa}$ and $T_{sb}$ are the times of the two sampling points 1306a and 1306b.

In equations (30), (31), and (34), differential $\Delta V_{cb} = (V_{c2b} - V_{c1b})$ is the voltage differential between the trailing portion voltage and the leading portion voltage for the second measuring sequence, and differential $\Delta V_{ca} = (V_{c2a} - V_{c1a})$ is the voltage differential between the trailing portion voltage and leading portion voltage for the first measuring sequence. Obtaining the ratio of the difference between these two voltage differentials to the sum of the two voltage differentials, and multiplying this ratio by half the delay $T_1$ yields the propagation time tp for the pulse. In general, the propagation time tp is determined based on an amount by which the difference between the leading and trailing portions changes between the first measuring cycle and the second measuring cycle.

Once the distance determination component 208 has calculated a value of tp based on equation (31) (or variations thereof), the distance determination component 208 calculates distance associated with the pixel (that is, the distance of an object or surface within the viewing space corresponding to the photo-detector's pixel) using this value of tp as the propagation time tin equation (1). The possible distance range using the center of mass method is +/−dr relative to center of range, or +/−$T_1$/2 in time.

Equations (31) and (34) assume that the capacitances C1 and C2 of the measuring capacitors are equal. However, in some cases the capacitances may differ, but the difference can be measured as a ratio $\alpha = C2/C1$ using the calibration process described above and applied as a correction factor (e.g., by multiplying Vc2a and Vc2b in equations (31) and (34) by calibration factor $\alpha$).

Since the center of mass technique is based on the differentials between the leading and trailing portion voltages, and in particular the ratio of these differentials between the first and second measuring sequences, the inclusion of ambient light in measured voltages $V_{c1a}$, $V_{c2a}$, $V_{c1b}$, and $V_{c2b}$ does not adversely affect the accuracy of the tp calculation. Since the portions of the voltages attributable to ambient light can reasonably be assumed to be the same for all four voltages, the presence of this ambient light voltage in all four voltage data points does not change the differentials between the leading and trailing portions.

The ratio and center of mass techniques described above assumes a substantially rectangular light pulse. For scenarios in which the shape of the received light pulse is not rectangular, there is no direct formula to express the pulse time of flight based on the V1 and V2 measurements. However, in some embodiments in which a non-rectangular or irregularly shaped light pulse is used, the TOF sensor device 202 can use a variation of the ratio method that relies on knowledge of the pulse shape acquired during a calibration or teaching process. In such embodiments, the pulse shape can be stored as a normalized look-up table, or in any other suitable format. In particular, the calibration component 210 can store the integral of the pulse as measured from measuring capacitors FD1 and FD2 for different integration times.

This variation of the ratio method can be used with the three-capacitor configuration depicted in FIG. 8 or 10. As described above in connection with those three-capacitor configurations, measured values of V1, V2, and VA—representing the measured leading, trailing, and ambient portions of the received pulse—are obtained using the signal timing described above in connection with FIG. 9 (though in contrast to that example, the emitted and received pulse is assumed to be an irregular, non-rectangular pulse). From these values of V1, V2, and VA, the distance determination component 208 (or the photo-sensor component 206) can derive normalized values v1 and v2 as follows:

$$v1 = \frac{V1}{V1 + \alpha V2 - 2\beta V_A} \quad (35)$$

$$v2 = \frac{\alpha V2}{V1 + \alpha V2 - 2\beta V_A} \quad (36)$$

Since equations (35) and (36) normalize the measured voltages V1 and V2 as fractions of the total leading and trailing portion voltages attributable to the pulse (without ambient light), v1+v2=1 due to the normalization.

Figure 15:
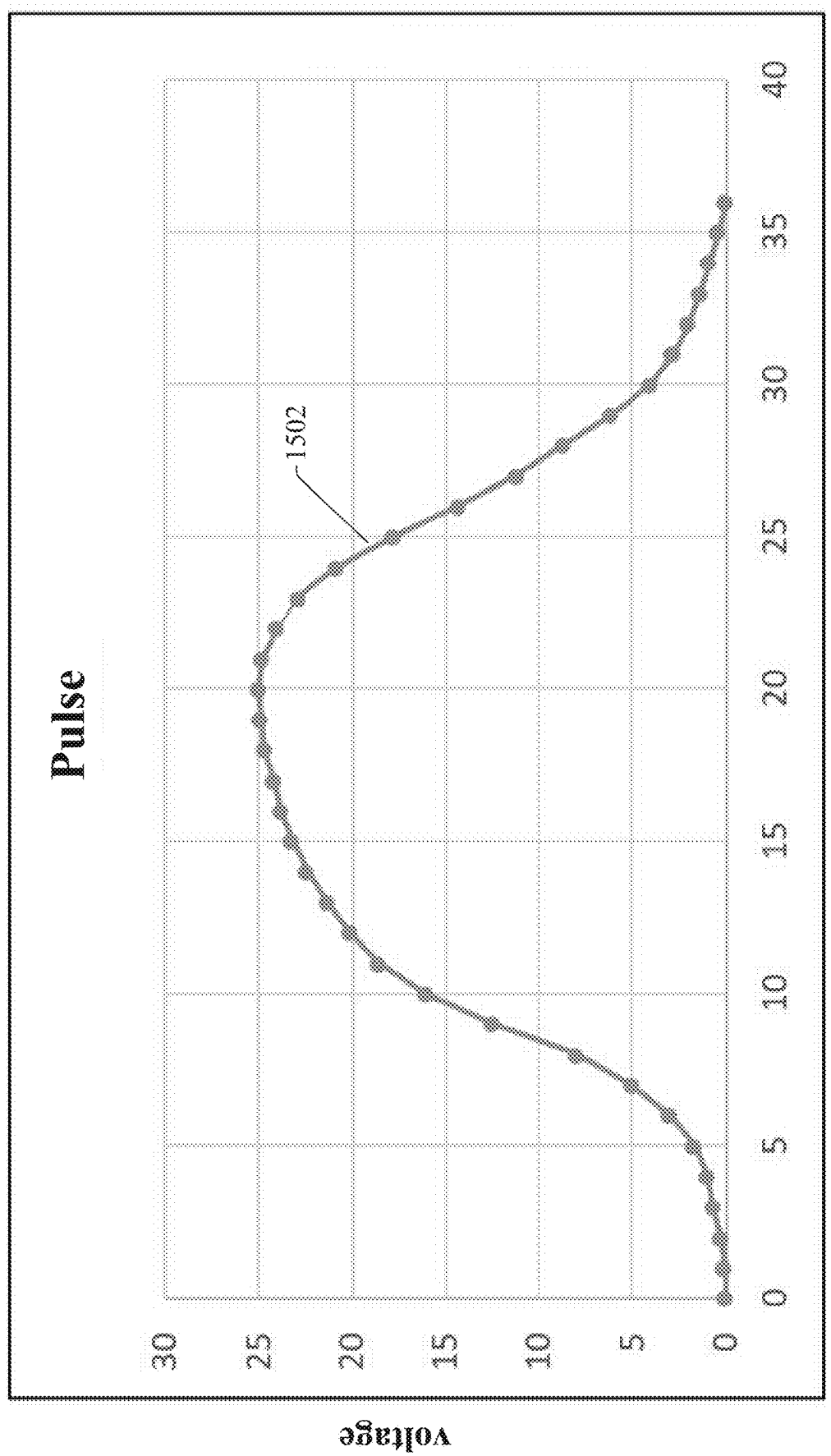
FIG. 15 is a plot representing a light pulse shape reference.
Figure 16:
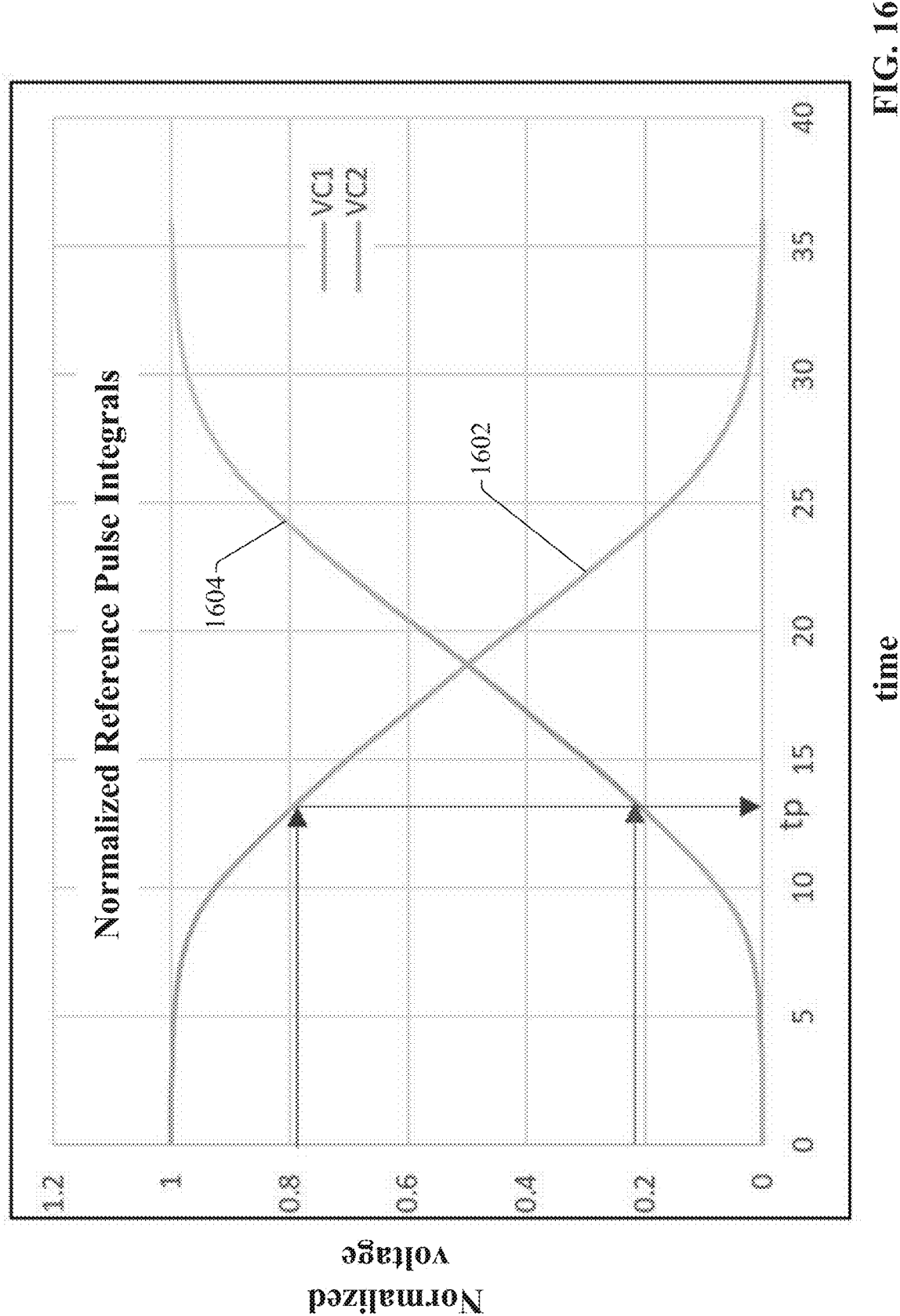
FIG. 16 is a plot representing normalized reference pulse integrals of the reference pulse plot of FIG. 15.

FIG. 15 is a plot representing a light pulse shape reference. The data points 1502 represent values of the measuring capacitor voltage (proportional to the intensity or magnitude of the received light pulse) as a function of time. FIG. 16 is a plot representing normalized reference pulse integrals of the reference pulse plot of FIG. 15, where plot 1602 represents normalized voltages v1 corresponding to measuring capacitor FD1 (having capacitance C1) as a function of propagation time tp, and plot 1604 represents normalized voltages v2 corresponding to measuring capacitor FD2 (having capacitance C2) as a function of propagation time tp. These normalized values of v1 and v2 can be stored (e.g., on memory 218) as a look-up reference table or in another suitable format. As shown in FIG. 16, the distance determination component 208 can determine the time position of the received pulse from either v1 or v2 by calculating one or both of v1 or v2 using equations (35) and/or (36), and determining the value of tp corresponding to v1 and/or v2 by referencing this look-up table. Since the data stored in the reference look-up table does not require the light pulse to be rectangular, this variation of the ratio method can be used for embodiments of TOF sensor device 202 that use irregular, non-rectangular pulses.

In some embodiments, plots 1602 and/or 1604 can be obtained through measurement and entered into TOF sensor device 202 (e.g., via user interface component 214)

A variation of the center of mass calculation method that can be used with non-rectangular pulses is now described. When the shape of the received light pulse is not rectangular, the integral of the pulse is not linear and there is no direct formula to express the pulse time of flight based on the V1$a$, V2$a$ and V1$b$, V2$b$ measurements discussed above. Consequently, as with the alternative ratio method described above, predefined knowledge of the pulse shape acquired during a calibration or teaching sequence can be relied upon to determine time of flight tp. To this end, the integral of the pulse shape can be stored (e.g., on memory 218) as normalized look-up table data, which can be referenced by distance determination component 208 to situate the pulse (delay) relative to the trigger point.

The values of the measurement points (V1$a$, V2$a$ and V1$b$, V2$b$) relative to the corresponding point on the reference (normalized) integral curve is dependent upon the pulse amplitude (or gain factor) and on bias due to ambient light. This can be described by $$V = kv + V_A \qquad (37)$$

where V is the measured voltage (e.g., V1$a$, V2$a$, V1$b$, or V2$b$), k is the amplitude or gain factor of the pulse, v is the normalized voltage (ranging from 0 to 1), and $V_A$ is the voltage corresponding to the level of ambient light. Note that k and $V_A$ will be the same for each of the four measured voltages V1$a$, V2$a$, V1$b$, and V2$b$.

There are three unknowns to be resolved or eliminated in order to calculate tp—ambient light level, pulse amplitude k and the pulse delay tp itself. The process for estimating the pulse delay tp is the process of minimizing the distance d of the four adjusted measurements relative to the reference pulse integral curves. This can be achieved using the following generalized steps:

1) Remove the ambient light, and use v1$a$−v2$a$=(V1$a$−V2$a$)/k and v1$b$−v2$b$=(V1$b$−V2$b$)/k in a search iteration algorithm.

2) Using the search algorithm, adjust pulse delay tp and the pulse amplitude k in order to minimize the distance to the reference pulse integral curves of v1$a$ and v1$b$ according to $$v1_a = \frac{1}{2}\left(1 + \frac{V1_a - V2_a}{k}\right) \qquad (38)$$

-continued
$$v1_b = \frac{1}{2}\left(1 - \frac{V2_b - V1_b}{k}\right) \qquad (39)$$

Figure 17:
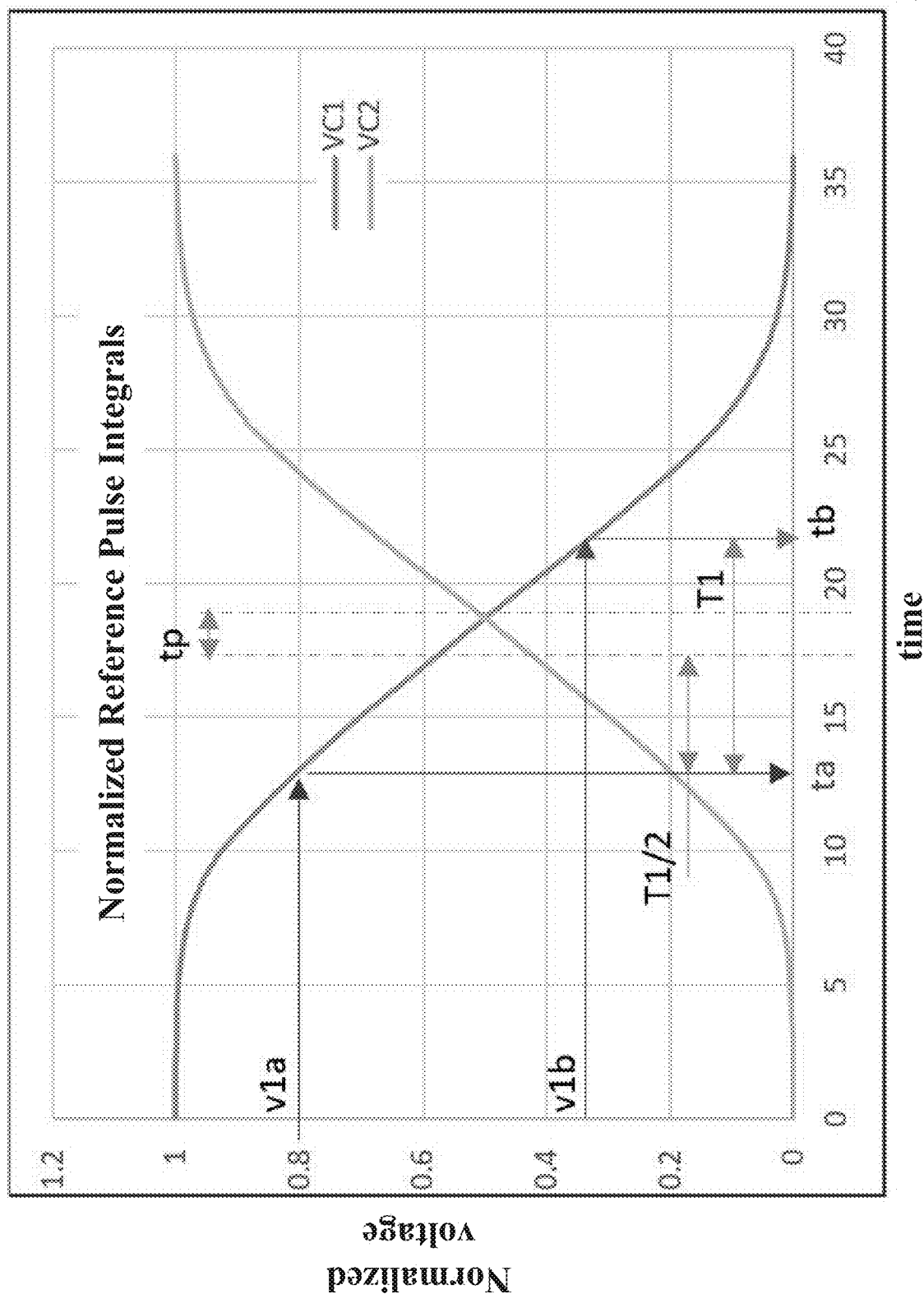
FIG. 17 is a chart that plots normalized reference pulse integral data.

FIG. 17 is a chart that plots the normalized reference pulse integral data (similar to the chart of FIG. 16). In an example implementation, the iterative algorithm can seek to minimize the following cost function:

$$d = (v1_a - v_a)^2 + (v1_b - v_b)^2 \qquad (40)$$

where va and vb are the points on the reference integral for a given value of tp. The distance determination component 208 can execute the iterative algorithm to find values of v1$a$ and v1$b$ that minimize the distance d, and these values can be used to determine the value of tp. The chart illustrated in FIG. 17 indicates the values of v1$a$, v1$b$, and tp at the end of the iterative search and minimization process.

Figure 18:
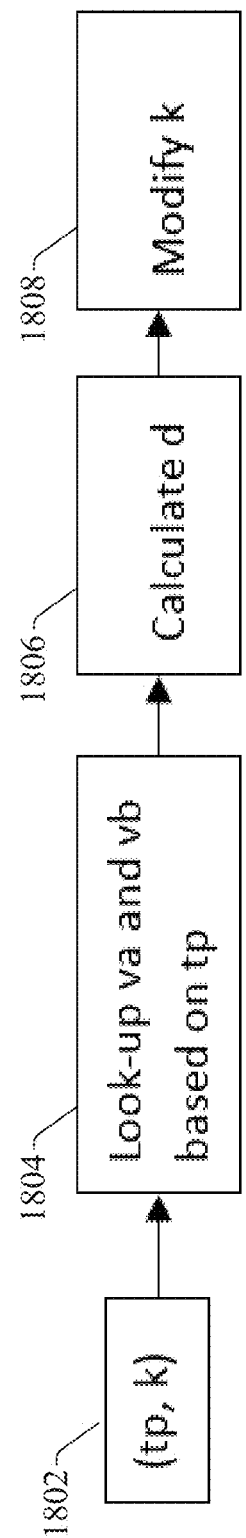
FIG. 18 is a flowchart illustrating general steps of an iterative process for determining a propagation time of a non-rectangular light pulse.

FIG. 18 is a flowchart illustrating the general steps of the iterative process. At 1802, values of tp and k are selected. At 1804, the stored normalized reference pulse integral data is referenced to determine the values of va and vb corresponding to the selected value of tp. At step 1806, the value of distance d is determined according to equation (40) using the referenced values of va and vb, and the values of v1$a$ and v1$b$ obtained using equations (38) and (39) the selected value of k. At step 1808, based on the value of d, the value of k is modified, and steps 1802-1806 are repeated using the modified value of k. Steps 1802-1808 are repeated in an iterative fashion until values of v1$a$ and v1$b$ that minimize or substantially minimize the value of d in equation (40) are obtained.

Figure 11B:
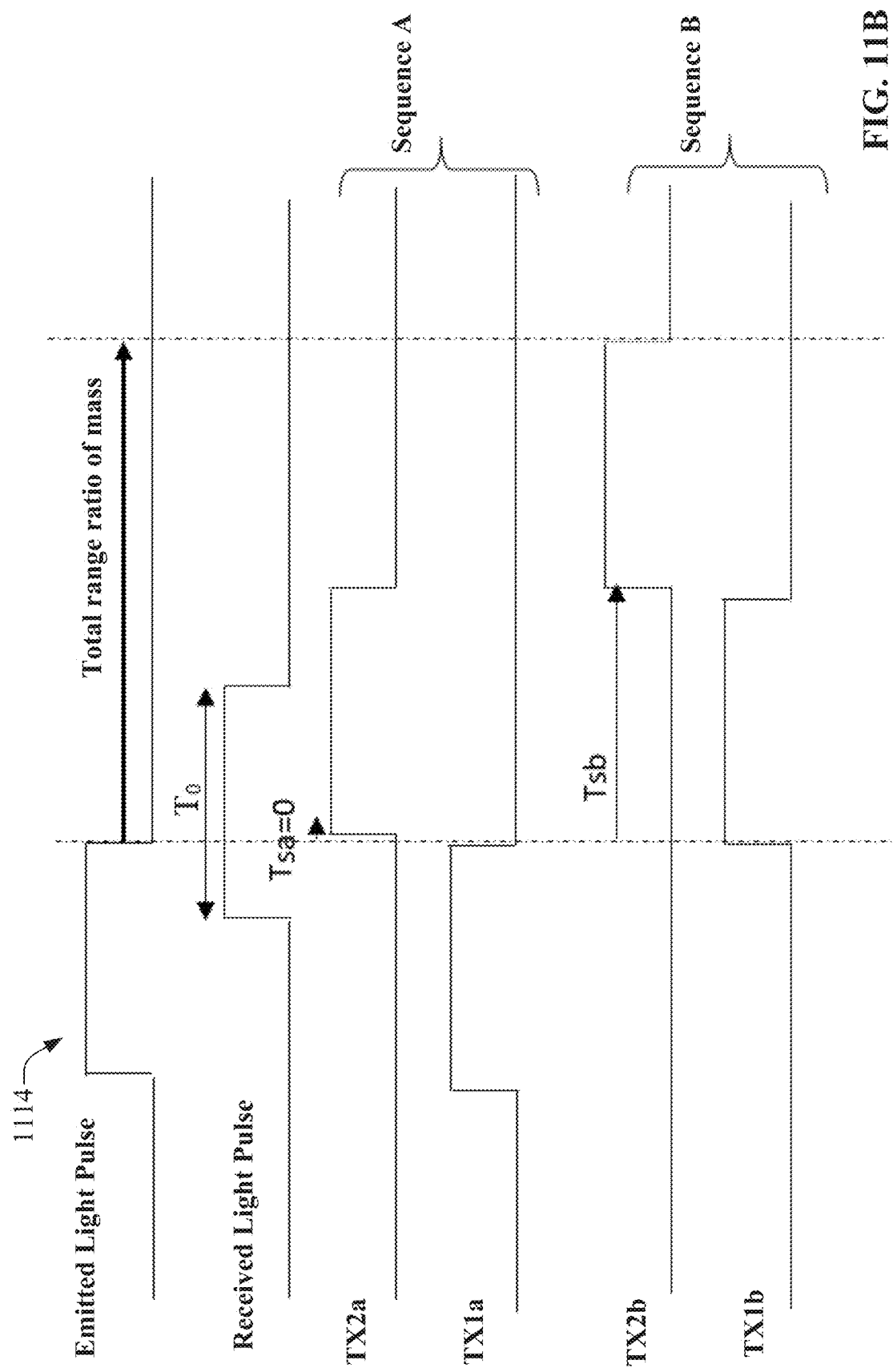
FIG. 11B is a timing chart illustrating TX1 and TX2 switch timings for two example measuring sequences that can be combined to extend the measurable distance of a TOF sensor device.

In the case of the center of mass method, the range of pulse arrival time that can be measured is from $T_s$ to ($T_s + T_0$). This means that the range covered for a pulse having a duration of $T_0$=20 nanoseconds (ns) is three meters wide (d=c/2·$T_0$) starting from the position corresponding to $T_s$. Since the precision of the distance measurement is more precise with a smaller pulse, it is preferable to avoid increasing the pulse duration $T_0$ to cover a wider range. Instead, a wider range can be obtained by performing multiple measurements—with each measurement covering contiguous subranges—and combining results of the multiple measurements. For example, with the same pulse of 20 ns duration, two measuring sequences offset by 20 ns (corresponding to three meters) from each other can increase the measurable range to approximately six meters. FIG. 11B is a timing chart illustrating TX1 and TX2 switch timings for two example measuring sequences that can be combined to extend the measurable distance. The first measuring sequence—sequence A—has a sampling time $T_{sa}$=0 (that is, the TX1 control signal goes low and the TX2 control signal goes high at a time substantially corresponding to the falling edge of emitted pulse 1114) for a range of 0 to 3 meters. The second measuring sequence—sequence B—has a sampling time $T_{sb}$=20 ns (whereby the Tx1 signal goes low and the TX2 signal goes high 20 ns after the falling edge of the emitted pulse 1114) for a range of 3 to 6 meters.

Note that the sampling time $T_{sb}$ for measuring sequence B is delayed relative to the sampling time $T_{sa}$ for measuring sequence A by approximately the pulse duration $T_0$. That is, the duration between the falling edge of the emitted light pulse and sampling time $T_{sb}$ in the second measuring sequence is greater than the duration between the falling edge of the emitted pulse and sampling time $T_{sa}$ in the first measuring sequence by approximately $T_0$. This ensures that the measurable ranges of the two sequences are contiguous (0-3 meters for the first sequence, and 3-6 meters for the second sequence).

Figure 13B:
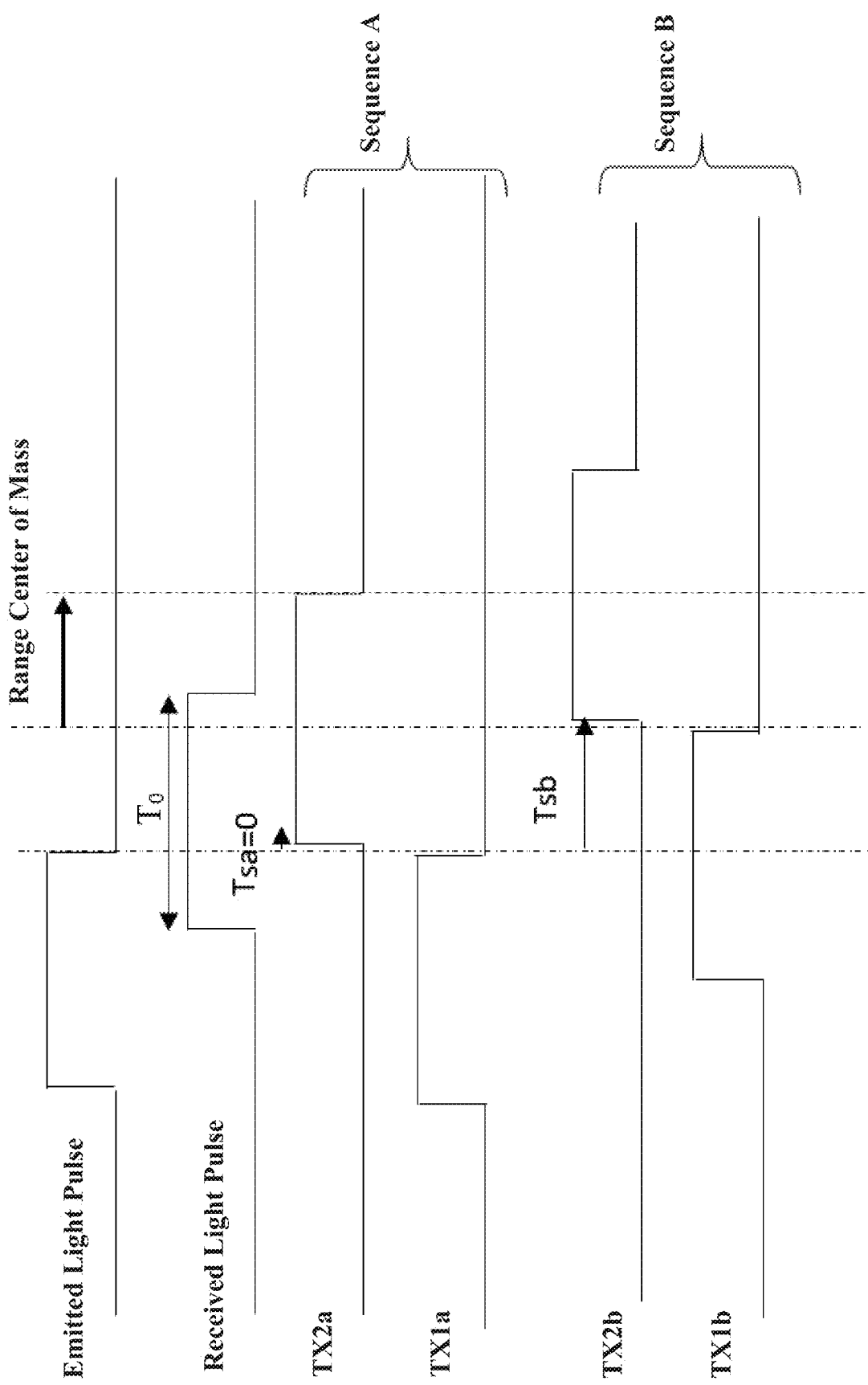
FIG. 13B is a timing diagram illustrating TX1 and TX2 switch timings for two measuring sequences in which the sampling time for the second sequence is delayed relative to the sampling time for the first sequence by a duration smaller than the pulse duration.

According to the center of mass method, the range that can be measured ranges from $T_{sb}$ to $(T_{sa}+T_0)$. As discussed previously, the center of mass method requires two measuring sequences, each providing two items of pulse data ($V_1$, $V_2$) captured from each of the sampling points $T_{sa}$ and $T_{sb}$. As an example, with the same 20 ns pulse and 10 ns between the two sampling points $T_{sa}$ and $T_{sb}$, a center of mass range from 1.5 meters to 3 meters can be achieved. FIG. 13B is a timing diagram illustrating TX1 and TX2 switch timings for two measuring sequences in which the sampling time $T_{sb}$ for measuring sequence B is delayed relative to the sampling time $T_{sa}$ for measuring sequence A by a duration (e.g., 10 ms) smaller than the pulse duration.

In some embodiments, data generated from each measuring sequence in support of the center of mass method can also be used to estimate distance using the ratio of mass method. The first measuring sequence A from the example illustrated in FIG. 13B is defined as $T_{sa}=0$, $T_0=20$ ns, and can therefore measure in a range from 0 to 3 meters using the ratio of mass method. If results of this first sequence A is combined with results of the second sequence B in which the sample time $T_{sb}=10$ ns (half or approximately half of the pulse duration) with the same pulse duration of $T_0=20$ ns, the following distance ranges can be estimated:

Sequence A alone (ratio of mass): 0 m to 3 meters
Sequences A and B together (center of mass): 1.5 to 3 meters
Sequence B alone (ratio of mass): 1.5 to 4.5 meters In some embodiments, different pulse widths and gating times can be used when combining multiple sequences. In some scenarios, multiple sequences can allow the total required sensing range to be satisfied while achieving the precision of a shorter range defined by the pulse width $T_0$.

Since the illumination signal and the received pulse energy decrease over distance (mostly as the square of the distance), the further away the target is, the less signal is received by the photo detector. As the total range is divided into multiple subranges associated with different measuring sequences, each measuring sequence can have different timing configurations and different numbers of integration pulses. In general, the received signal level (which gives rise to the value accumulated in the measuring capacitor) should be increased for a subrange that is far from the sensor. The timing characteristics of the measuring sequence can be tuned to the specific need of the subrange as follows in order to optimize the total sensing time and the total energy required to meet the performance goals:

Shorter pulse duration for ranges further away
Higher energy pulses for ranges further away
Larger number of pulses for ranges further away.

Figure 11C:
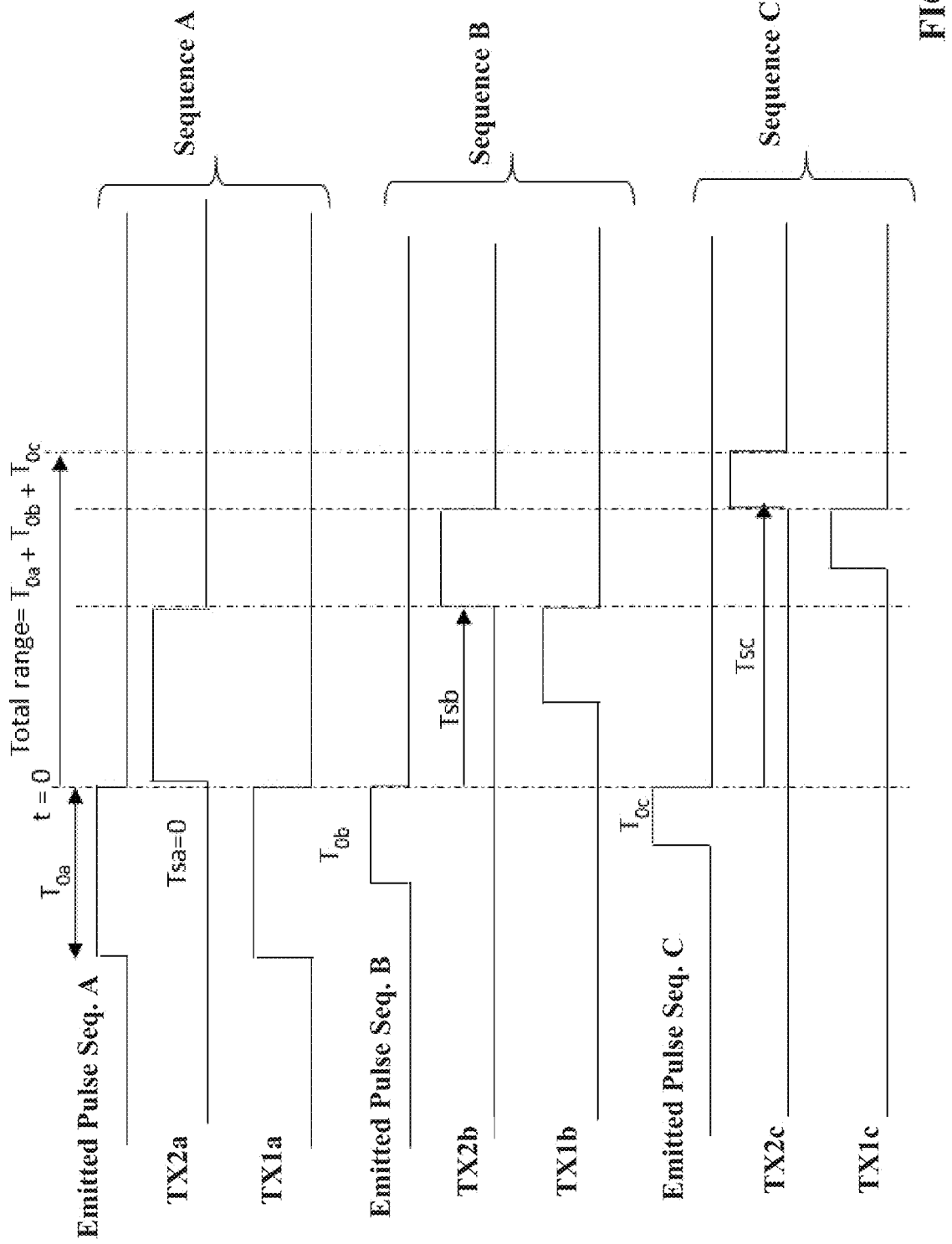
FIG. 11C is a timing diagram illustrating three measuring sequences whereby each sequence has a different pulse width, pulse amplitude, and number of pulses.

FIG. 11C is a timing diagram illustrating three measuring sequences—sequence A, sequence B, and sequence C—whereby each sequence has a different pulse width ($T_{0a}$, $T_{0b}$, and $T_{0c}$), pulse amplitude, and number of pulses. The total measuring range is the sum of the three pulse widths $T_{0a}+T_{0b}+T_{0c}$. The number of pulses for each sequence, the amplitudes, and the durations of the pulses are a function of the total range to be achieved as well as the level of illumination irradiance over the distance from the sensor. The numbers of pulses, amplitudes, and pulse durations can be defined to achieve the performance and precision goals of the sensor device. In the example illustrated in FIG. 11C, the second measuring sequence (sequence B) uses a pulse width $T_{0b}$ of approximately half the width $T_{0a}$ of the pulse emitted in the first sequence. Moreover, the sampling time $T_{sb}$ used in sequence B is delayed relative to sampling time $T_{sa}$ of sequence A by approximately the first pulse duration $T_{0a}$. Similarly, the third measuring sequence (sequence C) uses a pulse width $T_{0c}$ that is approximately half the width $T0b$ of the pulse emitted in sequence B, and sampling time $T_{sc}$ is delayed by a duration of approximately the sum of the first pulse duration $T_{0a}$ and the second pulse duration $T_{0b}$.

As in previous examples, according to some embodiments, each sequence A, B, and C may emit multiple pulses and capture the leading and trailing edge portions using the same control signal timings in order to accumulate measurable amounts of electrical energy proportional to the leading and trailing edge portions of the pulse. Propagation times can be calculated for each sequence based on this data, and the results can be aggregated to obtain an aggregated propagation time. In some scenarios, an object may reside at a location within the range of one of the three sequences— e.g., sequence A—but outside the ranges of the other two sequences. In such scenarios, the distance determination component 208 may identify the object based on the result of measuring sequence A while detecting no object in the results sequences B and C, and consequently use the sequence A propagation time for the distance calculation. For embodiments in which there is overlap between adjacent ranges, an object may reside at a distance corresponding to an overlap range between two consecutive sequences (e.g., sequences A and B). If distance determination component 208 detects the object in the results of two consecutive sequences, the propagation times obtained from the results of the two sequences may be aggregated (e.g., by averaging the two propagation times), and the aggregate propagation time can be used for the distance calculation.

Embodiments of TOF sensor device 202 described herein can measure the time of flight of transmitted light pulses (and corresponding distances of objects) with high accuracy while maintaining low acquisition and response times. This is achieved using techniques that generate large amounts of information about a received pulse (and, in some embodiments, ambient light) quickly using relatively short measuring sequences. The time of flight estimation techniques described herein are also capable of compensating for, or rendering irrelevant, ambient light incident on the sensor's photo-detectors. Some embodiments can achieve these benefits even in cases of irregular, non-rectangular light pulses.

Figure 21A:
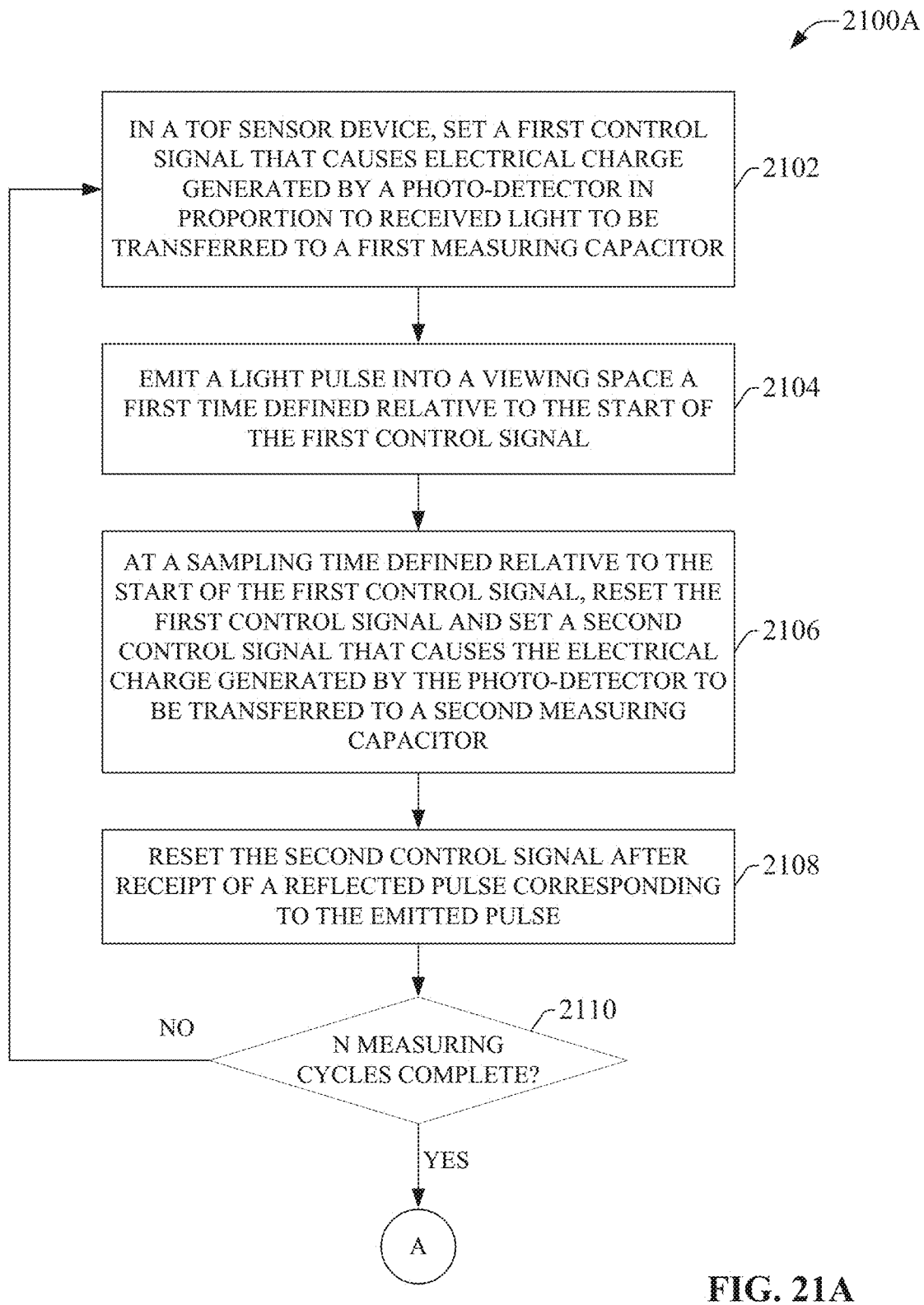
FIG. 21A is a flowchart of a first part of an example methodology for determining a distance of an object or surface corresponding to a pixel of a TOF sensor image using a center of mass method.
Figure 21B:
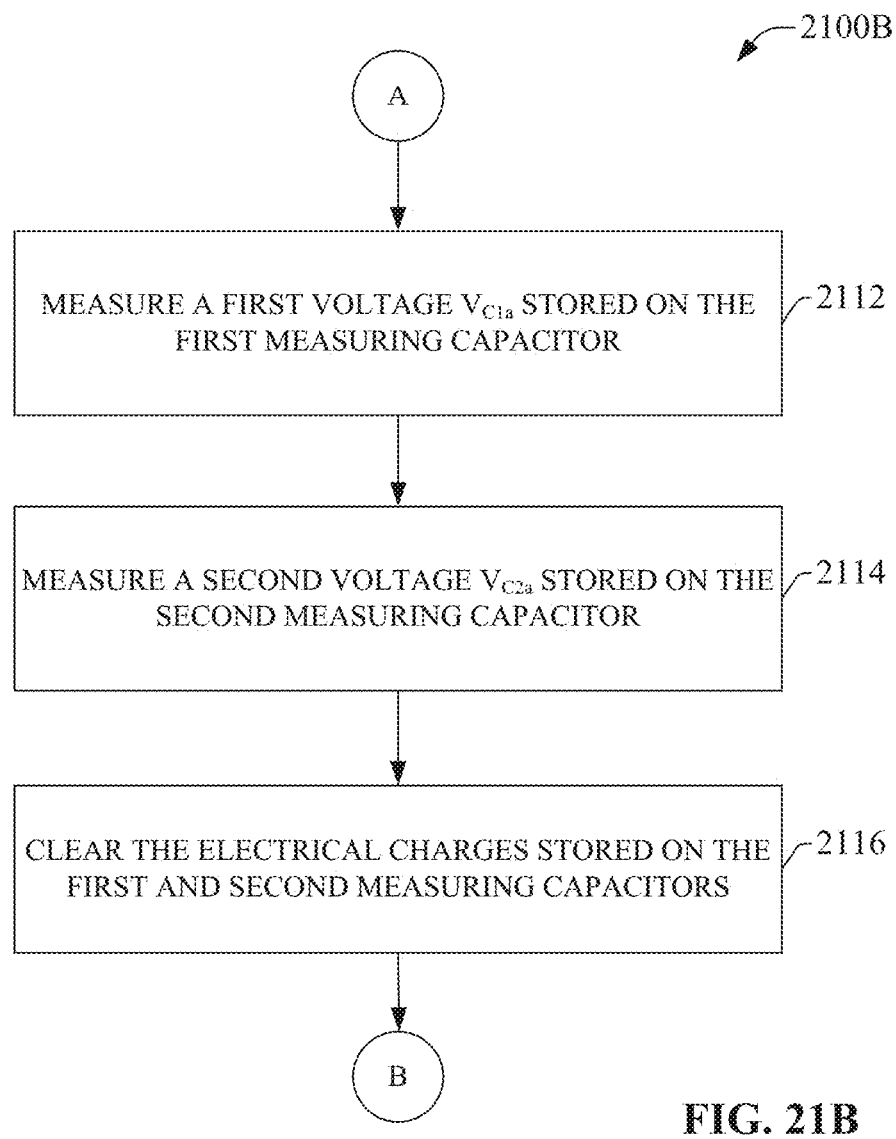
FIG. 21B is a flowchart of a second part of the example methodology for determining the distance of the object or surface corresponding to the pixel of the TOF sensor image using the center of mass method.
Figure 21C:
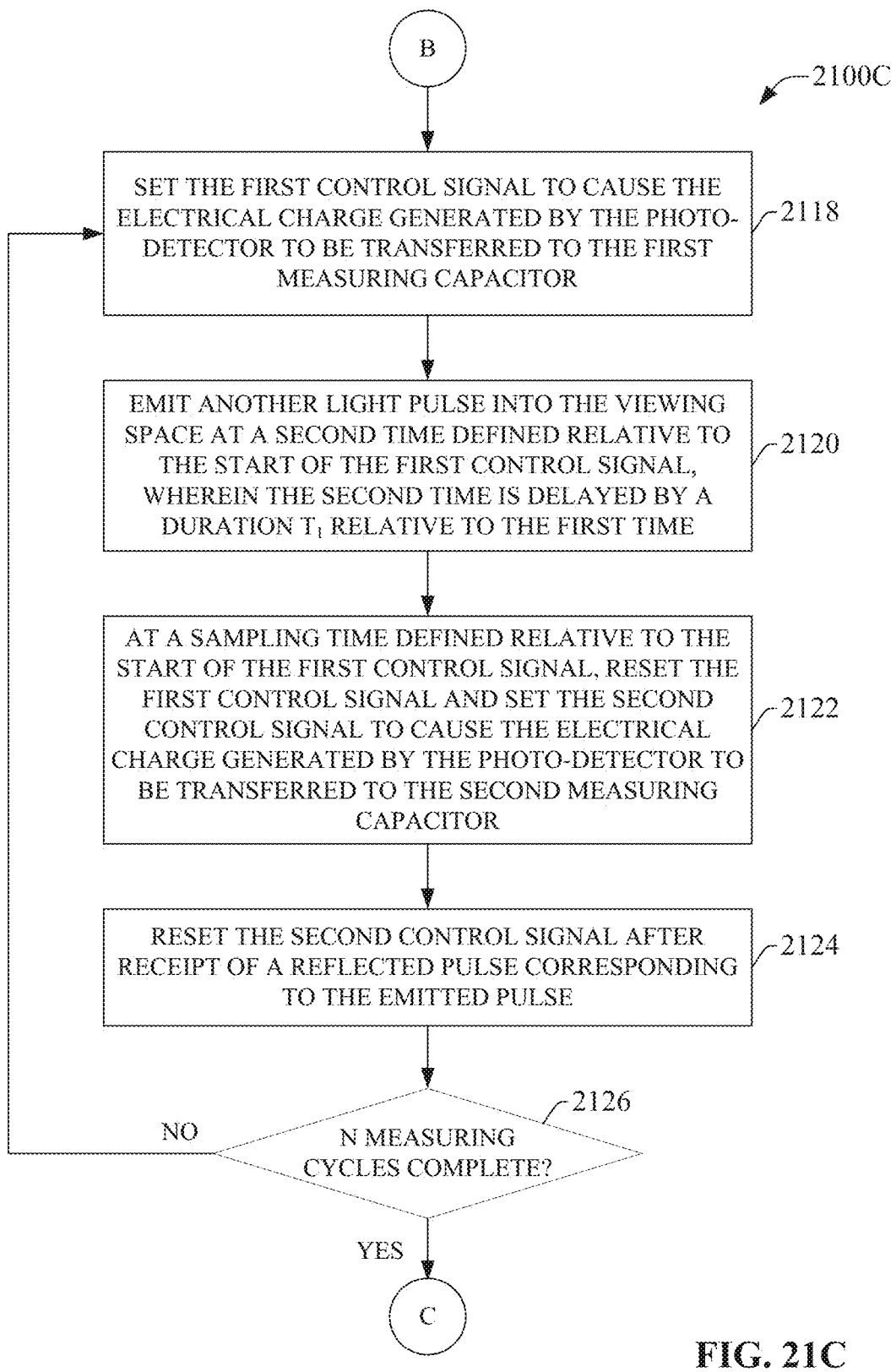
FIG. 21C is a flowchart of a third part of the example methodology for determining the distance of the object or surface corresponding to the pixel of the TOF sensor image using the center of mass method.
Figure 21D:
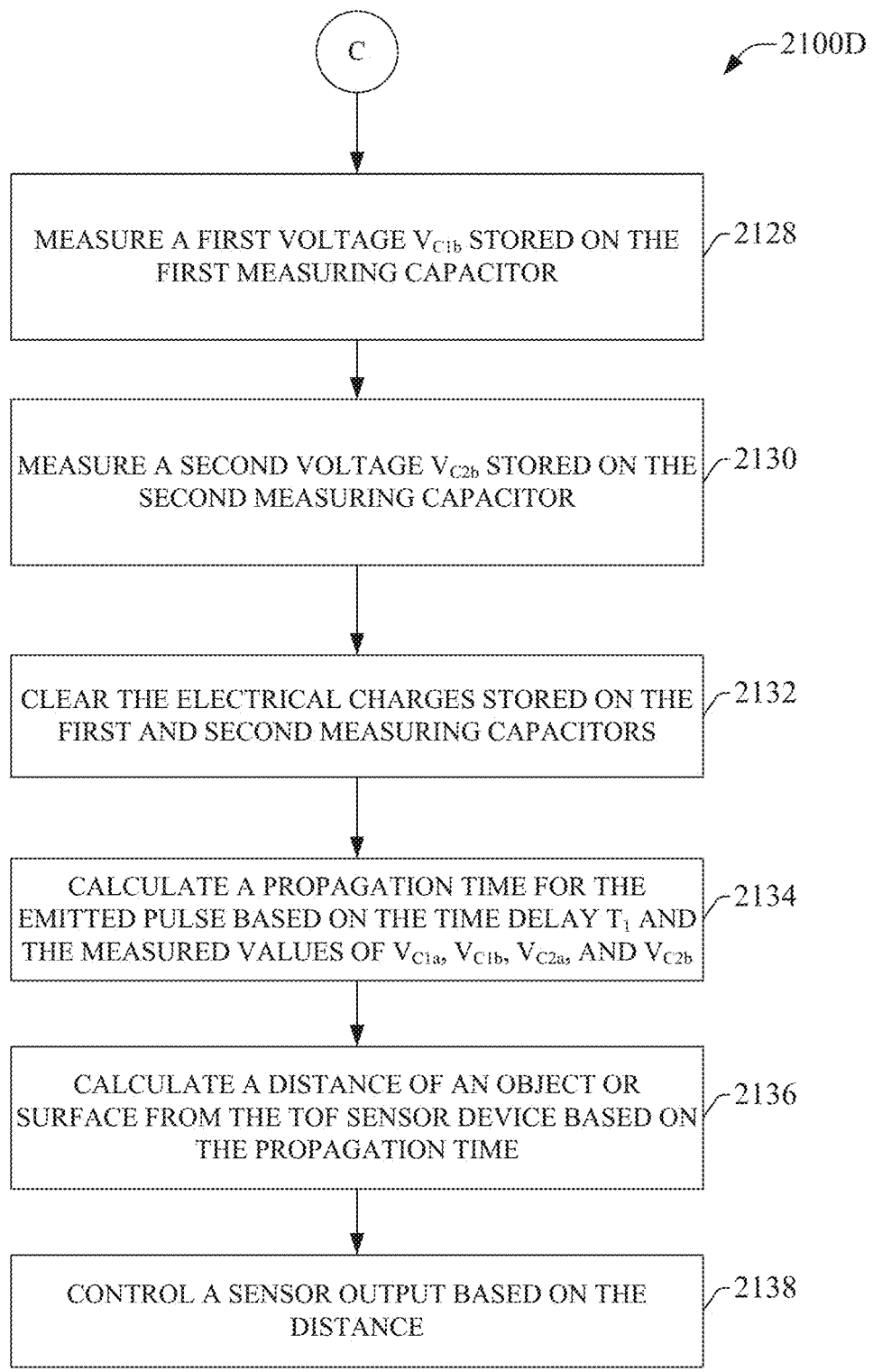
FIG. 21D is a flowchart of a fourth part of the example methodology for determining the distance of the object or surface corresponding to the pixel of the TOF sensor image using the center of mass method.
Figure 22:
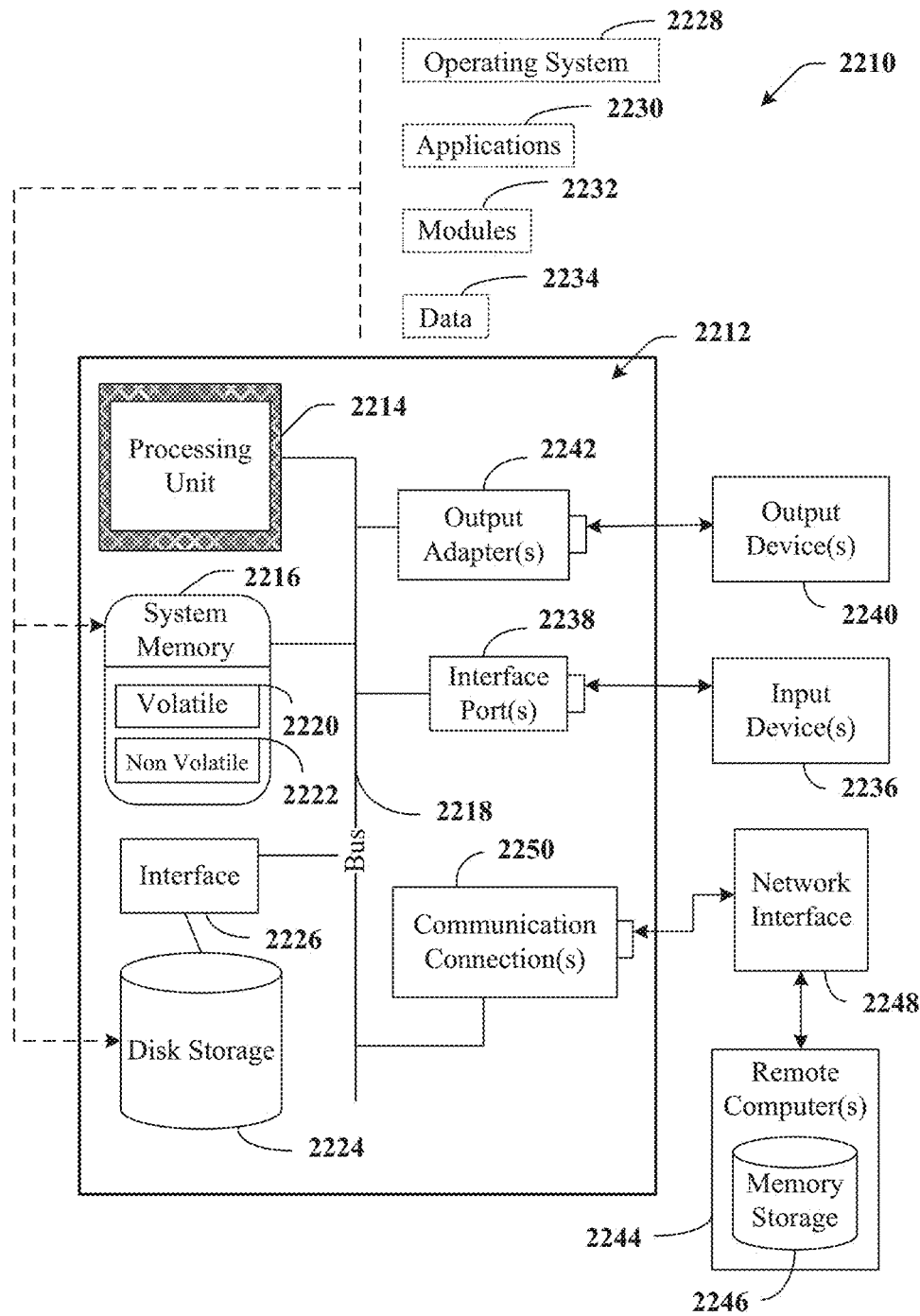
FIG. 22 is an example computing environment.
Figure 23:
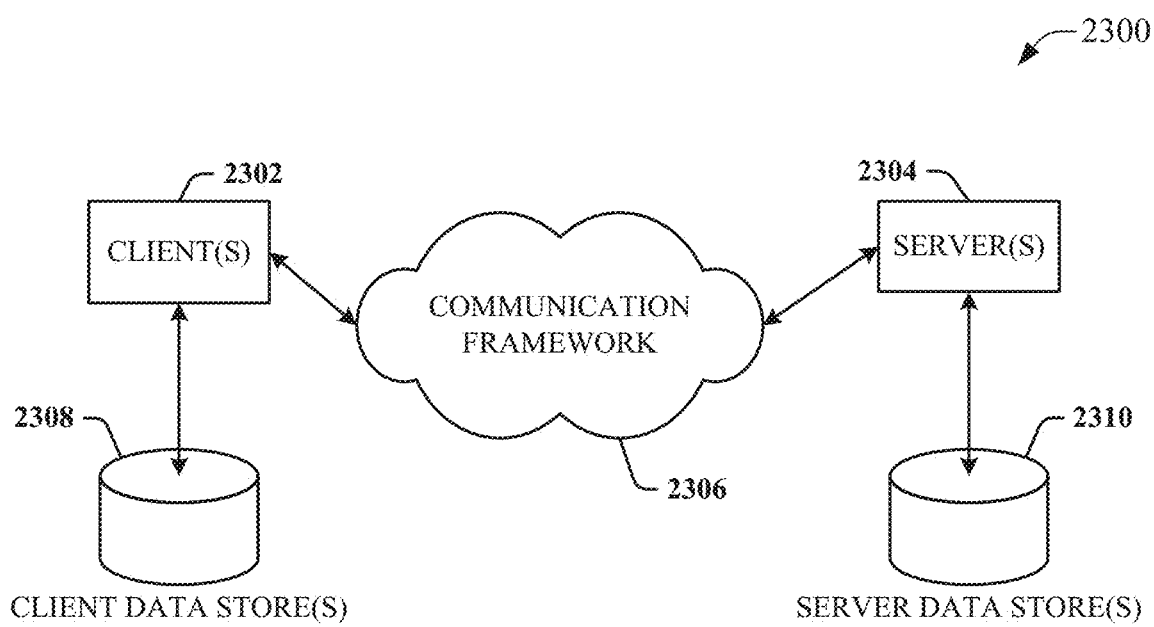
FIG. 23 is an example networking environment.

FIGS. 21-23 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 19:
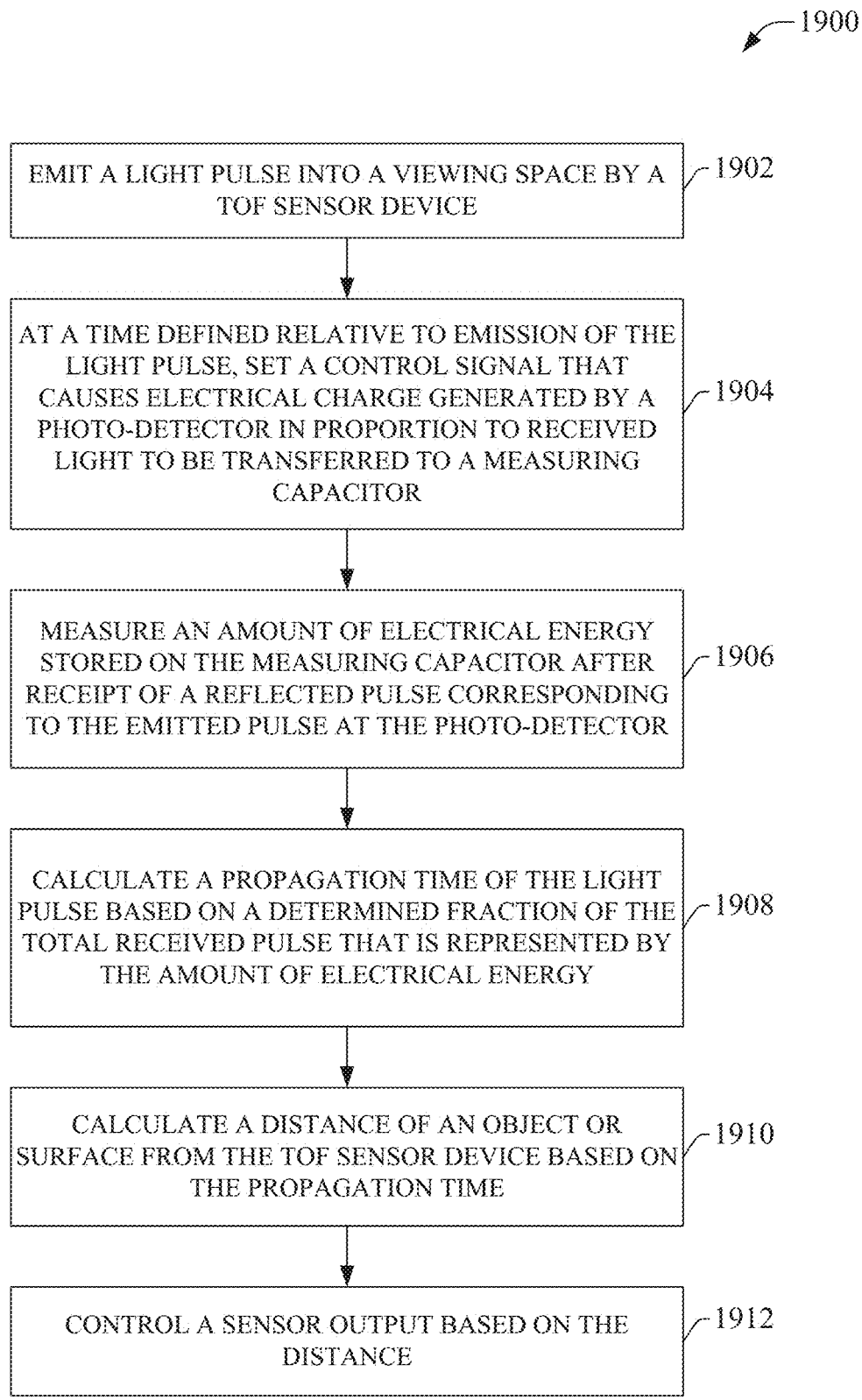
FIG. 19 is a flowchart of an example methodology for determining a distance of an object or surface corresponding to a pixel of a TOF sensor image.

FIG. 19 illustrates an example methodology 1900 for determining a distance of an object or surface corresponding to a pixel of a TOF sensor image. Methodology 1900 may be suitable for execution on a TOF sensor device having an array of single-capacitor photo-detectors as illustrated in FIG. 3. Initially, at 1902, a light pulse is emitted into the viewing space by a TOF sensor device. At 1904, at a time defined relative to emission of the light pulse, a control signal is set that causes electrical charge generated by a photo-detector in proportion into received light to be transferred to a measuring capacitor of the TOF sensor device. At 1906, an amount of electrical energy (e.g., a charge or voltage level) stored on the measuring capacitor is measured after receipt of a reflected light pulse corresponding to the emitted pulse at the photo-detector.

At 1908, a propagation time, or time of flight, of the emitted pulse is calculated based on a determined fraction of the total received pulse that is represented by the amount of electrical energy measured at step 1906. This amount of electrical energy is proportional to the trailing portion of the reflected pulse received after the time that the control signal was set at step 1904, and is a function of the total propagation time of the emitted light pulse. At 1910, a distance of an object or surface from the TOF sensor device is calculated based on the propagation time calculated at step 1908. This distance can be determined, for example, using equation (1) with the propagation time entered as the time t. At 1912, a sensor output of the TOF sensor is controlled based on the distance determined at step 1910. For example, the TOF sensor device may be a component of an industrial safety application that monitors a hazardous industrial area, and the sensor output may be an analog or digital output that controls a safety device or signals that power is to be removed from one or more hazardous machines if the distance satisfies a defined criterion.

Figure 20A:
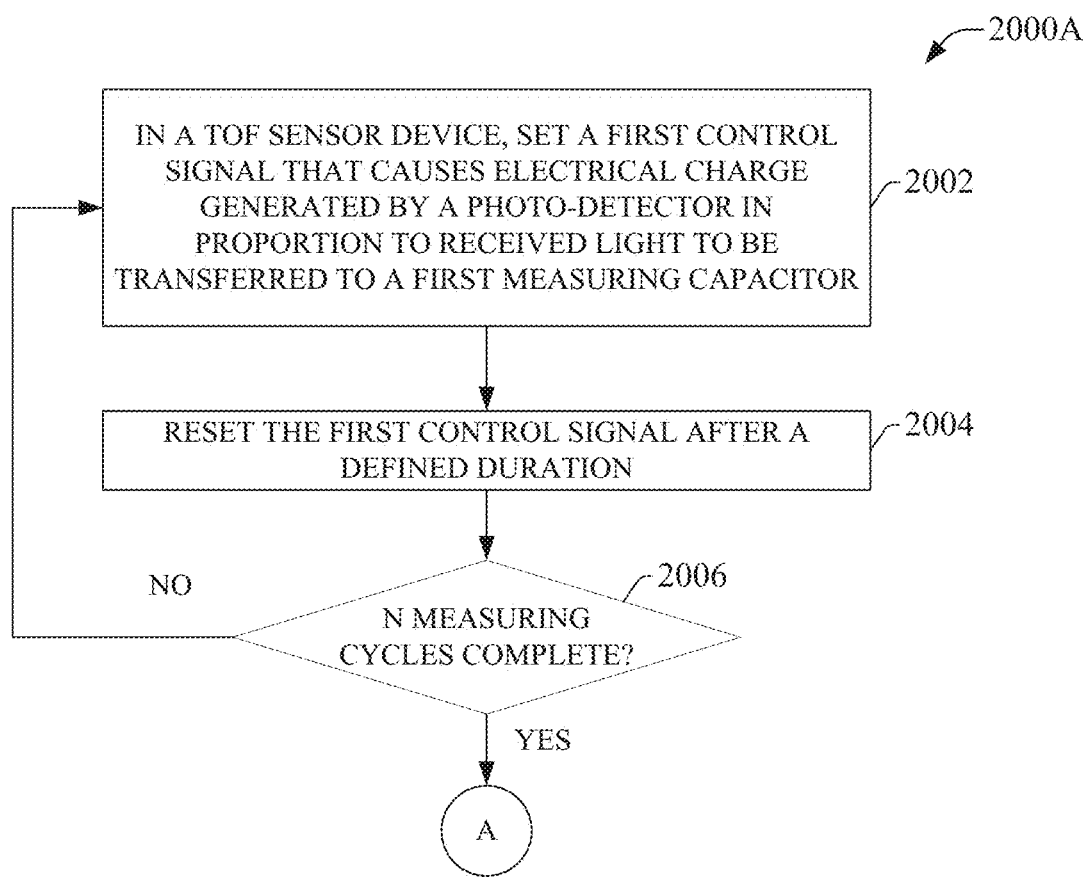
FIG. 20A is a flowchart of a first part of an example methodology for determining a distance of an object or surface corresponding to a pixel of a TOF sensor image using a ratio method.
Figure 20B:
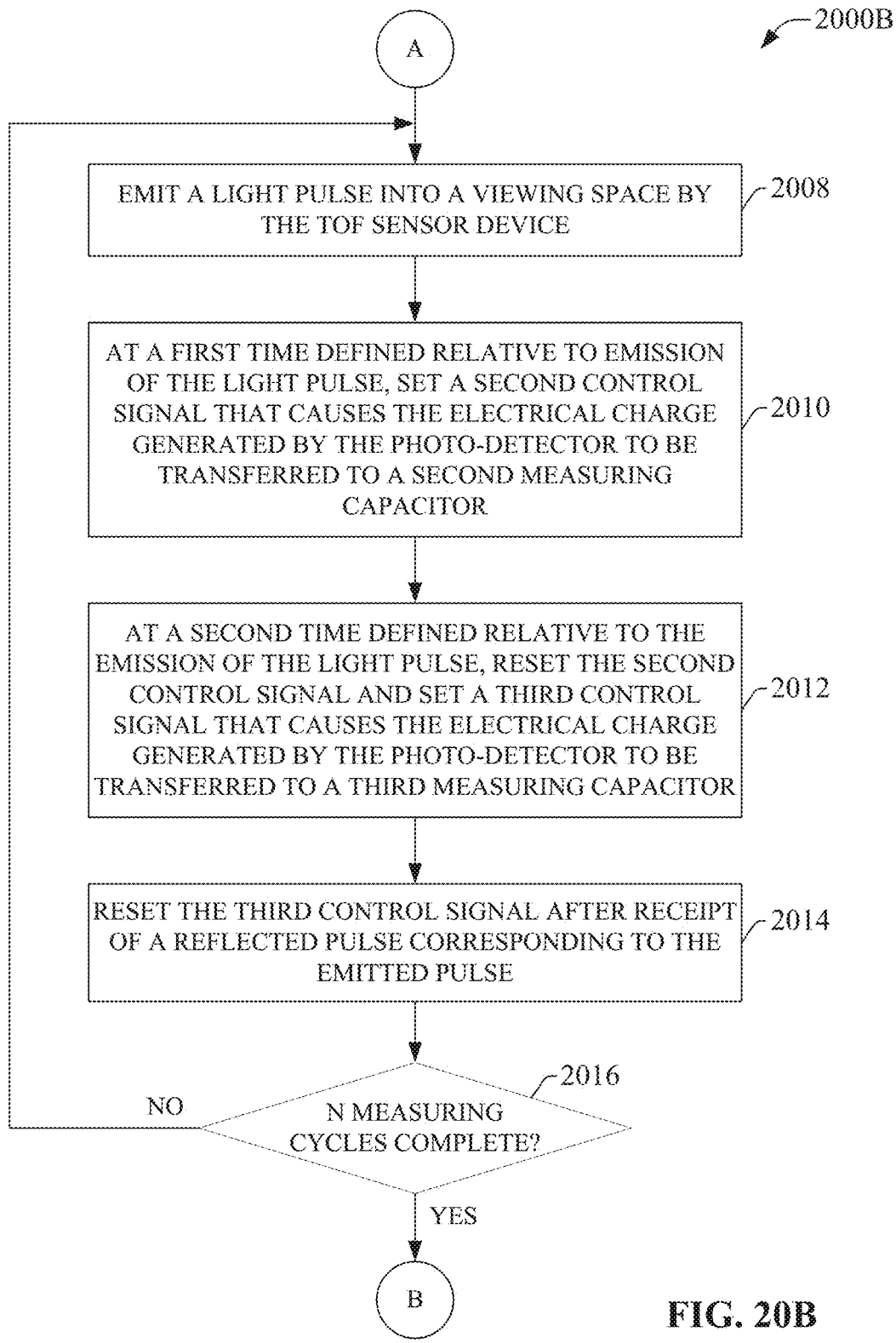
FIG. 20B is a flowchart of a second part of the example methodology for determining the distance of the object or surface corresponding to the pixel of the TOF sensor image using the ratio method.
Figure 20C:
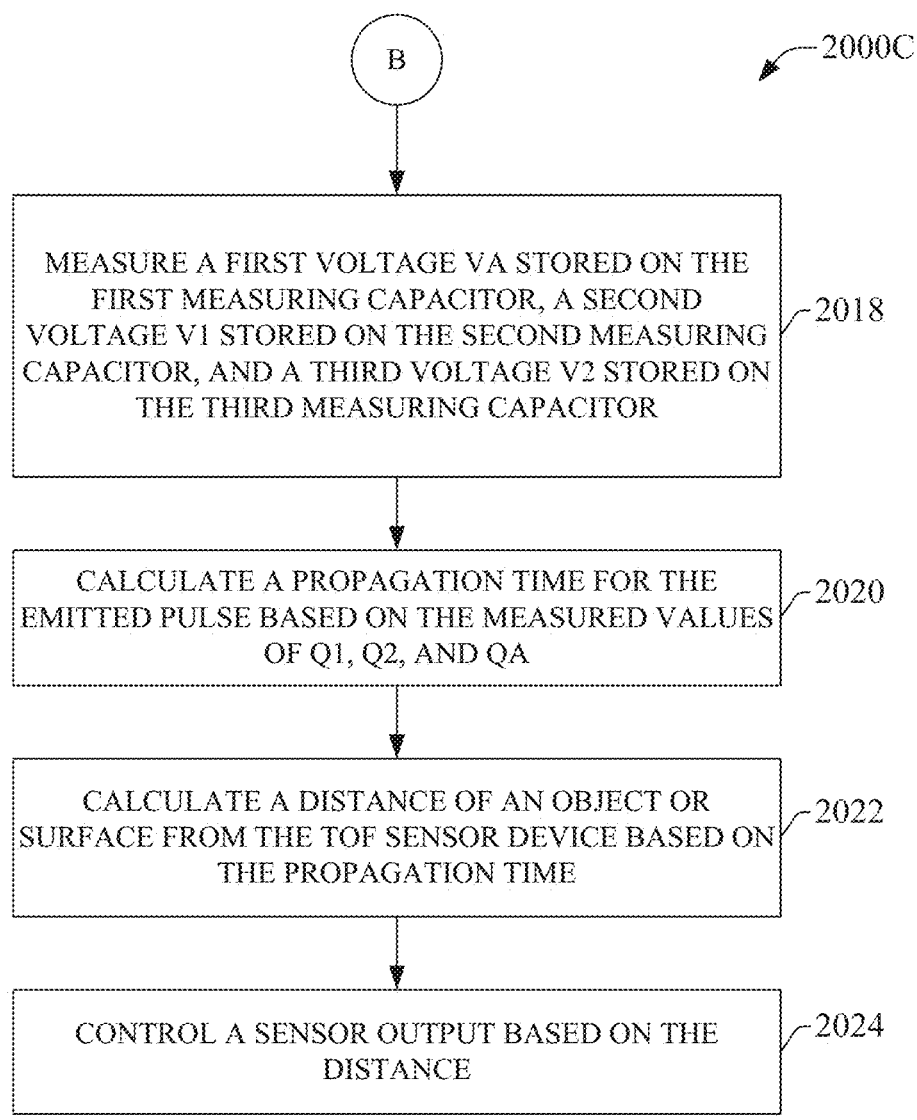
FIG. 20C is a flowchart of a third part of the example methodology for determining the distance of the object or surface corresponding to the pixel of the TOF sensor image using the ratio method.

FIGS. 20A-20C illustrate an example methodology for determining a distance of an object or surface corresponding to a pixel of a TOF sensor image. This methodology, which calculates the distance using a ratio method, may be suitable for execution on a TOF sensor device having an array of three-capacitor photo-detectors as illustrated in FIGS. 8 and 10. The first part 2000A of the methodology is illustrated in FIG. 20A. Initially, at 2002, a first control signal that causes electrical charge generated by a photo-detector in proportion to received light to be transferred to a first measuring capacitor of a TOF sensor device is set. At 2004, the first control signal is reset after a defined duration. At 2006, a determination is made as to whether N measuring cycles are complete, where N is an integration factor of the TOF sensor device, and each measuring cycle comprises execution of steps 2002 and 2004. If N measuring cycles have not yet been completed (NO at step 2006), the methodology returns to step 2002, and steps 2002 and 2004 are repeated until N measuring cycles have been completed. The amount of electrical energy stored in the first measuring capacitor represents a measured amount of ambient light incident on the TOF sensor device's photo-detector.

If N measuring cycles have been completed (YES at step 2006), the methodology proceeds to the second part 2000B illustrated in FIG. 20B. At 2008, another light pulse is emitted into the viewing space by the TOF sensor device. At 2010, at a first time defined relative to emission of the light pulse at step 2008, a second control signal is set that causes the electrical charge generated by the photo-detector to be transferred to a second measuring capacitor. At 2012, at a second time defined relative to the emission of the light pulse at step 2008, the second control signal is reset and a third control signal is set that causes the electrical charge generated by the photo-detector to be transferred to a third measuring capacitor. The second time, or sampling time, is selected such that the duration during which the second control signal was set is equal (or approximately equal) to the defined duration of the first control signal. At 2014, the third control signal is reset after receipt of a reflected pulse corresponding to the pulse emitted at step 2008. The third control signal is reset after another defined duration equal to (or approximately equal to) the defined durations of the first and second control signals. The amounts of electrical energy stored on the second and third measuring capacitors are proportional to the leading and trailing portions, respectively, of the received light pulse, where the respective portions are a function of the total propagation time of the light pulse.

At 2016, a determination is made as to whether N measuring cycles have been completed, where each measuring cycle comprises execution of steps 2008-2014. If N measuring cycles have not been completed (NO at step 2016), the methodology returns to step 2008, and steps 2008-2014 are repeated. If N measuring cycles have been completed (YES at step 2016), the methodology proceeds to the second part 2000C illustrated in FIG. 20C.

At step 2018, a first voltage VA stored on the first measuring capacitor, a second voltage V1 stored on the second measuring capacitor, and a third voltage V2 stored on the third capacitor are measured. Voltage VA is proportional to the amount of ambient light incident on the photo-detector, voltage V1 is proportional to the leading portion of the reflected pulse received while the second control signal was set, and voltage V2 is proportional to the trailing portion of the reflected pulse received while the third control signal was set. In some embodiments, the voltage levels VA, V1, and V2 can be measured from the respective measuring capacitors as analog voltages (e.g., by one or more amplifiers) and converted to digital values by one or more ADCs. At 2020, a propagation time for the emitted light pulse is calculated based on the measured values of VA, V1, and V2. For example, the propagation time tp can be determined by the TOF sensor device's distance determination component based on any of equations (15), (16), or (17) discussed above. In general, the value of the propagation time tp can be determined by subtracting the ambient light voltage VA from both V1 and V2 to yield voltages proportional to the leading and trailing edges, respectively, of the received pulse, determining the ratio of the trailing edge voltage to the total of the leading and trailing edge voltages, and multiplying this ratio by the total time duration $T_0$ of the received light pulse. The voltages VA, V1, and V2 can be multiplied by capacitance mismatch compensation factors prior to this calculation to ensure accuracy, where the compensation factors can be obtained via a calibration sequence executed by the TOF sensor device.

At 2022, a distance d of an object or surface from the TOF sensor device is calculated based on the propagation time calculated at step 2020 (e.g., using equation (1)). At 2024, a sensor output is controlled based on the distance calculated at step 2022.

FIGS. 21A-21D illustrate an example methodology for determining a distance of an object or surface corresponding to a pixel of a TOF sensor image. This methodology, which calculates the distance using a center of mass method, may be suitable for execution on a TOF sensor device having an array of two-capacitor photo-detectors as illustrated in FIG. 6.

The first part 2100A of the methodology is illustrated in FIG. 21A. The first part 2100A of the methodology represents a first of two measuring sequences to be carried out by the TOF sensor device. Initially, at 2102, a first control signal is set that causes electrical charge generated by a photo-detector in proportion to received light to be transferred to a first measuring capacitor. At 2104, a light pulse is emitted into a viewing space by the TOF sensor device at a first time defined relative to the start of the first control signal.

At 2106, at a sampling time defined relative to the start of the first control signal, the first control signal is reset and a second control signal is set that causes the electrical charge generated by the photo-detector to be transferred to a second measuring capacitor. At 2108, the second control signal is reset after receipt of a reflected pulse corresponding to the pulse emitted at step 2104. The timings of the first and second control signals are such that the durations of both control signals are equal or approximately equal.

At 2110, a determination is made as to whether N measuring cycles have been completed, where N is the integration factor of the TOF sensor device and each measuring cycle comprises execution of steps 2102-2108. If N measuring cycles have not yet been completed (NO at step 2110), the methodology returns to step 2102, and steps 2102-2108 are repeated for another measuring cycle. If N measuring cycles have been completed (YES at step 2110), the methodology proceeds to the second part 2100B illustrated in FIG. 21B.

At 2112, a first voltage $V_{C1a}$ stored on the first measuring capacitor is measured. This voltage $V_{C1a}$ is proportional to the leading portion of the received pulse (and any ambient light) for the first measuring sequence. At 2114, a second voltage $V_{C2a}$ stored on the second measuring capacitor is measured. This voltage $V_{C2a}$ is proportional to the trailing portion of the received pulse (and any ambient light) for the first measuring sequence. At 2116, the electrical charges stored on the first and second measuring capacitors are cleared. The methodology then moves to the third part 2100C illustrated in FIG. 21C.

The third part 2100C of the methodology represents the second measuring sequence carried out by the TOF sensor device. At 2118, the first control signal is set again to cause the electrical charge generated by the photo-detector to be transferred to the first measuring capacitor. At 2120, another light pulse is emitted into the viewing space at a second time defined relative to the start of the first control signal at step 2118. The second time is delayed within the second sequence by a duration $T_1$ relative to the first time of the emission of the first pulse within the first measuring sequence at step 2104. At 2122, at a sampling time defined relative to the start of the first control signal at step 2118, the first control signal is reset and the second control signal is set to cause the electrical charge generated by the photo-detector to be transferred to the second measuring capacitor. At 2124, the second control signal is reset after receipt of a reflected pulse corresponding to the emitted pulse. As in the first measuring sequence, the duration of the first and second control signals are equal or approximately equal.

At 2126, a determination is made as to whether N measuring cycles have been completed, where each measuring cycle comprises execution of steps 2118-2124. If N measuring cycles have not yet been completed (NO at step 2126), the methodology returns to step 2118, and steps 2118-2124 are repeated for another measuring cycle. If N measuring cycles have been completed (YES at step 2126), the methodology proceeds to the fourth part 2100D of the methodology illustrated in FIG. 21D.

At 2128, a first voltage V1b stored on the first measuring capacitor is measured. This voltage $V_{C1b}$ is proportional to the leading portion of the received pulse (and any ambient light) for the first measuring sequence. At 2130, a second voltage $V_{C2b}$ stored on the second measuring capacitor is measured. This voltage $V_{C2b}$ is proportional to the trailing portion of the received pulse (and any ambient light) for the second measuring sequence. At 2132, the electrical charges stored on the first and second measuring capacitors are cleared.

At 2134, a propagation time for the emitted pulses is calculated based on the time delay T1 and the measured values of $V_{C1a}$, $V_{C1b}$, $V_{C2a}$, and $V_{C2b}$. For example, the TOF sensor device can calculate the propagation time tp based equation (30) or (34). At 2136, a distance d of an object or surface from the TOF sensor device is calculated based on the propagation time determined at step 2134 (e.g., using equation (1)). At 2138, a sensor output of the TOF sensor device is controlled based on the distance value determined at step 2136.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In order to provide a context for the various aspects of the disclosed subject matter, FIGS. 22 and 23 as well as the following discussion are intended to provide a brief, general description of a suitable environment in which the various aspects of the disclosed subject matter may be implemented.

With reference to FIG. 22, an example environment 2210 for implementing various aspects of the aforementioned subject matter includes a computer 2212. The computer 2212 includes a processing unit 2214, a system memory 2216, and a system bus 2218. The system bus 2218 couples system components including, but not limited to, the system memory 2216 to the processing unit 2214. The processing unit 2214 can be any of various available processors. Multi-core microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable PROM (EEPROM), or flash memory. Volatile memory 2220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2212 also includes removable/non-removable, volatile/non-volatile computer storage media. FIG. 22 illustrates, for example a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2224 to the system bus 2218, a removable or non-removable interface is typically used such as interface 2226.

It is to be appreciated that FIG. 22 describes software that acts as an intermediary between users and the basic computer resources described in suitable operating environment 2210. Such software includes an operating system 2228. Operating system 2228, which can be stored on disk storage 2224, acts to control and allocate resources of the computer 2212. System applications 2230 take advantage of the management of resources by operating system 2228 through program modules 2232 and program data 2234 stored either in system memory 2216 or on disk storage 2224. It is to be appreciated that one or more embodiments of the subject disclosure can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapters 2242 are provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses communication networks such as local-area networks (LAN) and wide-area networks (WAN). LAN technologies include Fiber Distributed Data Interface (I-DDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the system bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2302 and the server(s) 2304. The client(s) 2302 are operably connected to one or more client data store(s) 2308 that can be employed to store information local to the client(s) 2302. Similarly, the server(s) 2304 are operably connected to one or more server data store(s) 2310 that can be employed to store information local to the servers 2304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A time of flight sensor device, comprising:
  an emitter component configured to emit a first light pulse at a first time that is delayed relative to a start of a first measuring sequence by a first delay, and a second light pulse at a second time that is delayed relative to a start of a second measuring sequence by a second delay longer than the first delay;
  a photo-sensor component comprising a photo-detector, the photo-detector comprising
    a photo device configured to generate electrical energy in proportion to a quantity of received light, and
    a measuring circuit configured to
      capture a first portion of the electrical energy proportional to a first leading portion of a first received reflected light pulse corresponding to the first light pulse, and a second portion of the electrical energy proportional to a first trailing portion of the first received reflected light pulse, wherein the first leading portion and the first trailing portion are divided at a first sampling time that is delayed relative to the start of the first measuring sequence by a third delay, and
      capture a third portion of the electrical energy proportional to a second leading portion of a second received reflected light pulse corresponding to the second light pulse, and a fourth portion of the electrical energy proportional to a second trailing portion of the second received reflected light pulse, wherein the second leading portion and the second trailing portion are divided at a second sampling time that is delayed relative to the start of the second measuring sequence by the third delay; and
  a distance determination component configured to determine a propagation time for the first light pulse or the second light pulse based on a first measured value of the first portion, a second measured value of the second portion, a third measured value of the third portion, and a fourth measured value of the fourth portion.

2. The time of flight sensor device of claim 1, wherein the distance determination component is configured to determine the propagation time based on a first difference between the first measured value and the second measured value, and a second difference between the third measured value and the fourth measured value.

3. The time of flight sensor device of claim 1, wherein the distance determination component is configured to determine the propagation time tp based on $$t_p = \frac{(V_{c1a} - V_{c2a}) - (V_{c2b} - V_{c1b})}{(V_{c1a} - V_{c2a}) + (V_{c2b} - V_{c1b})} \frac{T_1}{2}$$

where $T_1$ is a difference between the first delay and the second delay, $V_{c1a}$ is the first measured value, $V_{c2a}$ is the second measured value, $V_{c1b}$ is the third measured value, and $V_{c2b}$ is the fourth measured value.

4. The time of flight sensor device of claim 1, wherein the measuring circuit comprises:
  a first measuring capacitor connected to the photo device via a first control line switch, wherein the first control line switch is configured to transfer the electrical energy from the photo device to the first measuring capacitor while a first control signal is set, and to prevent transfer of the electrical energy from the photo device to the first measuring capacitor while the first control signal is reset, and a second measuring capacitor connected to the photo device via a second control line switch, wherein the second control line switch is configured to transfer the electrical energy from the photo device to the second measuring capacitor while a second control signal is set, and to prevent transfer of the electrical energy from the photo device to the second measuring capacitor while the second control signal is reset.

5. The time of flight sensor device of claim 4, wherein the photo-sensor component is configured to
set the first control signal at a third time defined relative to the start of the first measuring sequence,
reset the first control signal at the first sampling time, wherein setting the first control signal at the third time and resetting the first control signal at the first sampling time causes the first portion of the electrical energy to transfer to the first measuring capacitor, and
set the second control signal at the first sampling time, wherein setting the second control signal at the first sampling time causes the second portion of the electrical energy to transfer to the second measuring capacitor, and
the distance determination component is further configured to measure the first measured value from the first measuring capacitor, and to measure the second measured value from the second measuring capacitor.

6. The time of flight sensor device of claim 5, wherein the photo-sensor component is further configured to
set the first control signal at a fourth time defined relative to the start of the second measuring sequence,
reset the first control signal at the second sampling time, wherein setting the first control signal at the third time and resetting the first control signal at the second sampling time causes the third portion of the electrical energy to transfer to the first measuring capacitor, and
set the second control signal at the second sampling time, wherein setting the second control signal at the second sampling time causes the fourth portion of the electrical energy to transfer to the second measuring capacitor, and
the distance determination component is further configured to measure the third measured value from the first measuring capacitor, and to measure the fourth measured value from the second measuring capacitor.

7. The time of flight sensor of claim 1, wherein
the memory stores pulse shape data that defines normalized values of a trailing light pulse portion of as a function of pulse propagation time and normalized values of a leading light pulse portion as a function of pulse propagation time, and
the distance determination component is configured to determine the propagation time based on a cross-referencing of the pulse shape data with the first measured value, the second measured value, the third measured value, and the fourth measured value.

8. The time of flight sensor of claim 1, wherein
the distance determination component is further configured to determine, based on the propagation time, a distance of an object or a surface corresponding to a pixel that corresponds to the photo-detector, and the time of flight sensor device further comprises a control output component configured to generate an output signal in response to determining that the distance satisfies a defined criterion.

9. The time of flight sensor device of claim 1, wherein the distance determination component is configured to determine the propagation time tp based on $$t_p = \frac{(V_{c1a} - \propto V_{c2a}) - (\propto V_{c2b} - V_{c1b})}{(V_{c1a} - \propto V_{c2a}) + (\propto V_{c2b} - V_{c1b})} \frac{T_1}{2}$$

where $T_1$ is a difference between the first delay and the second delay, $V_{c1a}$ is the first measured value, $V_{c2a}$ is the second measured value, $V_{c1b}$ is the third measured value, $V_{c2b}$ is the fourth measured value, and $\propto$ is a calculated ratio between the first measuring capacitor and the second measuring capacitor.

10. A method for optical distance measurement, comprising:
generating, by a photo-detector of an optical sensor device comprising a processor, electrical energy in proportion to a quantity of received light incident on the photo-detector;
emitting, by the optical sensor device, a first light pulse at a first time that is delayed relative to a start of a first measuring sequence by a first delay;
storing, by the optical sensor device, a first portion of the electrical energy proportional to a first leading portion of a first received reflected light pulse corresponding to the first light pulse;
storing, by the optical sensor device, a second portion of the electrical energy proportional to a first trailing portion of the first received reflected light pulse, wherein the first leading portion and the first trailing portion are divided at a first sampling time that is delayed relative to the start of the first measuring sequence by a second delay;
emitting, by the optical sensor device, a second light pulse at a second time that is delayed relative to a start of a second measuring sequence by a third delay longer than the first delay;
storing, by the optical sensor device, a third portion of the electrical energy proportional to a second leading portion of a second received reflected light pulse corresponding to the second light pulse;
storing, by the optical sensor device, a fourth portion of the electrical energy proportional to a second trailing portion of the second received reflected light pulse, wherein the second leading portion and the second trailing portion are divided at a second sampling time that is delayed relative to the start of the second measuring sequence by the second delay; and
determining, by the optical sensor device, a propagation time for the first light pulse or the second light pulse based on a first measured value of the first portion, a second measured value of the second portion, a third measured value of the third portion, and a fourth measured value of the fourth portion.

11. The method of claim 10, wherein the determining comprises
determining a first difference between the first measured value and the second measured value;

determining a second difference between the third measured value and the fourth measured value; and determining the propagation time based on the first difference and the second difference.

12. The method of claim 10, wherein the determining comprises determining the propagation time based on $$t_p = \frac{(V_{c1a} - V_{c2a}) - (V_{c2b} - V_{c1b})}{(V_{c1a} - V_{c2a}) + (V_{c2b} - V_{c1b})} \frac{T_1}{2}$$

where tp is the propagation time, $T_1$ is a difference between the first delay and the second delay, $V_{c1a}$ is the first measured value, $V_{c2a}$ is the second measured value, $V_{c1b}$ is the third measured value, and $V_{c2b}$ is the fourth measured value.

13. The method of claim 10, wherein
the storing the first portion of the electrical energy comprises:
setting a first control signal at a third time defined relative to the start of the first measuring sequence, wherein setting the first control signal causes electrical energy to transfer from the photo-detector to a first measuring capacitor; and
resetting the first control signal at the first sampling time, wherein the setting the first control signal and the resetting the first control signal at the first sampling time causes the first portion of the electrical energy to transfer from the photo-detector to a first measuring capacitor, and
the storing the second portion of the electrical energy comprises:
setting a second control signal at the first sampling time, wherein the setting the second control signal at the first sampling time causes the second electrical energy to transfer from the photo-detector to a second measuring capacitor.

14. The method of claim 13, wherein
the storing the third portion of the electrical energy comprises:
setting the first control signal at a fourth time defined relative to the start of the second measuring sequence; and
resetting the first control signal at the second sampling time, wherein the setting the first control signal at the third time and the resetting the first control signal at the second sampling time causes the third portion of the electrical energy to transfer to the first measuring capacitor, and
the storing the fourth portion of the electrical energy comprises:
setting the second control signal at the second sampling time, wherein the setting the second control signal at the second sampling time causes the fourth portion of the electrical energy to transfer to the second measuring capacitor.

15. The method of claim 10, wherein the determining the propagation time comprises:
cross-referencing the first measured value, the second measured value, the third measured value, and the fourth measured value with stored pulse shape data that defines normalized values of a trailing light pulse portion of as a function of pulse propagation time and normalized values of a leading light pulse portion as a function of pulse propagation time.

16. The method of claim 10, further comprising:
determining, by the optical sensor device based on the propagation time, a distance of an object or a surface corresponding to a pixel that corresponds to the photo-detector; and
setting, by the optical sensor device, an output signal in response to determining that the distance satisfies a defined criterion.

17. A non-transitory computer-readable medium having stored thereon instructions that, in response to execution, cause an optical sensor device comprising a processor to perform operations, the operations comprising:
emitting a first light pulse at a first time that is delayed relative to a start of a first measuring sequence by a first delay;
storing a first portion of electrical energy generated by a photo-detector of the optical sensor device, wherein the first portion of the electrical energy is proportional to a first leading portion of a first received reflected light pulse corresponding to the first light pulse;
storing a second portion of the electrical energy proportional to a first trailing portion of the first received reflected light pulse, wherein the first leading portion and the first trailing portion are divided at a first sampling time that is delayed relative to the start of the first measuring sequence by a second delay;
emitting a second light pulse at a second time that is delayed relative to a start of a second measuring sequence by a third delay longer than the first delay;
storing a third portion of the electrical energy proportional to a second leading portion of a second received reflected light pulse corresponding to the second light pulse;
storing a fourth portion of the electrical energy proportional to a second trailing portion of the second received reflected light pulse, wherein the second leading portion and the second trailing portion are divided at a second sampling time that is delayed relative to the start of the second measuring sequence by the second delay; and
determining a propagation time for the first light pulse or the second light pulse based on a first measured value of the first portion, a second measured value of the second portion, a third measured value of the third portion, and a fourth measured value of the fourth portion.

18. The non-transitory computer-readable medium of claim 17, wherein the determining comprises:
determining a first difference between the first measured value and the second measured value;
determining a second difference between the third measured value and the fourth measured value; and
determining the propagation time based on the first difference and the second difference.

19. The non-transitory computer-readable medium of claim 17, wherein the determining comprises determining the propagation time based on $$t_p = \frac{(V_{c1a} - V_{c2a}) - (V_{c2b} - V_{c1b})}{(V_{c1a} - V_{c2a}) + (V_{c2b} - V_{c1b})} \frac{T_1}{2}$$

where tp is the propagation time, $T_1$ is a difference between the first delay and the second delay, $V_{c1a}$ is the first measured value, $V_{c2a}$ is the second measured value, $V_{c1b}$ is the third measured value, and $V_{c2b}$ is the fourth measured value.

20. The non-transitory computer-readable medium of claim 17, wherein the determining the propagation time comprises:
cross-referencing the first measured value, the second measured value, the third measured value, and the fourth measured value with stored pulse shape data that defines normalized values of a trailing light pulse portion of as a function of pulse propagation time and normalized values of a leading light pulse portion as a function of pulse propagation time.

* * * * *